(12) United States Patent
Zhang

(10) Patent No.: US 11,165,689 B2
(45) Date of Patent: Nov. 2, 2021

(54) SERVICE-BASED TRAFFIC FORWARDING IN VIRTUAL NETWORKS

(71) Applicant: Hang Zhang, Nepean (CA)

(72) Inventor: Hang Zhang, Nepean (CA)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 0 days.

(21) Appl. No.: 16/787,826

(22) Filed: Feb. 11, 2020

(65) Prior Publication Data
US 2020/0177501 A1    Jun. 4, 2020

Related U.S. Application Data

(63) Continuation of application No. 15/440,950, filed on Feb. 23, 2017, now Pat. No. 10,608,928.
(Continued)

(51) Int. Cl.
*H04L 12/725* (2013.01)
*H04W 40/00* (2009.01)
(Continued)

(52) U.S. Cl.
CPC .......... *H04L 45/30* (2013.01); *H04L 12/4633* (2013.01); *H04L 12/4641* (2013.01); *H04L 12/4645* (2013.01); *H04L 41/0803* (2013.01); *H04L 45/02* (2013.01); *H04L 45/586* (2013.01); *H04L 45/74* (2013.01); *H04L 45/745* (2013.01); *H04L 67/34* (2013.01); *H04W 4/70* (2018.02); *H04W 12/06* (2013.01); *H04W 24/08* (2013.01); *H04W 40/00* (2013.01); *H04W 40/20* (2013.01);
(Continued)

(58) Field of Classification Search
None
See application file for complete search history.

(56) References Cited

U.S. PATENT DOCUMENTS 7,227,863 B1    6/2007  Leung et al.
7,856,014 B2   12/2010  Kreuk
(Continued)

FOREIGN PATENT DOCUMENTS

CN    101352003 A    1/2009
CN    101668022 A    3/2010
(Continued)

OTHER PUBLICATIONS

Hang Zhang et al., "5G wireless network: MyNET and SONAC", IEEE Network ( vol. 29 , Issue: 4 , Jul.-Aug. 2015 ),total 10 pages.
(Continued)

*Primary Examiner* — Jutai Kao

(57) ABSTRACT

The present application provides a method for routing traffic from a user equipment (UE) to a service available on a network. In the method, a virtual router entity that services a virtual network available on the network receives a packet from the UE, the received packet including at least a destination ID and payload. The virtual router then forwards a location resolution request including the received destination ID to an associated connectivity manager operating on the network. The virtual router receives a location resolution response from the connectivity manager including at least a destination network node ID. The virtual router may then forward the packet to the destination network node ID.

18 Claims, 67 Drawing Sheets

Related U.S. Application Data

(60) Provisional application No. 62/371,628, filed on Aug. 5, 2016, provisional application No. 62/376,820, filed on Aug. 18, 2016, provisional application No. 62/399,206, filed on Sep. 23, 2016.

(51) Int. Cl.

| | | |
|---|---|---|
| *H04W 4/70* | (2018.01) | |
| *H04W 48/18* | (2009.01) | |
| *H04L 12/751* | (2013.01) | |
| *H04L 12/713* | (2013.01) | |
| *H04W 40/20* | (2009.01) | |
| *H04L 12/46* | (2006.01) | |
| *H04L 12/741* | (2013.01) | |
| *H04L 12/24* | (2006.01) | |
| *H04L 29/08* | (2006.01) | |
| *H04W 76/11* | (2018.01) | |
| *H04W 12/06* | (2021.01) | |
| *H04W 24/08* | (2009.01) | |
| *H04W 60/00* | (2009.01) | |
| *H04W 64/00* | (2009.01) | |
| *H04W 72/04* | (2009.01) | |
| *H04L 12/715* | (2013.01) | |
| *H04W 4/06* | (2009.01) | |

(52) U.S. Cl.
CPC .......... *H04W 48/18* (2013.01); *H04W 60/00* (2013.01); *H04W 64/00* (2013.01); *H04W 72/042* (2013.01); *H04W 76/11* (2018.02); *H04L 41/12* (2013.01); *H04L 45/302* (2013.01); *H04L 45/64* (2013.01); *H04W 4/06* (2013.01)

(56) References Cited

U.S. PATENT DOCUMENTS

| | | | |
|---|---|---|---|
| 8,478,902 | B1 | 7/2013 | Holland et al. |
| 8,660,129 | B1 | 2/2014 | Brendel et al. |
| 8,671,176 | B1* | 3/2014 | Kharitonov ............. H04L 45/02 709/223 |
| 9,077,640 | B2 | 7/2015 | So et al. |
| 9,755,965 | B1* | 9/2017 | Yadav ................. H04L 41/0806 |
| 2003/0041170 | A1 | 2/2003 | Suzuki |
| 2007/0117548 | A1 | 5/2007 | Fernandez-Alonso et al. |
| 2007/0153808 | A1 | 7/2007 | Parker et al. |
| 2008/0098472 | A1 | 4/2008 | Enomoto et al. |
| 2008/0192701 | A1 | 8/2008 | Jeong et al. |
| 2010/0074274 | A1 | 3/2010 | Huguies |
| 2010/0189115 | A1 | 7/2010 | Kitada |
| 2011/0111758 | A1 | 5/2011 | Liu et al. |
| 2011/0134931 | A1 | 6/2011 | Merwe et al. |
| 2012/0275787 | A1 | 11/2012 | Xiong et al. |
| 2013/0136123 | A1 | 5/2013 | Ge et al. |
| 2013/0136133 | A1 | 5/2013 | Alkhatib et al. |
| 2013/0336305 | A1 | 12/2013 | Yan et al. |
| 2013/0346585 | A1 | 12/2013 | Ueno |
| 2014/0056298 | A1 | 2/2014 | Vobbilisetty et al. |
| 2014/0269513 | A1 | 9/2014 | Yu et al. |
| 2014/0307556 | A1 | 10/2014 | Zhang |
| 2014/0334485 | A1 | 11/2014 | Jain et al. |
| 2014/0362700 | A1 | 12/2014 | Zhang et al. |
| 2015/0071170 | A1 | 3/2015 | Zhang et al. |
| 2015/0072705 | A1 | 3/2015 | Zhang et al. |
| 2015/0143369 | A1 | 5/2015 | Zheng et al. |
| 2015/0200849 | A1 | 7/2015 | Wen et al. |
| 2015/0257012 | A1 | 9/2015 | Zhang et al. |
| 2015/0271067 | A1 | 9/2015 | Li et al. |
| 2015/0381493 | A1 | 12/2015 | Bansal et al. |
| 2016/0028626 | A1 | 1/2016 | Koganti |
| 2016/0105471 | A1 | 4/2016 | Nunes et al. |
| 2016/0119417 | A1 | 4/2016 | Fang et al. |
| 2016/0134527 | A1 | 5/2016 | Kwak et al. |
| 2016/0150421 | A1 | 5/2016 | Li et al. |
| 2016/0156513 | A1 | 6/2016 | Zhang et al. |
| 2016/0157043 | A1 | 6/2016 | Li et al. |
| 2016/0226755 | A1 | 8/2016 | Hammam et al. |
| 2016/0285736 | A1 | 9/2016 | Gu |
| 2017/0034053 | A1 | 2/2017 | Chanda et al. |
| 2017/0093618 | A1* | 3/2017 | Chanda ................. H04L 45/72 |
| 2017/0118043 | A1* | 4/2017 | Hao ..................... H04L 12/4641 |
| 2017/0181210 | A1 | 6/2017 | Nadella et al. |
| 2017/0201922 | A1 | 7/2017 | Akiyoshi |
| 2018/0176858 | A1 | 6/2018 | Wang et al. |
| 2018/0199276 | A1 | 7/2018 | Zhang |
| 2018/0248713 | A1 | 8/2018 | Zanier et al. |
| 2019/0037409 | A1 | 1/2019 | Wang et al. |

FOREIGN PATENT DOCUMENTS

| | | |
|---|---|---|
| CN | 101808030 A | 8/2010 |
| CN | 102315925 A | 1/2012 |
| CN | 102469004 A | 5/2012 |
| CN | 102546735 A | 7/2012 |
| CN | 102549990 A | 7/2012 |
| CN | 102611629 A | 7/2012 |
| CN | 102948132 A | 2/2013 |
| CN | 103001883 A | 3/2013 |
| CN | 103444143 A | 12/2013 |
| CN | 103491006 A | 1/2014 |
| CN | 103534997 A | 1/2014 |
| CN | 103607349 A | 2/2014 |
| CN | 103685026 A | 3/2014 |
| CN | 103716213 A | 4/2014 |
| CN | 104104534 A | 10/2014 |
| CN | 104285416 A | 1/2015 |
| CN | 104363159 A | 2/2015 |
| CN | 105227454 A | 1/2016 |
| CN | 105306333 A | 2/2016 |
| CN | 105531961 A | 4/2016 |
| JP | 2003069609 A | 3/2003 |
| JP | 5125793 B2 | 1/2013 |
| WO | 2009054032 A | 4/2009 |
| WO | 2013142519 A1 | 9/2013 |
| WO | 2014049432 A2 | 4/2014 |
| WO | 2015178033 A1 | 11/2015 |
| WO | 20150180617 A1 | 12/2015 |
| WO | 2016014362 A1 | 1/2016 |

OTHER PUBLICATIONS

E. Rosen et al., "BGP/MPLS IP Virtual Private Networks (VPNs)", Request for Comments: 4364, Network Working Group, Feb. 2006, total 47 pages.

International Search Report dated Oct. 26, 2017 for corresponding International Application No. PCT/CN2017/096173 filed Aug. 7, 2017.

International Search Report dated Oct. 27, 2017 for corresponding International Application No. PCT/CN2017/096172 filed Aug. 7, 2017.

International Search Report dated Oct. 26, 2017 for corresponding International Application No. PCT/CN2017/096171 filed Aug. 7, 2017.

International Search Report dated Sep. 28, 2017 for corresponding International Application No. PCT/CN2017/096056 filed Aug. 4, 2017.

International Search Report dated Oct. 23, 2017 for corresponding International Application No. PCT/CN2017/096055 filed Aug. 4, 2017.

Zhang et al., "5G Wireless Network: MyNET and SONAC", IEEE Network vol. 29, Issue: 4, Jul.-Aug. 2015, pp. 14 to 23.

ETSI GS NFV-SWA 001 V0.2.4(Nov. 2014), Network Functions Virtualisation (NFV); Virtual Network Functions Architecture, total 93 pages.

* cited by examiner

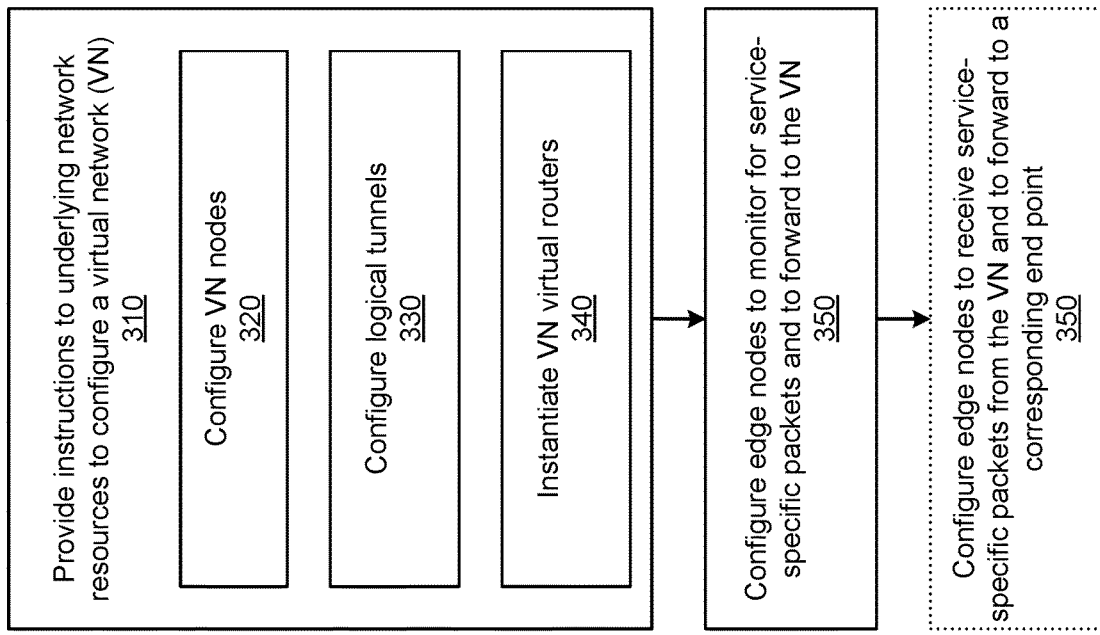

VN 1 tunnel description: (only shows a one direction tunnel)
VN ID = 1:
Number of tunnels
For each tunnel
 [Tunnel ID = 1: ingress VN Node ID = 2, egress VN Node ID = 1; QoS (rate)
  Tunnel ID = 2: ingress VN Node ID = 2, egress VN Node ID = 3, QoS (rate)
  ....]

VN 1 VN Node description:
VN ID = 1:
Number of VN Nodes
For each VN Node
 [ VN Node ID = 1, NN ID = 11,
  cluster ID: = 11
   VN Node ID = 2, NN ID = 13,
   cluster ID: = 10
   ....]

VN 1 Device QoS description: (only shows a one direction tunnel)
VN ID = 1:
Device QoS: rate = 500kbps, latency= 100ms VN 1 open tunnel description: (only shows a one direction tunnel)
VN ID = 1:
Number of DL open tunnels
For each DL open tunnel
 [Open tunnel ID = 13: ingress VN Node ID = 2, destination NN ID = 19 ; QoS
  Open tunnel ID = 14: ingress VN Node ID = 2, destination NN ID = 20, QoS]
Number of UL open tunnels
For each of UL open tunnels
 [Open tunnel ID = 15: source NN ID = 19, destination VN Node ID = 3, QoS;
  Open Tunnel ID = 16: source NN ID = 20, destination VN node ID = 3, QoS]

FIG. 3B

```
VN router 2
VN ID=1:
Destination VN Node ID = 4, tunnel ID = 1;
Destination VN Node ID = 5, tunnel ID = 1;
Destination VN Node ID = 1, tunnel ID = 1;
Destination VN Node ID = 3, tunnel ID = 2;
...]
```

```
VN router 1
VN ID=1:
Destination VN Node ID = 4, tunnel ID = 11;
Destination VN Node ID = 5, tunnel ID = 12;
...]
```

```
VN router 4
VN ID = 1:
All destination VN Nodes, tunnel ID = 17;
```

```
VN router 6
VN ID = 1:
All destination VN Nodes, open tunnel ID = 15;
```

FIG. 5B

| VN Topology Description Table | |
|---|---|
| VN ID = 1 | |
| Domain ID = 1 | VN Node ID = 1 |
| Domain ID = 2 | VN Node ID = 2 |

| End-point Location Information obtained | | |
|---|---|---|
| VN ID = 1 | | |
| End-point ID = B | Domain ID = 2 | Cluster ID = Non |
| …… | | |

| Tunnel Configuration Table | |
|---|---|
| VN ID = 1 | |
| Destination VN Node = 1 | Next Hop VN Node ID (or tunnel ID)<br>(NN address to which the VN Node = 1 associates) |
| Destination VN Node = 2 | Next Hop VN Node ID (or tunnel ID)<br>(NN address = 4) to which the VN Node = 2 associates |

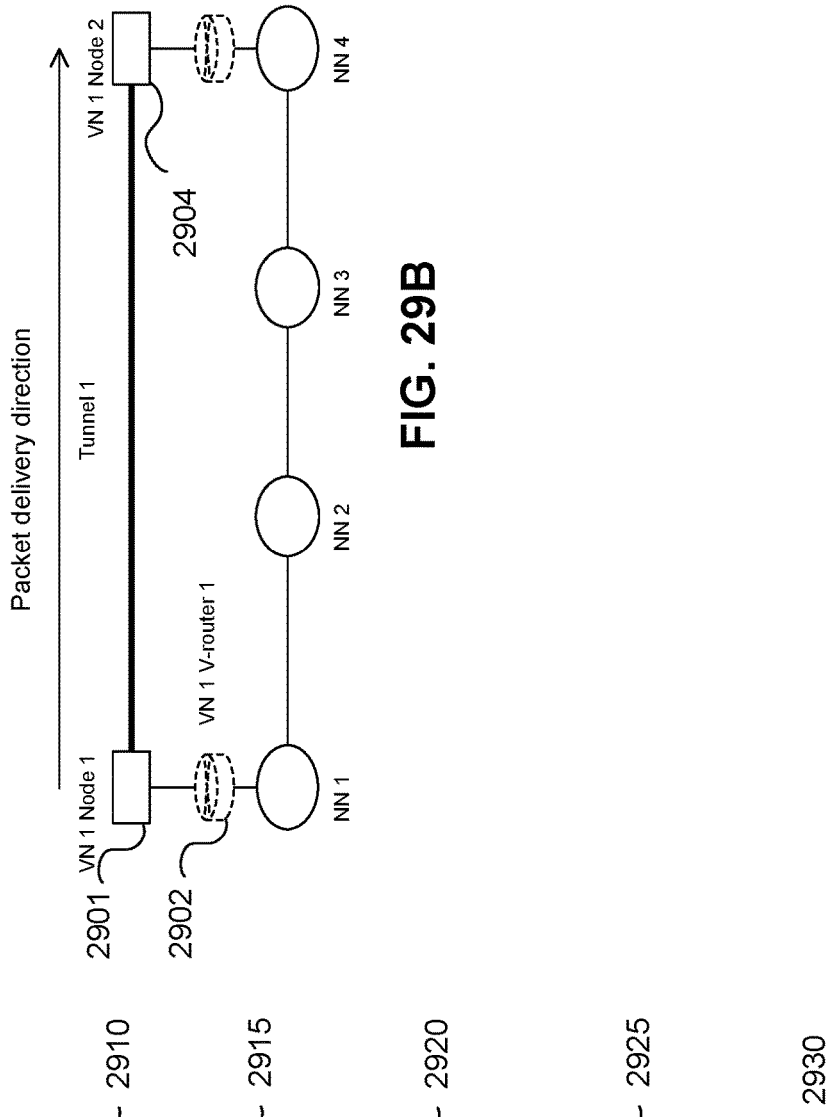
FIG. 29B
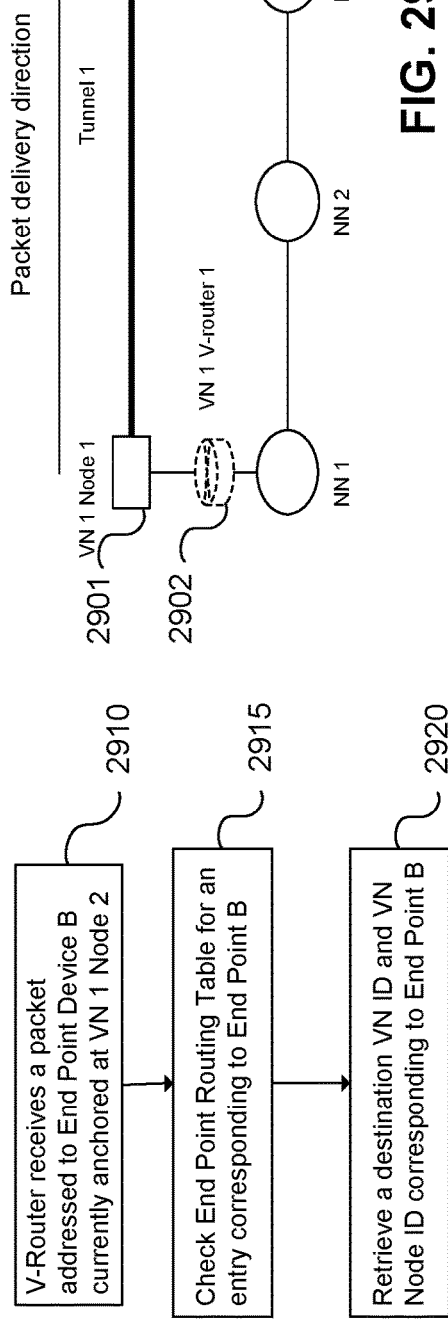
FIG. 29A
FIG. 29C

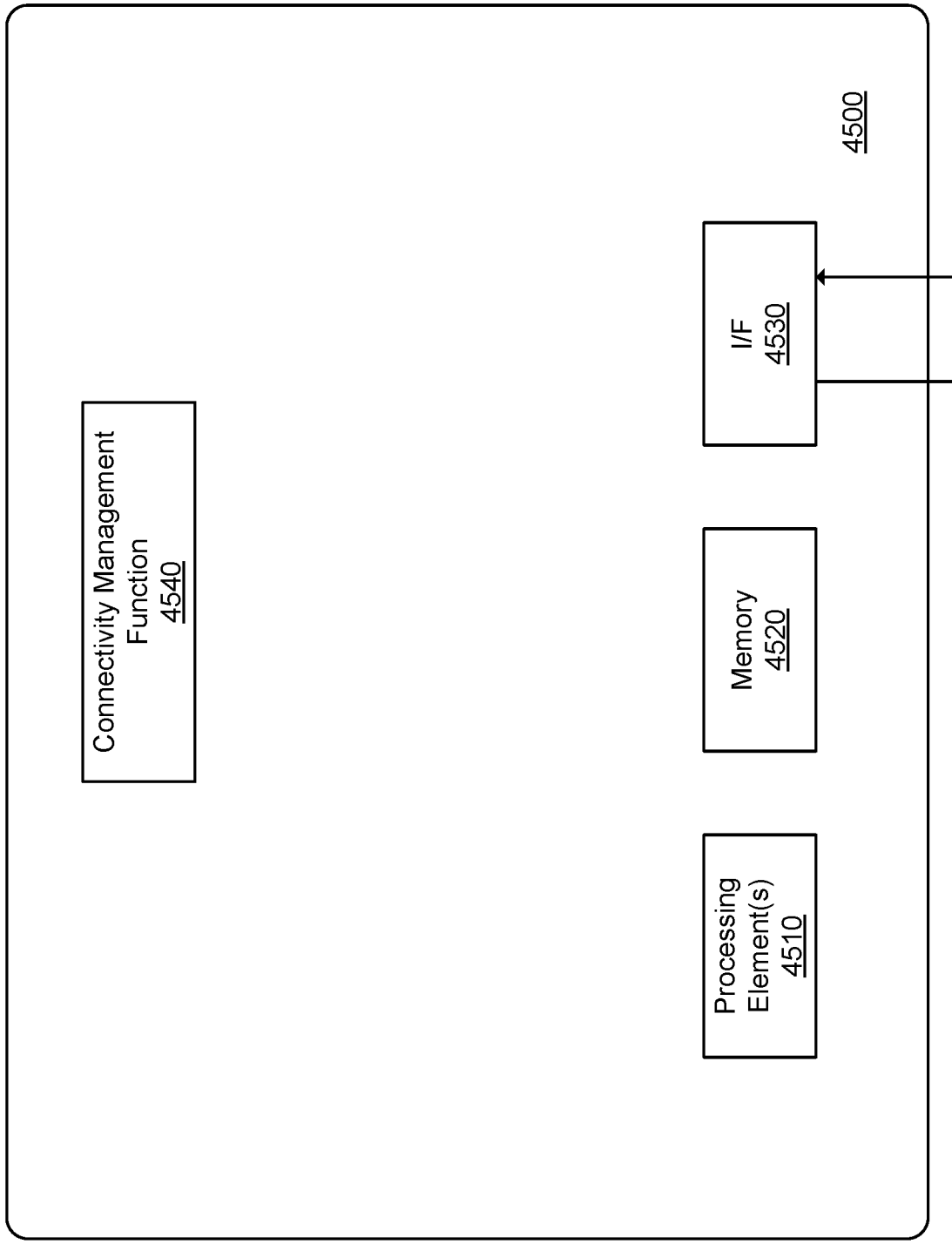

SERVICE-BASED TRAFFIC FORWARDING IN VIRTUAL NETWORKS

CROSS-REFERENCE TO RELATED APPLICATIONS

This application is a continuation of U.S. patent application Ser. No. 15/440,950, filed Feb. 23, 2017 which claims the benefit and priority from U.S. Provisional Patent Application No. 62/371,628 filed on Aug. 5, 2016, and to U.S. Provisional Patent Application No. 62/376,820 filed on Aug. 18, 2016, and to U.S. Provisional Patent Application No. 62/399,206 filed on Sep. 23, 2016, all of which are herein incorporated by reference.

FIELD OF THE INVENTION

The present invention pertains to the field of wireless communication networks and in particular to methods and systems for service delivery in wireless communication networks.

BACKGROUND

In current 3G/4G networks, traffic is delivered to user equipment (UE) on a per-device session-basis between the UE and a service provider, such as a server. A service session is established after completion of an end-to-end connection setup procedure between the UE and the service provider. This connection procedure typically introduces a latency of about 200 ms and causes considerable network overhead on the link between the UE and the service provider.

It is expected that there will be a significant increase in the number of UEs requiring service in next generation networks (e.g. 5G), such as sensors, machines, mobile devices, and other devices that will require connection. Furthermore, the data traffic will likely may become more bursty in nature with a much higher number of sessions to be served as the demand for continuous or near-continuous connectivity increases.

One of the objectives of next generation networks (e.g. 5G) is to provide service-based delivery of content, and avoid the overhead of per-device sessions.

This background information is provided to reveal information believed by the applicant to be of possible relevance to the present invention. No admission is necessarily intended, nor should be construed, that any of the preceding information constitutes prior art against the present invention.

SUMMARY

In accordance with further embodiments of the invention, there is provided a system and method for establishing one or more Virtual Networks (VNs) on a communications network. The method including defining a logical topology configuration of the network, comprising configuring a plurality of network components to define a VN logical topology operating on the network. The VN logical topology providing a hierarchical arrangement of the configured plurality of network components to provide the necessary functionality to extend the VN across the network, including the creation and support of one or more tunnels of at least one network slice (i.e. a VN). The VN logical toplogy description may include, for instance a Domain ID and the corresponding anchor point of the VN in the domain.

The configured plurality of network components may establish a number of operative elements arranged in a logical hierarchy spanning the network. The elements may include, for instance, a plurality of virtual routers (v-routers) at network nodes that form the physical connections of the network. The plurality of v-routers operative to receive and transmit packets across the network based on defined routing rules for each VN, or each slice. The elements may further include a hierarchical arrangement of Connectivity Management entities (CM) that are each operative to resolve location resolution requests to locate User Equipment (UE), i.e. end-points, that access the VN using network connections.

In some embodiments, the system may include one or more Service Oriented Network-Slice Auto-Creators (SONACs) which are operative to configure each of the plurality of v-routers to define the VN by specifying rules to create the logical connections between the v-routers. In some embodiments, the system may include one or more QoS management entities to establish and maintain QoS for each of the VNs.

BRIEF DESCRIPTION OF THE FIGURES

Further features and advantages of the present invention will become apparent from the following detailed description, taken in combination with the appended drawing, in which:

FIG. 2 is a flow chart illustrating operations performed in accordance with embodiments of the present invention.

FIGS. 3A & 3B illustrate an aspect of configuration of the network of FIG. 1, including description of a virtual network.

FIGS. 5A & 5B illustrate another aspect of configuration of the network of FIG. 1, including virtual network router routing table configuration.

FIG. 28B illustrates an end point routing table held by the v-router, according to an example embodiment of the present invention.

FIG. 28C illustrates a VN topology description table held by the v-router, according to an example embodiment of the present invention.

FIG. 28D illustrates a logical tunnel configuration table held by the v-router, according to an example embodiment of the present invention.

FIGS. 29A & 29B illustrate an embodiment of virtual router operation.

FIG. 29C illustrates an embodiment of an end point routing table to support virtual router operation.

FIG. 45 illustrates a connectivity manager apparatus, according to an embodiment of the present invention.

DETAILED DESCRIPTION

Figure 1A:
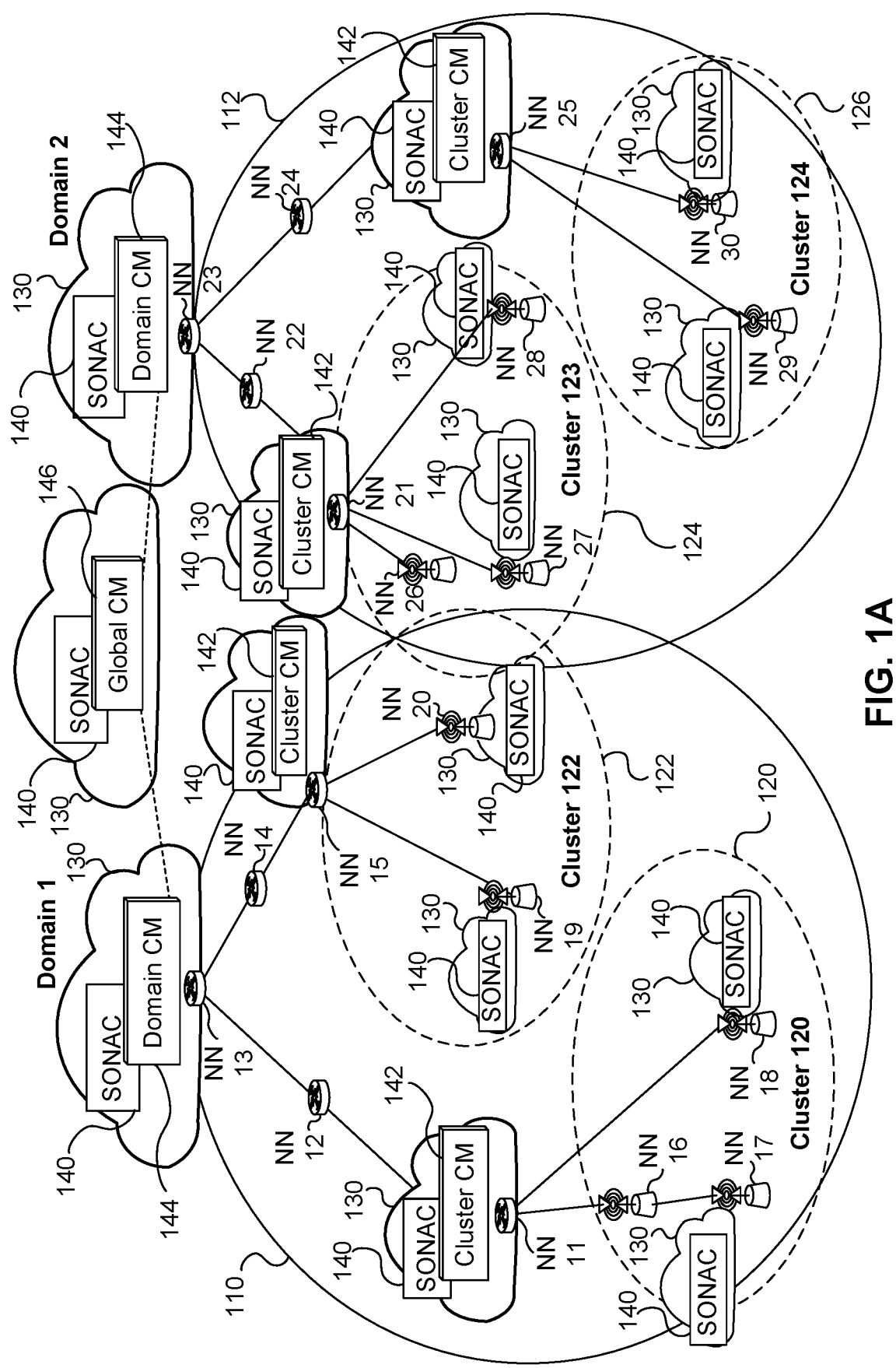
FIG. 1A illustrates a network which is configurable according to embodiments of the present invention.

As used herein, a communication network (or simply a "network") refers to a collection of communicatively coupled devices which interoperate to facilitate communication between various endpoint devices, such as User Equipment devices. The term "User Equipment" (UE) is used herein for clarity to refer to endpoint devices which are configured to communicate with a network either via fixed line connection, or via radios operating according to a predetermined protocol. UEs include UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services as the device moves. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple endpoints that are connected to the network. A service may be provided by the network operator, or may be provided by network customer such as a business, utility, government, or other organization. Examples of services include, but are not limited to, providing audio and/or video content to stream or download to an endpoint such as a UE, storage and/or processing of data from an endpoint such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

As used herein, the term virtual network (VN) refers to a pre-configured network topology including a collection of pre-configured virtual network nodes which are communicatively interconnected to support one or more network slices. The VN is identified by a VN identifier (VN ID). If the VN supports a single network slice (i.e. a single service), that slice may also conveniently be identified by the VN ID. If the VN supports a plurality of network slices, a service identifier (service ID) may be used to differentiate between each of the supported plurality of network slices, to identify which slice is allocated to which service as supported by that VN. The plurality of network slices are logically separated from one another within the VN, but all of the network slices within a VN share a common set of network resources that have been configured for that VN. In this case, a slice can be identified using a combination of a VN ID and a service ID.

More particularly, a VN is composed of a collection of VN nodes each of which is associated with one of a corresponding collection of physical network nodes that make up the network. The VN nodes are communicatively interconnected, either directly or indirectly via other VN nodes. Each VN node is associated with, and communicatively linked to, a corresponding physical network node of the network. In some embodiments, operational capacities of the VN nodes may be co-located with their associated physical network node. In some embodiments, operational capacities of one or more of the VN nodes may be physically separated from their associated physical network node. The VN may further include definitions and functional elements to provide connecting tunnels, associated routing functions, packet aggregation functions, packet de-aggregation functions, firewall functions, anchor point functions, in-network processing elements, admission control, and access link scheduling and management, that is arranged to support the one or more network slices across the collection of VN nodes.

For example, the association may be such that a packet received at a physical network node is provided to the VN node associated with that physical network node for processing (e.g. under predetermined conditions), and packets provided by the VN node may be transmitted by the physical network node as instructed by the VN node, or the pre-configured rules for that VN. The VN nodes can be instantiated using computing, communication, and memory resources such as network function virtualization resources. These resources can be located in a cloud, such as a datacenter or local cloud. The local cloud may include generic hardware proximate or co-located with the associated network node. A VN node may comprise a network function or a group of network functions. The logical topology of a VN refers to the interconnection among multiple VN nodes which are distributed at various associated physical network nodes.

A VN tunnel refers to a logical communication link between two VN nodes. An open VN tunnel refers to a logical communication link between a VN node and another network node which is neither associated with a VN node nor a VN specific network function. The other network node may be, for instance, an edge node of the network, such as an access node or a gateway. Edge nodes provide connectivity for mobile or fixed endpoints (or "end nodes") to connect to the network. Endpoints may include, for instance, UEs and other devices external to the network, such as application servers, which attach to the VN access the service(s) supported on that VN.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network.

General Description

Embodiments of the present invention provide for delivery of one or more services from at least one network entity available on a network. Rather than the network acting only to connect end points to the network entity, the network is configured to participate in providing the service. In particular, a VN is instantiated and pre-configured on the network for providing delivery of the service(s). The VN is pre-configured in such a way that endpoints are able to connect to a desired service with limited to no signaling across the network at the time of service usage, and therefore limited latency. This is enabled by the pre-establishment of the VN on the network, which effectively extends the service from the network entity across the network to the point of attachment by the end point. When the end point attaches to the VN, it gains access to the service, without signalling between the end point and the network entity that provides the service.

Because the network participates in service delivery, the service is expanded into the network by the use of virtual network nodes. The virtual network nodes can recognize incoming data packets associated the service and route them appropriately via the pre-established tunnels.

The pre-configured VN is operative to recognize incoming data packets associated the service and to route them appropriately via the pre-established tunnels. This operation is supported by VN routing functions and VN tunnels which are established for providing the service. The VN nodes can also perform other functions of the service such as packet aggregation or de-aggregation, firewall and security, anchor point operation, in-network processing and data storage, admission control, and access link scheduling and management.

The v-routers are configured to route packets between the VN nodes via the tunnels, in a hop-by-hop manner. Packets are routed toward an appropriate destination, such as but not necessarily limited to a destination specified in the packet using a name identifier or explicit destination identifier. Physical network resources, such as network nodes, are configured to provide the VN tunnels as part of the VN tunnel definition. VN tunnels can be supported by a chain of physical network nodes which are configured to forward tunneled packets toward the VN tunnel egress. In some embodiments, each physical network node supporting a tunnel may be configured with a set of routing rules which associates a VN tunnel identifier or destination network node identifier with a next network node. When a packet specifies the VN tunnel identifier or destination network node identifier, it is forwarded to the associated next network node.

For example, when the service involves processing of data transmitted by UEs in a certain manner, and providing results of this data processing to the UE or another UE, some or all of the processing may be done at virtual network nodes proximate to the network edge, thereby reducing service latency. The location of VN nodes performing in-network data processing and/or data caching can be selected based on criteria such as but not limited to: performance, cost, latency, communication overhead, and quality of service.

In various embodiments, the pre-configuration of the VN provides a network infrastructure that stands ready to handle packets according to a requested service. This allows end-points to reduce signaling because the details of how the packet is to be treated are specified in advance when the VN is pre-configured. This also allows for lower latency, because tunnel set-up, service function set-up, endpoint tracking, etc. are performed in advance. Each VN node is in standby across the network ready to receive and handle any packets directed to a service supported by that VN. In addition, because service functions can be embedded in the network (even possibly at the edge nodes or in radio access network (RAN) clusters), data forwarding and associated latency and network resource usage can be reduced.

Network pre-configuration may be performed by a network entity referred to as a Service Oriented Network Auto Creation entity (SONAC). The SONAC is described for example in Zhang, Hang, et al., "5G Wireless Network: MyNET and SONAC", IEEE Network Volume: 29, Issue: 4, July-August 2015, pp 14 to 23, which is incorporated herein by reference. The SONAC may perform and/or direct underlying network resources to instantiate and configure the VN as described herein. As used herein, SONAC functionalities can be subdivided into functions used for network slice composition, referred to as SONAC-Com, and functionalities used for network slice operation, referred to as SONAC-Op. The SONAC may comprise operations for performing software-defined topology definition (SDT), software-defined resource allocation (SDRA), and software-defined protocol definition (SDP). SDT, SDRA and SDP in support of SONAC-Com and SONAC-Op are referred to as SDT-Com, SDRA-Com, SDP-Com, SDT-Op, SDRA-Op and SDP-Op, respectively. SONAC-Op may be dedicated to managing a single network slice, or common to multiple network slices managed thereby. SONAC-Op may be supported on its own network slice or on a network slice used to support multiple entities. The concept of network slices provides operators the flexibility to provide network infrastructure resources that may be tailored to satisfy the wide variety of customer service and quality requirements.

The present application describes a "Hop-On" concept which allows end-point devices (e.g. UE) to connect and disconnect from the slice (VN) directly, rather than needing to complete end-to-end connections as is presently the case. This significantly simplifies the data traffic delivery procedure and reduces signaling overhead and latency across the network. In the Hop-On VN traffic delivery system and method, access to a service does not require per-UE per-session establishment, and does not require end-to-end connection setup between the UE and the service provider. There is no session setup as the session is effectively "pre-existing" as a VN slice pre-established on the network. The VN slice supported by a pre-defined VN topology configured on the network. The UE only needs to negotiate its entry or exit from the slice which may occur at a localized level (e.g. at the edge of the VN). The connection between the slice access point and the service provider is established and maintained by the control functions managing the slice.

Slicing and Hop-On together enable:
Scalability—Physical Network Nodes (NNs) are operative on the service level (integrated data traffic of a service), instead of on device/session level
Simplicity—Per device/session end-to-end tunnel establishment is removed or minimized
Flexibility—service-customized VN/slice—allows the communications network to be adjusted for individual services, to provide a best fit for the needs of customers and network operators For example, end-points of a VN designed for such services can hop-on the VN by sending data packets using a pre-assigned Access Link (AL) resource for that VN. The end-point UE can register and connect with a local node at the edge of the VN, rather than the destination end point of their communications. Once data packets for a service are submitted to the network, the packets are routed to the intended destination(s) along pre-defined VN tunnels, and can be separated by service or QoS as required. For VNs where there is no pre-assigned AL resource, a simplified set of signaling message exchanges on the AL may be used to enable data packet transmission over the AL. From the point of view of communicating devices, the network is always ready to receive and deliver data traffic.

Once the VN has been established, data traffic delivery to a mobile UE relies upon the selection of the right tunnel(s) when routing the data traffic, instead of the re-establishment of new per-device end-to-end connections. Accordingly end points, such as UE or business customers, are able to exchange traffic with a local NN without regard for the location of the intended recipient, or the condition of the network between the sender and the recipient. Similarly, NNs located logically distant from the destination end point do not need to know the logical or physical address of the destination end point. Instead, these NNs need only follow the pre-defined rules for handling packets and direct the packets to an assigned NN that is operative to maintain or obtain the current location of the destination end point.

When communicating to mobile UE, one or more tunnels connecting Access Points (APs) of a Radio Access Network (RAN) cluster can be selected by a v-router at the cluster level to selectively enable data delivery to the one or more APs. Accordingly, the decision-making regarding the best mode to reach a recipient UE may be decided at the lowest level which has the most accurate position and mobility information related to the recipient UE. With this functionality, true handover-free service access is enabled. The end-points of the communication can communicate with a correspondent party using a name (UE ID and a service ID) in place of location information. The hierarchical VN architecture enables the v-routers to handle the traffic on an end-point name basis, and access name-based location tracking and resolution from the CM's configured for that VN.

By using a pre-defined VN, data packets from specific applications, such as peer-to-peer communication (e.g. wechat), can be directly routed to the destination end point via efficient tunnel routing, i.e., shortest route without going through un-necessary paths. CM techniques provide the location information to VN routers to enable the efficient data delivery.

From the endpoint (e.g. UE or server) perspective, the hop-on process starts with network registration: to obtain authentication and authorization to use the network, followed by registration to a CM slice to start reach-ability operation to enable the network to track the endpoint's location. The location tracking may be initiated before the endpoint is registered to a user plane (UP) of the VN (slice). The next step is registration to a UP slice to authorize the endpoint to use the UP slice and obtain information on any requirements for admission control (AC) for follow-up service data transmission. If no further AC is required, the end-point can Hop-On, or access, the slice to directly send data over the VN. For most MTC cases, the above procedure can be simplified. If further AC is required for a service, before sending any data traffic an AC procedure is needed (e.g. for some bulk data transmission over a slice with limited VN capacity, an AC is needed before access is provided to the slice).

Embodiments of the present invention relate to the interactions between an end point, such as a UE, computing device, or customer server, and an edge node, such as an access point of a radio access portion of a communication network. In some embodiments, the end point may be a server or other networked device, and the corresponding edge node may be a gateway of the communication network. Some embodiments provide for an end point or method of operating same, while other embodiments provide for an edge node or method of operating same. The interaction between edge nodes and end points supports VN operation, so as to allow end points to access the VN and to convey packets between the end points and the VN.

FIG. 1A illustrates an example of a network infrastructure which may be configured and utilized according to some embodiments of the present invention. It should be understood that this network infrastructure and its topology is used as an example only, and is not intended to limit the present invention.

To assist with tracking the location of UE accessing the network, the network can be divided into domains, such as Domain 1 110 and Domain 2 112 illustrated in FIG. 1A. Each domain may be further sub-divided into RAN clusters 120, 122, 124, 126. For expediency, FIG. 1A illustrates two domains and two hierarchical layers, namely a domain layer and a cluster layer, however other embodiments may include various numbers of domains and more or fewer layers, as may be applicable for a particular network. The specific domain division and sub-division may be implementation-specific and based on network requirements.

FIG. 1A illustrates multiple physical network nodes (NNs) labelled NN 11 to NN 30. FIG. 1A further illustrates multiple network entities which are provided in the form of VN functions supported by computing resources 130. The network entities 140 to 146 are instantiated using the computing resources 130 such as reconfigurable in-network resources, or cloud or datacenter resources. The computing resources 130 may comprise, for instance, a data center, server, or virtualized cloud resources available to particular NNs. Generally, VN nodes are associated with a corresponding computing resource 130, and accordingly physical nodes that are not allocated computing resources 130 would not be allocated as VN nodes.

The illustrated network entities include SONAC entities 140 and CM entities including cluster CM entities 142, domain CM entities 144 and a global CM entity 146. Each network entity 140 to 144 may associate with the network node at which it is located. The global CM entity 146 may associate with another network node (not shown), or may be supported as a separate management node that manages and directs operations in the two Domains 110, 112.

The SONAC architecture formed of SONAC entities 140 is used for pre-configuring and managing VNs which include VN nodes associated with at least some of the network nodes. The SONAC may also manage operations of the physical network nodes NN 11 to NN 30. The interconnections between SONAC entities at different layers of the architecture are not shown for the sake of clarity. SONAC-Com functions supported by the SONAC entities 140 and CM functions supported by the CM entities 142, 144, 146 can be pre-realized before any service slice is defined and implemented. SONAC-Op can be pre-realized if it controls and manages all slice operations. Alternatively, a SONAC-Op can be created together with a service slice if the SONAC-OP is dedicated to that service slice.

The network infrastructure further includes a hierarchical connectivity management (CM) entity formed of CM entities 142 to 146. The interconnections between CM entities at different layers of the architecture are not shown for the sake of clarity. The CM entity may be configured to track current locations of end points such as UEs, and to provide such location information to network nodes and/or SONAC components as required.

The network infrastructure further includes RAN clusters 120, 122, 124, 126, which include multiple radio access network nodes ("access nodes") in a common area. The access nodes in the RAN cluster are interconnected via wired or wireless communication links. Alternatively, at least some access nodes may be provided in a non-clustered configuration. The access nodes may each include their own full or partial baseband processing infrastructure, and some or all of the baseband processing infrastructure may be shared by multiple access nodes. The access nodes may be provided with or without computing resources 130, or may share a set of computing resources 130 made available to multiple access nodes. RAN clusters can be used as part of the VN. Further, packets may in some cases be wirelessly transmitted to and from RAN clusters using multipath, multicast or broadcast transmissions.

Network node NN 31 is illustrated as an example of an edge node which is not part of a RAN cluster. NN 31 may be, for example, a gateway which is connected to the Internet or another external communication network. Further illustrated is an end point 128 such as a UE which wirelessly communicates with one or more of the edge nodes NN 16, NN 17 and NN 18 in RAN cluster 120. Further illustrated is an end point 129 such as a server, which communicates with the edge node NN 31, for example via the external network. Due to mobility, end point 128 may enter cluster 122 and connect to one or more associated edge nodes, such as NN 19 and/or NN 20.

Figure 1B:
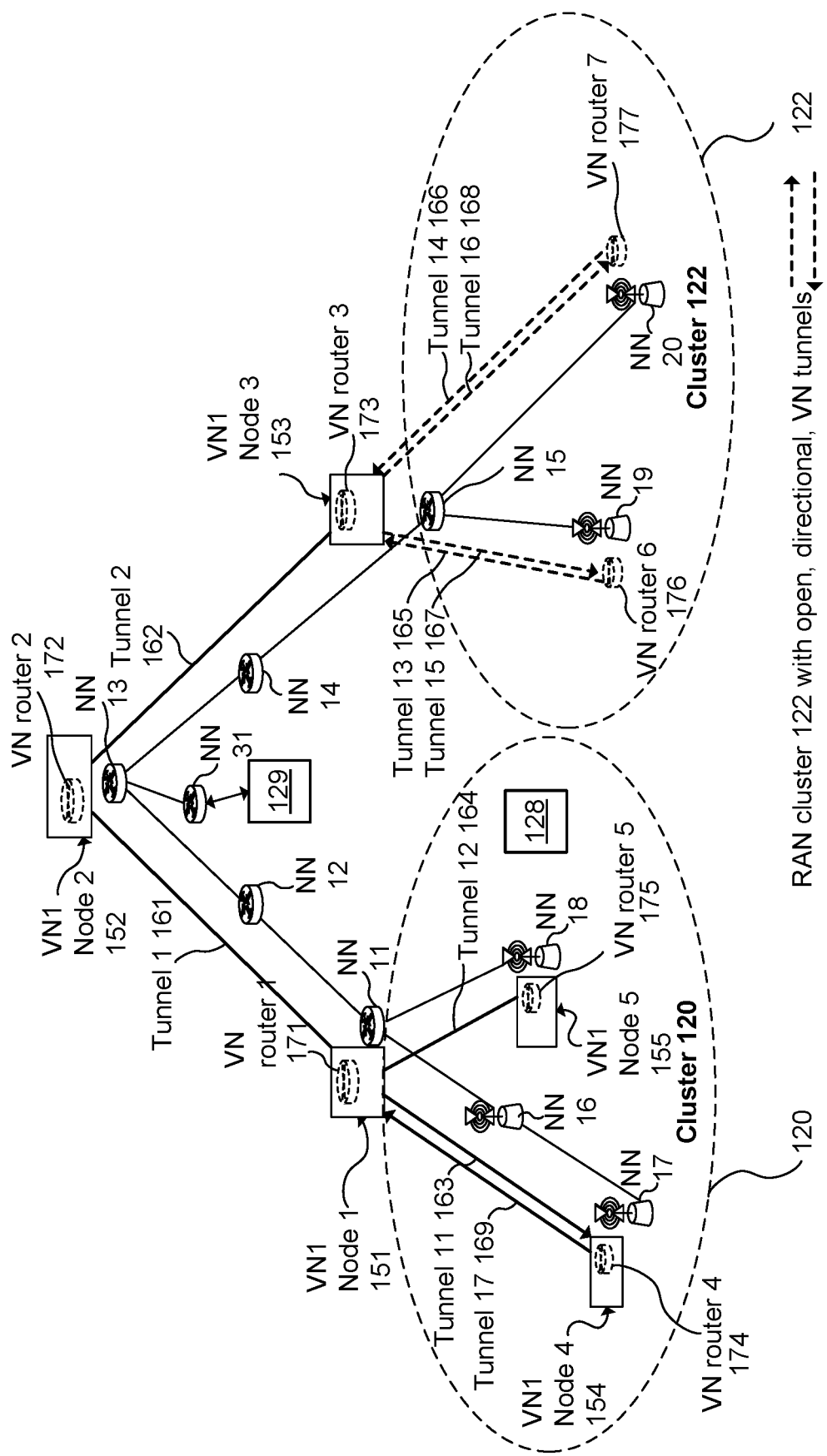
FIG. 1B illustrates configuration of a network according to embodiments of the present invention.

FIG. 1B, illustrates a VN having VN ID equal to one. This VN is referred to as VN1, to illustrate that multiple VNs may be supported. VN1 Nodes 1 to 5 151, 152, 153, 154, 155 are each associated with a corresponding one of the NNs. For instance, VN1 Node 1 151 associates with NN 11 and cluster 120, VN1 Node 2 152 associates with NN 13 and may further be assigned a cluster ID of 121 to indicate that it is outside of both cluster 120 and cluster 122, VN1 Node 3 153 associates with NN 15 and cluster 12, VN1 Node 4 154 associates with NN 17 (an access node) and cluster 122, and VN1 Node 5 155 associates with NN 18 (an access node) and cluster 120. The VN logical topology, including VN nodes and VN tunnels, is illustrated on top of the network infrastructure of physical network nodes and communication links.

VN tunnels 161, 162, 163, 164, 165, 166, 167, 168, 169 connect VN1 Nodes 1 to 5 151, 152, 153, 154, 155. For instance, tunnel 1 161 has an ingress at VN1 Node 2 152 and an egress at VN1 Node 1 151, tunnel 2 162 has an ingress at VN1 Node 2 152 and an egress at VN1 Node 3 153, tunnel 11 163 has an ingress at VN1 Node 1 151 and an egress at VN1 Node 4 154, and tunnel 12 164 has an ingress at VN1 Node 1 151 and an egress at VN1 Node 5 155. VN tunnels may be bi-directional, such as tunnel 1 161, or uni-directional, such as tunnel 11 163.

V-routers 1 to 5 171, 172, 173, 174, 175 are instantiated and each associated with one of VN1 nodes 1 to 5 151, 152, 153, 154, 155. V-routers 6 & 7 176, 177 and labelled as "VN routers 6 and 7" are instantiated and associated with network nodes NN 19 and NN 20, respectively. The v-routers may be instantiated using cloud-based or datacenter-based resources, for example. In some embodiments, v-routers may be instantiated at least partially using resources which are co-located with the physical network nodes.

The VN may support at least one service slice. In cases where a plurality of service slices are supported, an additional service identifier (service ID) may be used to differentiate between service slices handled by that VN. In the case where only one service slice is supported by the VN, then the service identifier can be omitted as the VN ID inherently identifies the service slice supported by that VN. End points are able to reduce signaling, because rather than specifying details of how the packet is to be treated, the service identifier (e.g. derived from packet characteristics) is used to trigger packet handling according to the service. This also allows for lower latency, because tunnel set-up, service function set-up, end point tracking infrastructure establishment, etc. are performed in advance, such that end points know handle to traffic directed toward a specified service. In addition, because service functions can be embedded in the network (even possibly at the edge nodes or in RAN clusters), data forwarding and associated latency and network resource usage can be reduced.

Pre-configuration of the VN according to various embodiments of the present invention are described as follows. The pre-configuration includes configuring logical VN tunnels between VN nodes. The pre-configuration includes configuring VN nodes as VN routers which are operative to route packets in a hop-by-hop manner between VN nodes using the logical tunnels. The pre-configuration includes the configuration of underlying physical network resources, such as network nodes, to provide the VN tunnels as part of the VN tunnel definition. The pre-configuration includes configuring edge nodes, such as network nodes, access nodes and/or gateway nodes, to identify packets associated with the service and to forward such packets toward the VN for handling, and/or to receive service packets from the VN and forward such packets toward designated endpoints. In other embodiments, one or more of the above pre-configuration operations may be omitted.

In some embodiments, the pre-configuration includes the configuration of VN nodes to implement some or all functions of the service, such as in-network data processing and in-network data storage or retrieval. For example, when the service involves processing of data transmitted by UEs in a certain manner, and providing results of this data processing to the UE or another UE, some or all of the processing may be done at VN nodes proximate to the network edge, thereby reducing service latency. The location of VN nodes performing in-network data processing and/or data caching can be selected based on criteria such as but not limited to: performance, cost, latency, communication overhead, and quality of service.

Embodiments provide for a method and apparatus for configuring a network to support delivery of a service to an endpoint associated with (e.g. subscribing to) the service. The apparatus may include, and the method may be performed by, a network entity such as a SONAC. Typically, the service is delivered to multiple endpoints, such as UEs, at different geographic locations. The configuration is performed prior to receipt of a request (by endpoints) for access to the service. Having reference to FIG. 2, the configuration includes providing 310 instructions to underlying resources to configure a VN. The VN configuration includes configuring 320 a plurality of VN nodes, each VN node associated with a respective physical network node of the network. The VN may be pre-existing or instantiated as part of the configuration.

Underlying resources may include, for example, configuration functions which operate to instantiate and/or configure other functions in the network, such as functions generating VN nodes. Underlying resources may include local agents or aspects of SONAC. Underlying resources may include computing resources configured according to computer program instructions to carry out predefined instructions.

Configuring the VN further includes configuring 330 logical VN tunnels to communicatively interconnect the VN nodes. A VN node at the endpoint of a logical VN tunnel can transmit a packet via the logical tunnel by providing the packet thereto using a variety of approaches, such as writing the packet to a predetermined memory location. Underlying physical network resources, such as network nodes, are configured to provide the VN tunnels as part of the VN tunnel definition. As such, a mapping between VN tunnels and underlying physical network resources used for conveying VN tunnel packets can be provided.

Configuring the VN includes instantiating 340 VN virtual routers (v-routers) which are associated with the VN nodes. The v-routers are configured to route packets between VN nodes via the logical VN tunnels. Packets may be routed toward a destination in a multi-hop manner by transmitting the packet to an intermediate v-router, and forwarding the packet from the intermediate v-router. Routing may be performed according to a name identifier of the routed packet, where the name identifier correlates to a destination endpoint whose location is being tracked and provided to the v-routers.

Tracking may be performed by one or more connection management functions, for example. The v-routers are virtualized functions and therefore are associated with physical network nodes and provided using configurable resources such as cloud-based resources. Packets transmitted by the end point and received by the edge node may specify a name identifier which is separate from and independent of the destination's location. The name identifier is or refers to a substantially unique name or identification number of the destination device, which is tracked by entities operating in the network, such as CM and v-router entities.

Configuring the network includes configuring 350 one or more edge nodes of the network to monitor for service-specific packets, i.e. packets which are associated with the service, and to submit such packets to the VN. In some embodiments, such packets may be identified by the inclusion of a service-related identifier, such as a VN ID or a VN ID in combination with a service ID. As such, edge nodes may be configured to monitor for an identifier contained in packets received at the edge node, the identifier associated with the service. Additionally, or alternatively, edge nodes may be configured to monitor for use of dedicated access link resources in transmitting packets to the edge node, the dedicated access link resources associated with the service. The packets may be submitted to the VN for example by forwarding the packets toward a VN node or v-router which is co-located with the edge node or located at another network node communicatively coupled to the edge node. Configuring the network may further include configuring 355 one or more of the edge nodes to receive packets from a VN node and to transmit such packets to a corresponding endpoint which is communicatively coupled to the edge node, and associated with the VN. The edge nodes may be configured to mark such packets as being associated with the service.

Embodiments provide a network configured according to the above-described method and/or using the above-described apparatus.

VN Configuration

As noted above, embodiments of the present invention involve configuration of a VN. The logical topology of the VN may be designed, and associated network functions can be instantiated or activated prior to its configuration. The configuration can include topological configuration and resource allocation configuration, for example as performed by the SDT-Com and SDRA-Com components of SONAC-Com, respectively.

As part of the VN configuration, SDT-Com may provide a description of the VN, including the VN nodes, VN logical topology, VN open logical topology, and endpoint Quality of Service (QoS) parameters.

The description of a VN node may include one or more of: a VN node ID, an identity (ID) of a physical network node to which the VN node associates, and an ID of a domain or cluster for which the VN node is the anchor point. The identity of the physical network node may indicate a physical location of the VN node and/or a network address of the network node, for example.

Logical tunnels interconnecting the defined VN nodes are provided and/or defined, for example by SDT-Com. To this end, and in various embodiments, a VN logical topology description and/or a VN open logical topology description are provided.

The VN logical topology description may include a set of logical VN tunnel IDs for all VN tunnels of the VN. For each logical VN tunnel, the description may indicate endpoint VN nodes of the tunnel, such as the VN node ID of a tunnel ingress point and the VN node ID of a tunnel egress point. QoS parameters of a tunnel may also be indicated in the description. QoS parameters may include, for example, tunnel data throughput parameters and tunnel process latency parameters.

The VN open logical topology description may include a set of logical VN tunnel IDs for all open VN tunnels of the VN. For each open VN tunnel, the description may indicate an endpoint VN node of the open tunnel, such as the VN node ID of a tunnel ingress or the VN node ID of a tunnel egress. When an ingress VN node ID is specified for an open tunnel, the destination network node ID (address) may also be specified. QoS parameters of an open tunnel may also be indicated in the description. Open VN tunnels may specify one of the VN nodes as a first endpoint of the open tunnel and allow another end of the open tunnel to be dynamically specified as a node of the network other than the VN nodes. The QoS of an open tunnel may specify the total throughput of a slice/service, and/or the latency of the open tunnel. The QoS parameters may be used by SDRA-Op at edge nodes (for example by an access link scheduler) during the VN/slice operation.

The endpoint or per-device QoS parameters may include parameters such as per-device data rates and latencies. The QoS parameters may indicate QoS requirements for providing adequate service to the endpoints. All endpoints may have the same QoS parameters or different endpoints may have different QoS parameters.

SDT-Com may further configure the SDT-Op component of SONAC-Op, as the SDT-Op component relates to the VN. SDT-Op can be used to support configuration and/or operation of the v-routers and VN tunnels. This aspect includes association of VN nodes to v-routers, for example by pairing VN node IDs with v-router IDs. This aspect further includes configuring VN tunnels, for example by associating a VN tunnel ID with an egress VN node ID (indicative of the VN node at the tunnel egress) and QoS parameters for the tunnel. This aspect further includes configuring open VN tunnels, for example by associating an open VN tunnel ID with an egress VN node ID which provides packets or a destination network node ID which receives packets. This aspect further includes configuring v-router routing tables, for example by associating destination VN node IDs (indicative of a VN node for which a routable packet is destined) with a next VN node ID (indicative of a VN node to forward the routable packet to as part of a multi-hop process for forwarding the packet toward the destination VN node). The destination VN node ID may further be associated with an endpoint for which the destination VN node acts as an anchor node.

VN virtual routers (v-routers) associated with VN nodes are defined and/or instantiated, for example by operations of SDT-Com and/or SDT-Op such as those described above. By way of such configuration, the v-routers are configured to route packets between VN nodes via logical tunnels.

The routing tables of v-routers may be pre-configured in a variety of ways. The routing table of a v-router may associate a packet's service-related identifier (such as a VN ID or a VN ID in combination with a service ID) and its name identifier with one of the logical tunnels accessible to the v-router, said one of the logical tunnels forming part of a multi-tunnel link to the packet destination. In some embodiments, the v-router is configured to adjust the associations, stored in its routing table, between logical tunnels and name identifiers based on a current location of a destination device corresponding to the name identifier. The current location of the destination device may be obtained via interaction with an appropriate connectivity manager (CM) entity.

In some embodiments, the routing tables may be provided in a two-part format. A first part of the routing table specifies associations between destination VN nodes and next logical tunnels to use for forward packets toward such destination VN nodes. A second part of the routing table specifies associations between destination endpoints (such as mobile UEs) and anchor VN nodes which are currently in communication with the destination endpoints. The two parts of the routing table may be provided as separate routing tables, which can be used together to route packets toward a specified destination endpoint via an associated anchor VN node.

The v-routers may thereby self-adjust routing operations based on tracked locations of mobile endpoints. As such, VN routing depends on endpoint location. VN routing, for example as performed collectively by multiple v-routers sequentially treating a packet in a multi-hop manner, may further include selecting an efficient VN tunnel path by which to route packets according to the service. The path selection may be adjusted based on a current location of the (potentially mobile) endpoint.

In some embodiments, a particular VN node may be designated as an anchor point of a mobile endpoint, based on proximity or registration of the endpoint with the VN node. VN routing then includes routing packets destined for the endpoint via the anchor point. V-routers may be pre-configured to route packets to VN nodes potentially acting as anchor nodes. The v-routers may further be pre-configured to receive and store associations between endpoints and anchor points as these associations are dynamically provided, and to route packets toward designated endpoints by routing them toward the anchor points associated with the designated endpoints. A VN node may be designated as an anchor point for a domain or RAN cluster, for example. Anchor points may track endpoints which are reachable from the anchor point and cause packets to be forwarded to these endpoints.

As another part of the VN configuration, v-routers may be associated with a CM entity. In some embodiments, each v-router may be associated with one or more CM components of a hierarchical CM entity. The association may be performed by SDT-Com, and may include associating a v-router ID with a CM ID indicative of a particular CM component. The association is used for providing location information from the CM to the v-routers, for example. The CM entity may have multiple hierarchical levels, and a v-router may be associated with one or more of these levels. An association may involve configuration of one or both of the v-router and the CM component to communicate via control messaging. The v-routers are configured to update routing tables based on CM input. Routing tables, establishment and tear-down of virtual links can be updated based on endpoint location and activity information derived from CM input.

The CM entity may also be pre-configured to track the location of mobile endpoints and provide location information to v-routers. The CM entity can be provided as a tree hierarchy of local to more global CMs, which cooperate to provide location updates. When a lower-level CM lacks current location information, it may query a higher-level CM. When a higher-level CM registers a location update, it may pass the update to lower-level CMs immediately, on a schedule, on a trigger, or upon request. V-routers may request location updates from the CM entity and/or the CM entity may provide location updates to v-routers as they are registered by the CM.

As another part of the VN configuration, a QoS definition of the VN tunnels is provided, for example by SONAC-Com. Topology of the VN can be configured based on statistics of data traffic attributes, geographic distribution of end-points and quality requirements. SONAC-Com may determine the QoS of a VN tunnel by estimating the number of devices which will exchange data traffic via the tunnel, and also estimating the integrated rate requirement of the VN tunnel based on per device traffic attributes. Similarly, for a RAN cluster, the QoS of a tunnel or open tunnel may be defined based on data traffic statistics. Alternatively, in some embodiments, a VN tunnel definition may not explicitly indicate QoS. In this case, a VN tunnel may be defined only by its ingress VN node ID and egress VN Node ID.

In some embodiments, a service supported by a VN may involve transmission of more than one type of packet, with each type of packet requiring different treatment by the VN. For example, different packet types may have different QoS requirements, sizes, traffic characteristics, service function requirements, or routing requirements. To differentiate between different packet types of a single service, a packet type ID or priority header can be used. Each different packet type may be assigned a different ID or header, which is included in packets having the corresponding type. The VN may be pre-configured to monitor for and recognize such IDs or headers and treat packets according to type.

Following configuration of the logical VN, for example by operation of SDT-Com as described above, logical tunnels are mapped to physical network resources. This resource mapping is performed as part of the provision of the logical tunnels interconnecting the VN nodes. The resource mapping can be carried out for example by the SDRA-Com component of SONAC-Com.

In various embodiments, each logical tunnel may be associated with one or multiple physical paths and one or multiple hops through the network. Packets transmitted via a logical tunnel thus traverse one (or more) of the physical paths and may be received and forwarded by intermediate physical network nodes, thereby undergoing multiple hops. For each logical tunnel of a VN, SDRA-Com is configured to determine the association between logical tunnels and physical resources, which may be in the form of a mapping format as described below. SDRA-Com is further configured to direct configuration of the underlying physical network nodes (NNs) to implement the logical tunnels.

There are multiple possible mapping formats, examples of which include an IP-like routing format, a source-based routing format, a destination-based routing format, and a dedicated resource-based routing format. The NNs may be configured with an indication of the mapping format being used. For destination-based routing, each NN may be configured to implement a forwarding rule which, based on a packet having a given service-related identifier ID, specifies a name identifier, a QoS requirement, and a next-hop NN ID corresponding to the next NN designated to receive the packet. For dedicated resource-based routing, each NN may be configured to implement a forwarding rule which, based on a packet having a given service-related identifier, specifies a dedicated communication resource which is to be used to forward the packet. Dedicated resources may be a lambda or sub-spectrum frequency band, for example.

In various embodiments, edge nodes (such as radio access nodes) communicating with endpoints (such as UEs) via radio access links can use either dedicated communication resources or shared communication resources for the purposes of transmitting and receiving packets of the supported service. In some embodiments, dedicated communication resources may be dedicated to a specific set of UEs and/or services, but may nonetheless be shared between such a set. Communication resources, also referred to as air interface resources, may include, for example, time slots, frequency bands, and/or spreading codes.

As such, when the NN being configured is an edge node which communicates with an endpoint via a radio access link, the mapping format may be a dedicated resource format or a shared resource format. For the dedicated resource format, a NN may be configured to associate a specified service-related identifier (e.g. VN ID and/or service ID) with a specified set of access link resources to use in transmitting and/or receiving packets according to the associated service. For the shared resource format, a NN can be configured with an indication that no dedicated access link resources are assigned, or alternatively the NN may utilize shared access link resources for transmission and reception by default.

In various embodiments, the SDRA-Op component of SONAC-Op is configured. The configuration of SDRA-Op may be considered to be an operation of the VN configuration in general, and of SDRA-Com in particular. That is, SDRA-Com may configure SDRA-Op. Aspects of this configuration are described below.

During operation of the VN, SDRA-Op assigns resources to handle data packets exchanged between endpoints. To support this function, embodiments pre-configure SDRA-Op based upon the QoS requirements for VN tunnels handled thereby, as well as potential QoS differences between packet types. For example, SDRA-Op may be configured to assign resources of the physical network, such as communication spectrum of communication links, and communication and computing operations of network nodes, according to predetermined rules. SDRA-Op may operate at the transport network, RAN clusters, and access links of the communication network, for example, in order to configure mapping rules used for mapping between VN tunnels and physical infrastructure of the communication network. Multiple mapping rules may be available for configuration and/or selection. Resource assignment by SDRA-Op may be ongoing, for example in order to satisfy QoS requirements given rate requirements and traffic levels. The rules used by SDRA-Op to assign resources may be configured by SDRA-Com. Physical network resources can be allocated to support a VN tunnel (and/or VN node) based on QoS requirements of the VN and estimates of amounts of data traffic associated with the service which is expected at the VN tunnel.

In some embodiments, when a VN tunnel is supported by multiple parallel physical communication links, SDRA-Op may allocate traffic to the multiple paths, for example via traffic engineering.

In various embodiments, as part of SDRA-Op configuration, RAN cluster resource allocation is configured. The integrated rate requirement at a RAN cluster (service level) is estimated and indicated (e.g. by SDRA-Com) to an instance or portion of SDRA-Op. SDRA-Op is configured to assign resources to connected endpoints based on the estimated integrated rate requirement, in order to meet a specified service level QoS without over-provisioning resources. Further, for an access link, a per-device service requirement may be indicated to the access nodes such that the access link (AL) scheduler determines appropriate resource assignments for the connected devices.

In various embodiments, the SDRA-Op associated with a RAN cluster is configured based on one or both of: an aggregated data rate experienced or expected to be experienced by a RAN cluster, and per-device QoS requirements for devices serviced by the RAN cluster.

Once the VN has been configured, including the provision of logical tunnels and the configuration of v-routers, the VN is available to serve endpoints such as UEs and/or servers that initiate connection to the VN in a hop-on operation.

FIGS. 3A, 3B, 4A, 4B, 5A, 5B, 6A, 6B, and 7 illustrate VN configuration according to an example embodiment of the present invention. The VN is configured using the network resources illustrated in FIG. 1. FIGS. 3A, 3B, 4A, 4B, 5A, 5B, 6A, 6B, and 7 can be illustrative of a sequence of steps for defining the VN according to the example embodiment. That is, the VN description is generated in FIG. 3A, the v-router tunnel configuration is established in FIG. 4A, the VN routing table configuration is performed in FIG. 5A, the mapping between logical tunnels and physical network resources is performed in FIGS. 6A & 6B, and SDRA-Op is configured in FIG. 7. The figures are described in further detail below.

As will be seen in FIGS. 3A, 3B, 4A, 4B, 5A, 5B, 6A, 6B, and 7, embodiments of the present invention comprise providing a description of VN nodes, including their associations with physical network nodes. Embodiments further comprise providing a description of VN tunnels interconnecting VN nodes, and a QoS description of the VN tunnels. Embodiments further comprise associating v-routers with the VN nodes. Embodiments further comprise associating v-routers with VN tunnels and indicating, at each v-router, an egress VN node for each outgoing tunnel. Embodiments further comprise configuring v-router routing tables, including associating possible destination node IDs with outgoing VN tunnels to be used in forwarding packets toward such destination node IDs. Embodiments further comprise configuring network nodes to forward packets designating an ID of a particular tunnel (or destination network node ID) to a designated next network node, the designated next network node forming a next hop in a network path of the tunnel. Embodiments further comprise configuring network nodes to handle packets in accordance with a desired QoS level. Embodiments further comprise selecting whether one or more access nodes are to use dedicated and/or pre-assigned access link resources to transmit and/or receive packets according to the service, and/or selecting whether one or more access nodes are to perform service-based or device-based resource assignment. Embodiments further comprise identifying and configuring access links to use dedicated and/or pre-assigned access link resources and/or to perform service-based or device-based resource assignment.

Figure 3A:
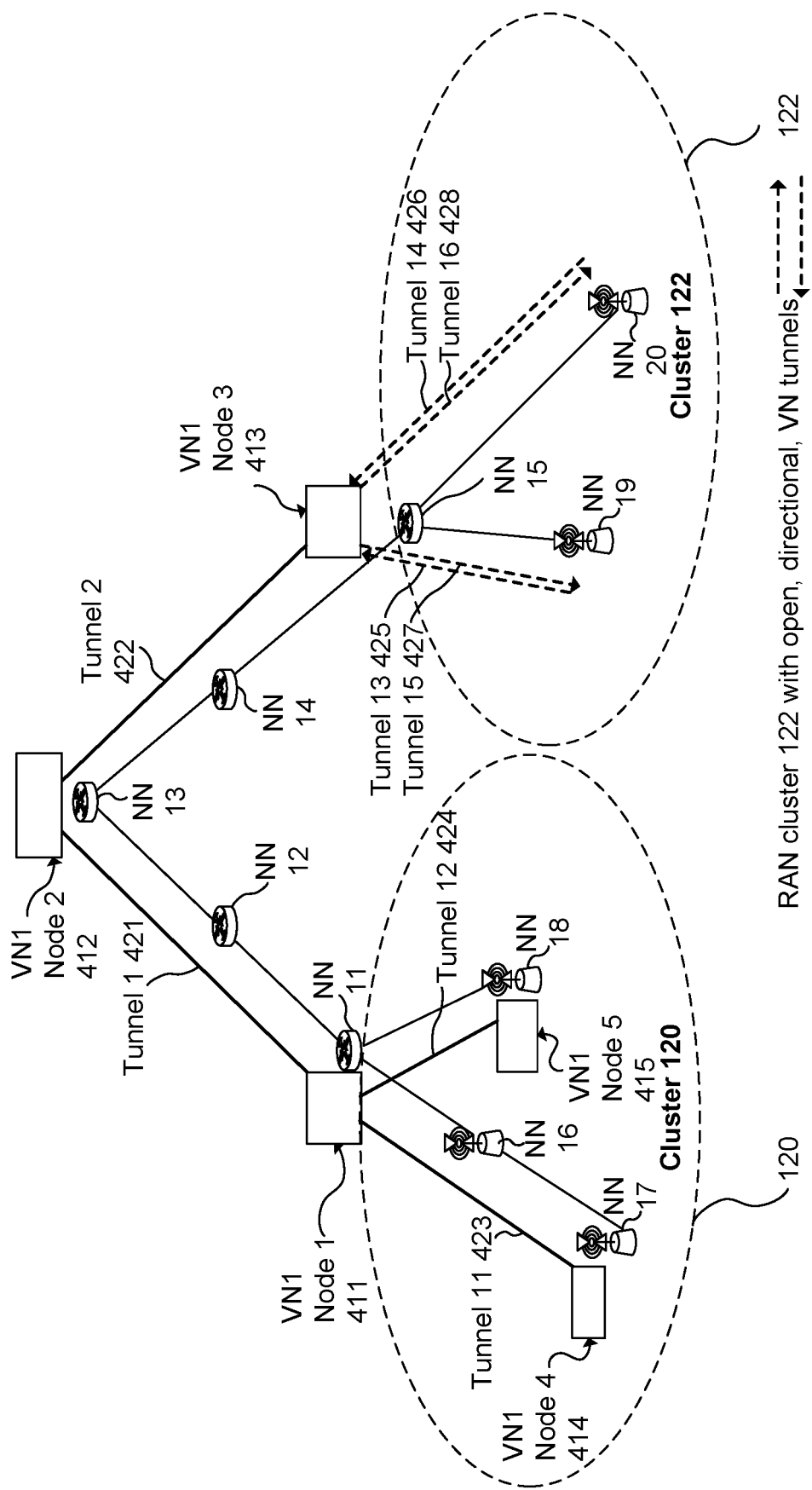

FIG. 3A illustrates a description of a VN having VN ID equal to one. This VN is referred to as VN1, to illustrate that multiple VNs may be supported. VN1 Nodes 1 to 5 are described as follows. VN1 Node 1 411 associates with NN 11 and cluster 11, VN1 Node 2 412 associates with NN 13 and may further be assigned a cluster ID of 10 to indicate that it is outside of both clusters 11 and 12, VN1 Node 3 413 associates with NN 15 and cluster 12, VN1 Node 4 414 associates with NN 17 (an access node) and cluster 11, and VN1 Node 5 415 associates with NN 18 (an access node) and cluster 11. The VN logical topology, including VN nodes and VN tunnels, is illustrated on top of the network infrastructure of physical network nodes and communication links.

Figure 5A:
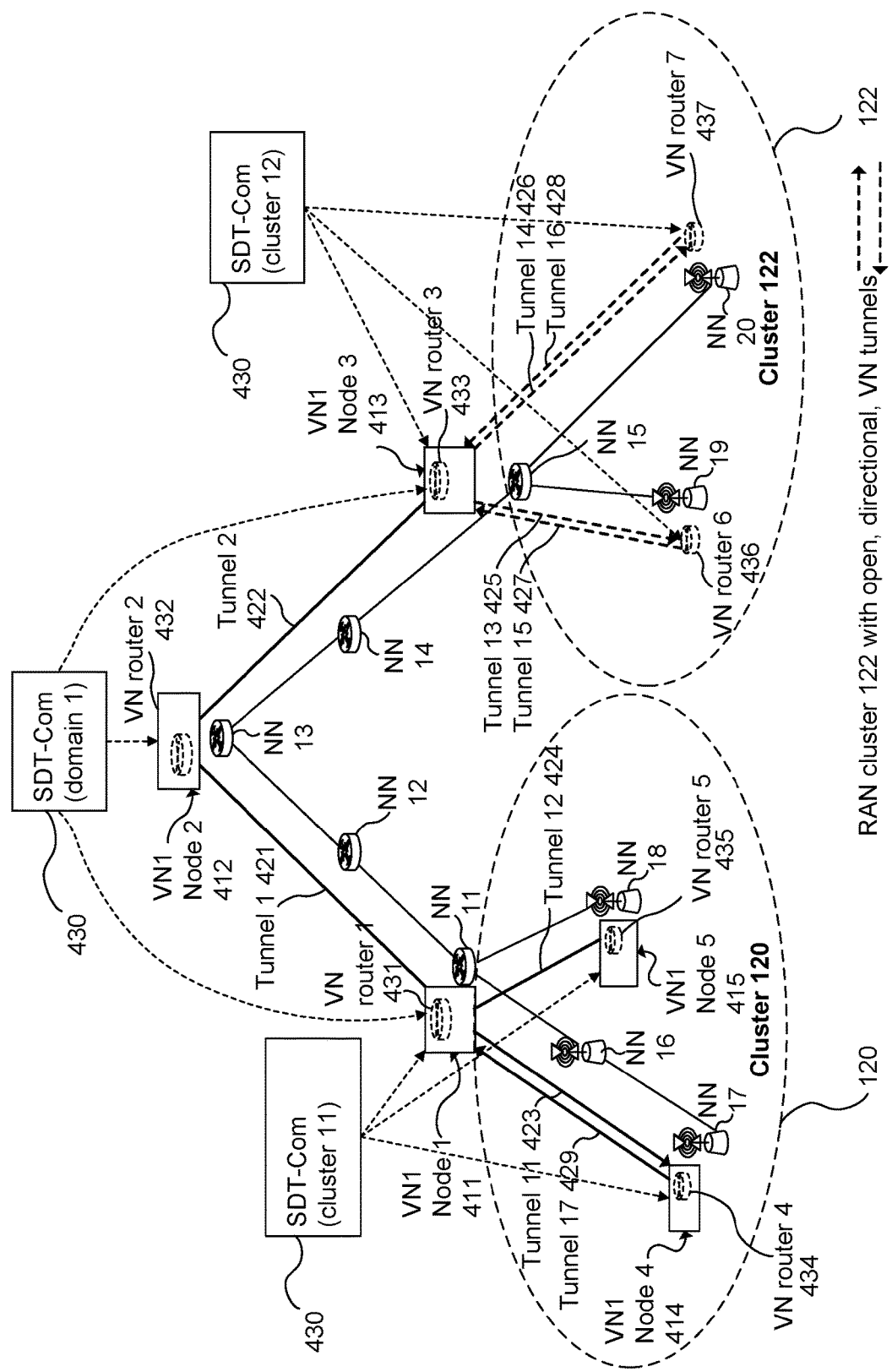

VN tunnels are also described as follows. Tunnel 1 421 has an ingress at VN1 Node 2 412 and an egress at VN1 Node 1 411, tunnel 2 422 has an ingress at VN1 Node 2 412 and an egress at VN1 Node 3 413, tunnel 11 423 has an ingress at VN1 Node 1 411 and an egress at VN1 Node 4 414, and tunnel 12 424 has an ingress at VN1 Node 1 411 and an egress at VN1 Node 5 415. Only one direction of (non-open) VN tunnels is illustrated, however tunnels for packet flow in the opposite direction may also be provided. For example, FIG. 5A illustrates tunnel 17 which has an ingress at VN1 Node 4 414 and an egress at VN1 node 1 411. Open tunnel 13 425 has an ingress at VN1 Node 3 413 and routes packets to a destination of NN 19, open tunnel 14 426 has an ingress at VN1 Node 3 413 and routes packets to a destination of NN 20, open tunnel 15 427 has NN 19 as its source and routes packets to a destination of VN1 Node 3 413 as egress, and open tunnel 16 428 has NN 20 as its source and routes packets to a destination of VN1 Node 3 413 as egress.

Referring to FIG. 3B, example tunnel, device, VN node, and open tunnel descriptions for VN1 are listed. VN1 device, tunnel, and open tunnel QoS descriptions are also provided. The device QoS description may include a data rate (e.g. 500 kbps) and a latency (e.g. 100 ms). The device QoS description may be global for all VN1 devices or the device QoS description may differ between devices. Each tunnel QoS description, and optionally the open tunnel QoS descriptions, may include at least a data rate.

Figure 4A:
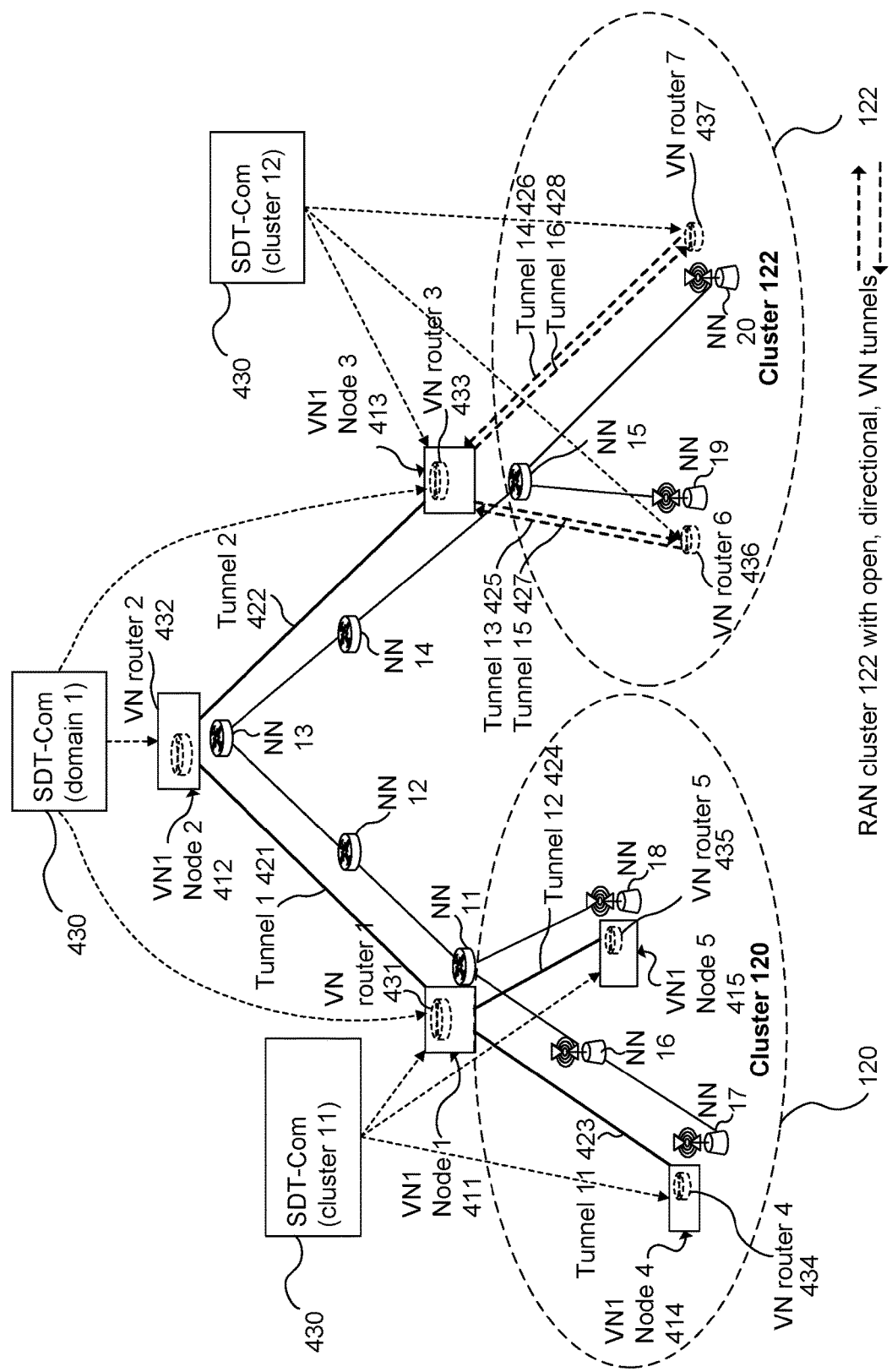
FIGS. 4A & 4B illustrate another aspect of configuration of the network of FIG. 1, including virtual network router and tunnel configuration.

FIG. 4A illustrates a tunnel configuration of v-routers associated with SDT-Op. The configuration may be performed by appropriate elements of SDT-Com 430, which are functionalities of SONAC. Depending upon the implementation, there may be a centralized SDT-Com 430, or there may be separate domain and cluster level SDT-Com 430 as illustrated in FIG. 4A. V-routers 431 to 435 and labelled as "VN router 1 to 5" are instantiated and associated with VN1 nodes 1 to 5 (411 to 415), respectively. V-routers 436 and 437 and labelled as "VN routers 6 and 7" are instantiated and associated with network nodes NN 19 and NN 20, respectively. The v-routers 431 to 437 are handled by SDT-Op, and therefore the instantiation of v-routers and their association with nodes corresponds to an association of VN1 with SDT-Op. The v-routers may be instantiated using cloud-based or datacenter-based resources, for example.

Figure 4B:
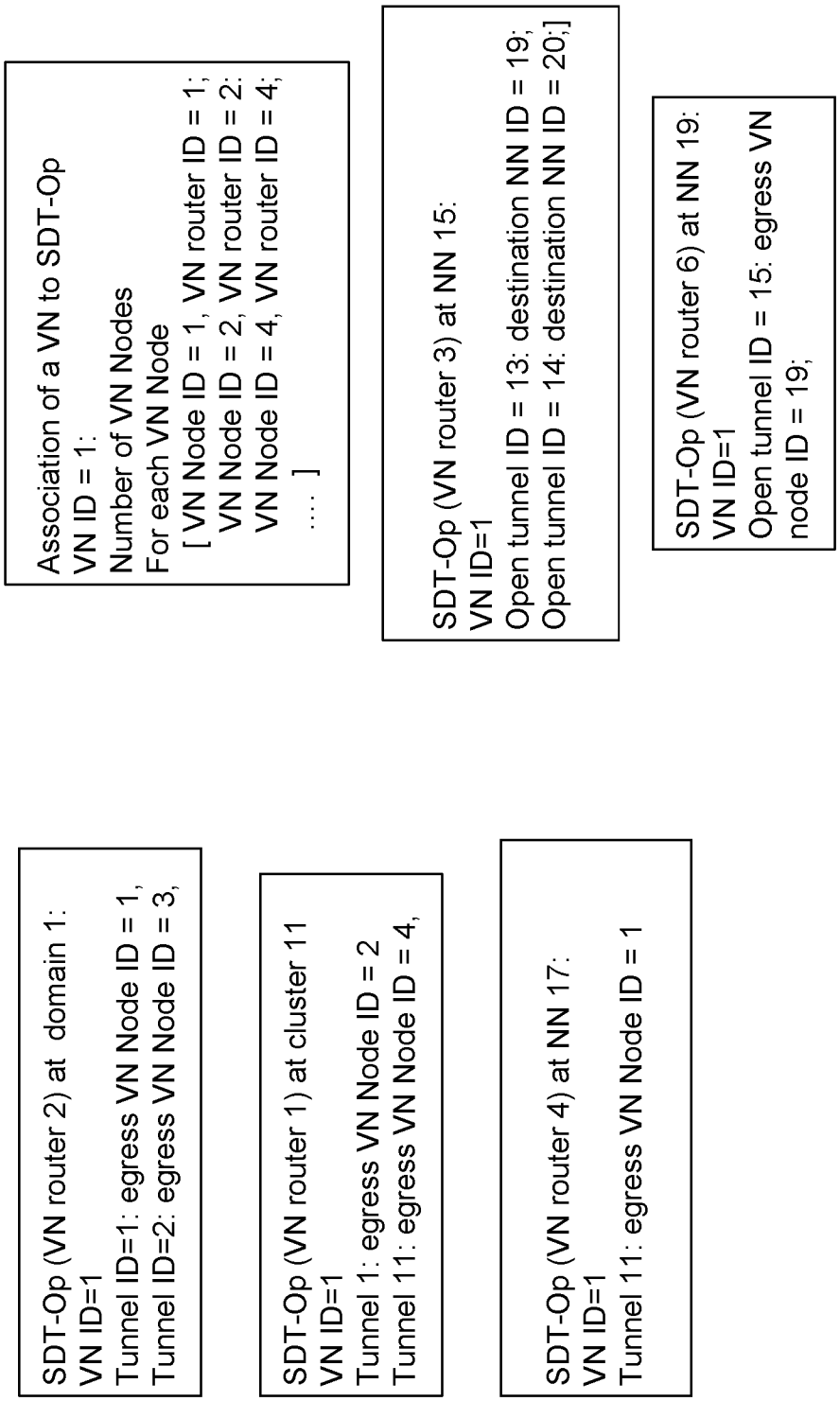

Referring to FIG. 4B, the v-routers and/or the v-router aspects of SDT-Op are associated with VN tunnels as follows. For each v-router, the tunnels which terminate at the VN node associated with that v-router are specified as part of the VN router definition held by SDT-Op, and the egress VN node or destination network node (in the case of an open tunnel) is also specified in this definition. For example, v-router 1 431 is associated with tunnel 1 421 and tunnel 11 423, the egress of tunnel 1 (i.e. VN1 Node 2 412) is specified to v-router 1 by way of an identifier number, and the egress of tunnel 11 (i.e. VN1 Node 4 414) is specified to v-router 1 431 by way of another identifier number. As another example, v-router 3 433 is associated with open tunnel 13 425 and open tunnel 14 426, and the destination network node IDs of open tunnels 13 and 14 (i.e. NN 19 and NN 20) are specified to v-router 3.

FIG. 5A illustrates the configuration of a VN routing table of v-routers as defined in FIGS. 4A & 4B. The configuration may also be performed by appropriate elements of SDT-Com 430. For each v-router, the routing table associates destination VN Node IDs with a VN tunnel to be used to reach that destination VN node. When a v-router receives a packet specifying a given destination VN node ID, the v-router submits the packet to the corresponding logical tunnel for forwarding toward that destination VN node. The routing table is populated so that all VN nodes reachable from the v-router are associated with at least one VN tunnel. For example, for VN1 v-router 432 labeled VN router 2, destination VN nodes 1, 4 and 5 411, 414, 415 are associated with tunnel 1 421 in the routing table and destination VN node 3 413 is associated with tunnel 2 422. FIG. 5B illustrates various v-router routing table information, including associations between destination VN node IDs and next tunnel IDs.

In this example, separate directional tunnels are provided to support VN router 4 434 at NN 4 414. In this example, tunnel 11423 supports all VN1 traffic to VN router 4 434, and new tunnel 17 429 carries all VN1 traffic from VN router 4 434 to the next node, Node 1 411.

Figure 6A:
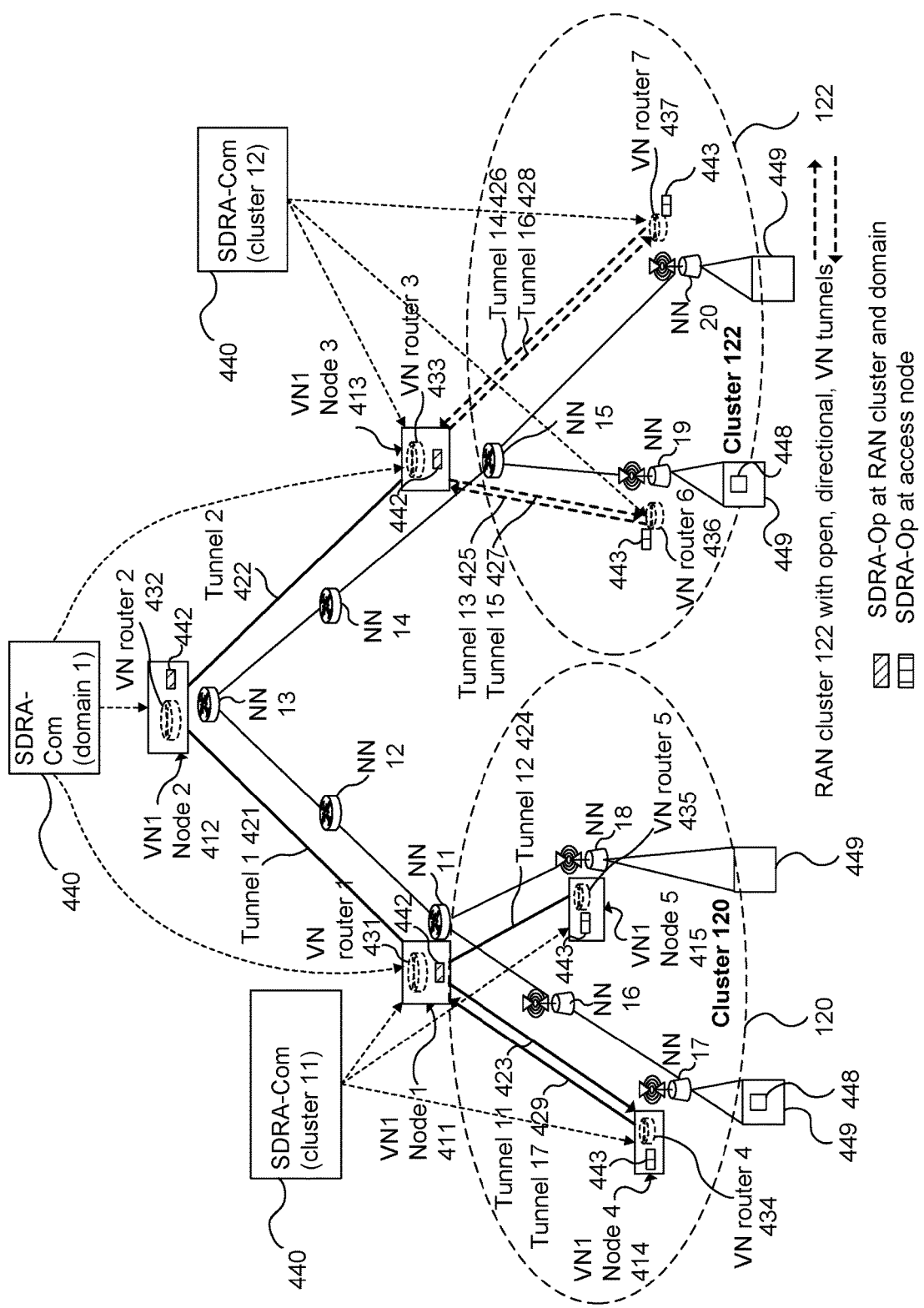
FIGS. 6A & 6B illustrate another aspect of configuration of the network of FIG. 1, including mapping between virtual network tunnels and physical network resources.

FIG. 6A illustrates a defined VN including mappings of logical tunnels to physical network resources. The mapping to physical resources may be performed by appropriate elements of SDRA-Com 440. As illustrated, SDRA-Com 440 configures elements of SDRA-Op (e.g. associated with v-routers) at the RAN cluster 442 and domain levels 443. SDRA-Com 440 may also configure physical network nodes which are not necessarily associated with a VN node (e.g. NN 16).

Figure 6B:
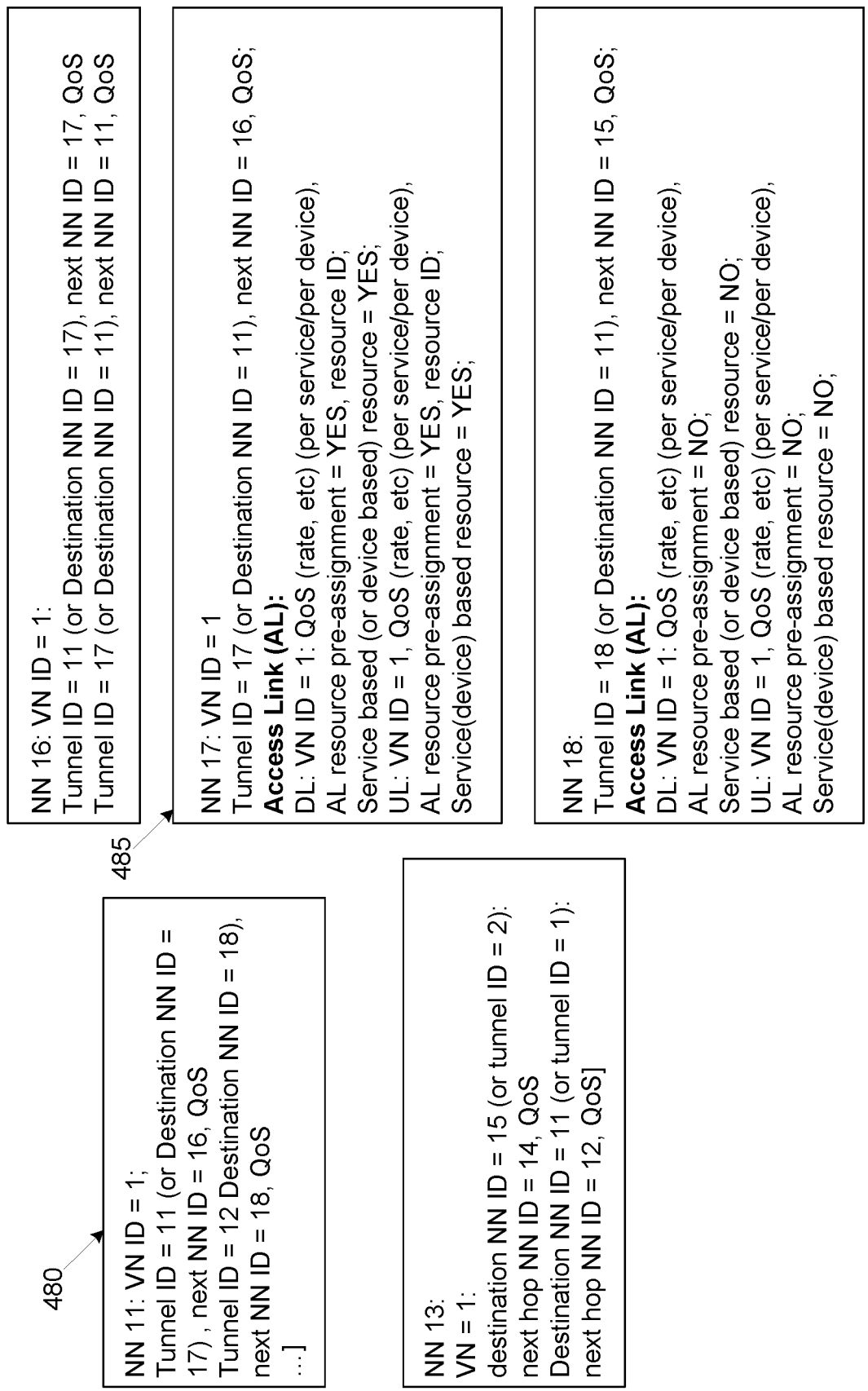

Referring to FIG. 6B, the configuration at this level includes specifying, for a given physical network node, and for a given VN tunnel supported by the given physical network node, an identity of at least one next physical network node (communicatively coupled to the given physical network node) which the given physical network node is to forward packets to in order to support communication via the VN tunnel. The VN tunnel may be specified by its identifier, or alternatively using a destination network node identifier at the tunnel endpoint (egress). As such, physical network nodes are provided with an indication of which next physical network node to forward packets to when such packets specify a particular VN tunnel passing through that physical network node. The configuration also specifies QoS parameters for each physical network node and VN tunnel.

For example, as illustrated in box 480 of FIG. 6B, at network node NN 11 and for VN ID number one, tunnel 11 423 and/or destination node NN 17 is associated with a next-hop network node ID of NN 16 and tunnel 12 424 and/or destination node NN 18 is associated with a next-hop network node ID of NN 18.

As also illustrated, SDRA-Com 440 configures elements 443 of SDRA-Op at the access node level. The configuration of access nodes also includes specifying associations between VN tunnels (and/or destination nodes) and next physical network nodes used to forward packets in order to support communication via the VN tunnel, as described above. The configuration of access nodes may further include specifying access link resources to use for communicating packets associated with the VN being configured. The specified access link resources may be dedicated to the VN. As such, an access node may be configured to use dedicated access link resources for scheduling and/or transmitting uplink, and/or downlink packets corresponding to a service supported by the VN. Both uplink and downlink access link resource assignments may be specified, either together or separately.

Specifying access link resources may include specifying QoS parameters such as data rates (or data rate guarantees) and whether QoS is allocated on a per-service or per-device level. Specifying access link resources may also include specifying whether or not access link resources are to be pre-assigned, and if so, a resource ID corresponding to the pre-assignment. Specifying access link resources may also include specifying whether or not service-based (or device-based) resource assignments are to be used. Other access link resource specifications may be made, including waveform parameters for use in transmission, spectrum resources to be used and other such physical parameters of the access link. In the case of service-based resource assignment, broadcast transmission can be utilized for downlink traffic to reduce signaling overhead, compared to per-device-based access link resource management.

As an example, for NN 17 and VN1, and as illustrated in box 485 of FIG. 6B, access link resources may be specified as follows. For the downlink and uplink, pre-assignment of access link resources may be used, and an appropriate resource ID may be specified. Implementation of service-based or device-based resource allocation may also be specified.

In some embodiments, the above-described configuration of access nodes may cause the access nodes to utilize certain specific sets of time, frequency and/or spreading code resources to wirelessly communicate packets to endpoints, when such packets are associated with a service supported by the configured VN. These resources 448 may be a subset of all available resources 449.

Figure 7:
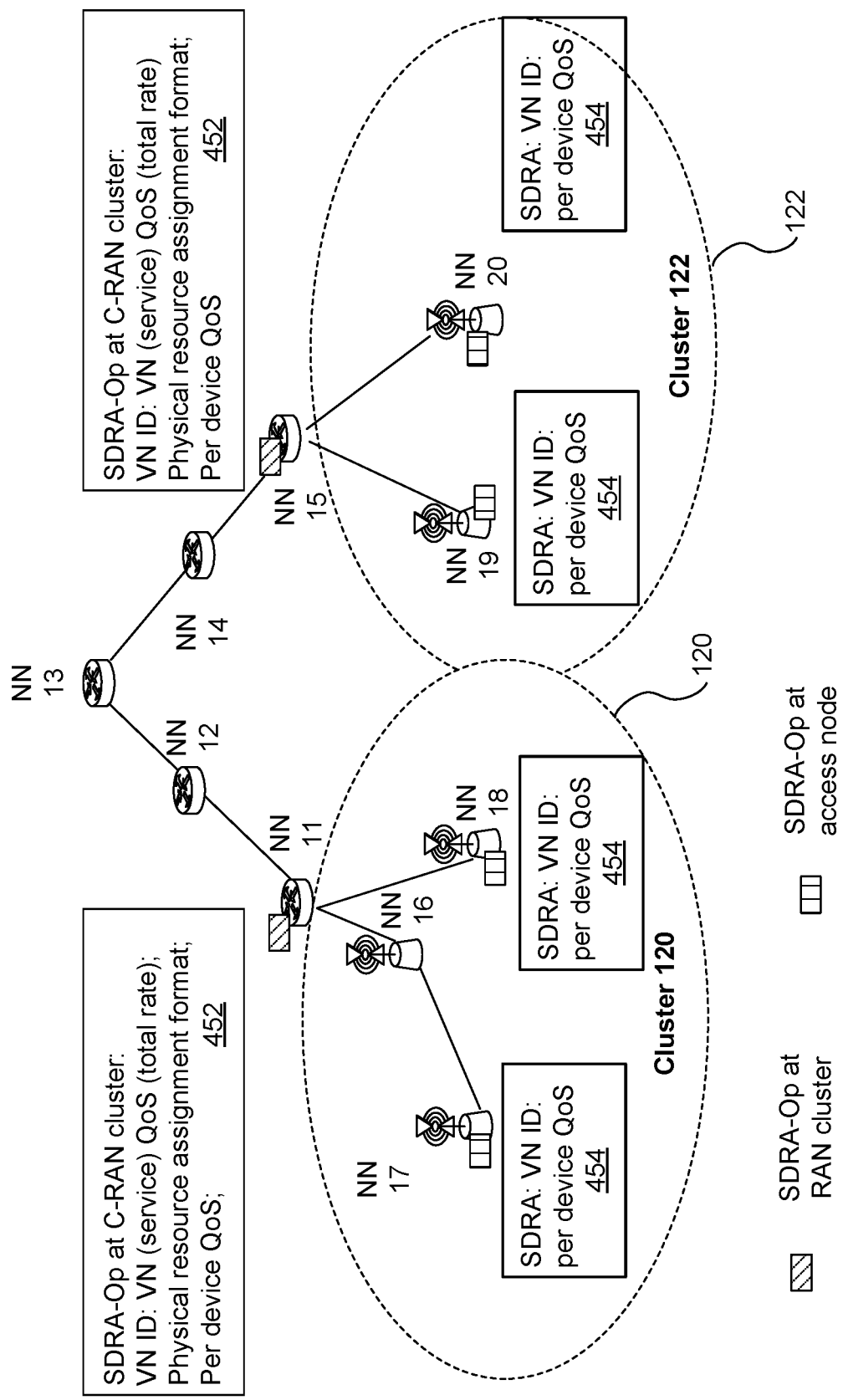
FIG. 7 illustrates another aspect of configuration of the network of FIG. 1, including configuration of a resource allocation management function.

FIG. 7 illustrates a defined VN including configuration details of SDRA-Op. In particular, SDRA-Op is configured (e.g. by SDRA-Com) at the RAN cluster level to specify 452, for each VN (designated by a VN ID such as VN1), one or more of: a supported service, QoS parameters such as a total data rate, a physical resource assignment format, and per-device QoS parameters. At the access node level, SDRA-Op is configured to specify 454 per-device QoS parameters for each VN.

As stated above, various embodiments of the present invention provided for the configuring of edge nodes of the network to monitor for a packet which is associated with a service (e.g. by inclusion of a service-related ID), and to submit the packet to the VN for handling thereby. The configuration may include, for example, configuring a function which associates with an edge node and which monitors headers and/or payloads of packets received by the edge node from endpoints. The function may be implemented at the edge node or remotely from the edge node, for example using cloud-based or datacenter resources. Configuration of the edge node may be performed by configuring a VN node which is associated with (e.g. logically co-located with) the edge node.

In some embodiments, edge nodes are provided, during pre-configuration, with one or more service-related identifiers IDs, and configured to monitor packets for occurrence of such identifiers. The identifier or identifier being monitored for is associated with a service supported by the VN. Each edge node may also be configured to submit such packets to a designated VN node, which may be associated with the edge node or communicatively linked to the edge node, for example via an open tunnel.

In some embodiments, edge nodes are configured to recognize service related IDs, such as name identifiers, VN IDs and/or service IDs, and to configure the packet for handling by the appropriate VN prior to submission thereto. The configuration of the packet may include inserting header information or encapsulating the packet, for example. In one embodiment, the received packet includes a unique name identifier as the service-related identifier, and the edge node looks up the VN used to reach the node having the name identifier, and then inserts the VN ID of this VN into the packet.

In some embodiments, edge nodes, such as radio access nodes, are configured to use dedicated access link resources for transmitting and/or receiving packets corresponding to the service, the packets transmitted toward and received from the endpoint. Access link resources may include time slots, frequency bands, and/or spreading codes used for wireless multi-access communication. Use of such dedicated access link resources may include one or more of: transmitting using the resources, monitoring for reception of packets transmitted using the resources, specifying in a transmission scheduling request that the resources are to be used, and scheduling transmission according to the resources. In other embodiments, edge nodes are configured to use shared access link resources for transmitting and/or receiving packets corresponding to the service. The configuration of edge nodes to use dedicated or shared access link resources may be performed by SDRA-Com.

In some embodiments, rather than or in addition to forwarding packets to the VN based on a service-related identifier contained therein, an edge node may be configured to forward packets to the VN based at least in part on the access link resources used to transmit the packet to the edge node. For example, when an endpoint uses certain dedicated access link resources to transmit packets according to the service, the edge node may automatically determine that a packet belongs to the service when it is transmitted using such dedicated resources, and accordingly forward the packet toward the VN associated with the service.

In some embodiments, pre-configuration includes specifying different access link resources (e.g. time, frequency and/or spreading code resources) to be used by endpoints for accessing different services. Endpoints then use the access link resources assigned to the desired service. In other cases, endpoints request access to a specified service over a channel used for that purpose, and access nodes (or schedulers) respond by indicating the appropriate access link resources to use.

Embodiments of the present invention comprise pre-configuring the edge nodes and/or VN to perform admission control prior to allowing an endpoint to transmit and receive data packets of the service via the VN. Admission control may be used on a case-by-case basis, and may be omitted in some embodiments. According to admission control, when an endpoint requires use of a service (e.g. to download or stream data, or to begin a communication session with another endpoint), an admission control procedure is performed in an attempt to obtain authorization for the endpoint to use the service. Admission control may be used for example when authentication of endpoints is required, or when delivery of the service requires significant resource usage, and a determination of whether sufficient resources are available is to be made prior to service delivery. Admission control may be required, for example, when the service involves bulk data transmission over a VN with limited capacity.

The admission control operation according to some embodiments is as follows. Before an endpoint such as a UE connects to the VN, the endpoint transmits a service request to an admission control entity supervising the VN. The admission control entity determines whether to allow the endpoint to use the service and, if so, transmits an authorization to the endpoint. The authorization may further be provided (by either the admission control entity or the endpoint) to an edge node, VN node or v-router to inform same of the authorization. In some embodiments, the edge node transmits the service request on behalf of the endpoint. The admission control entity, edge node, VN node and/or v-router are configured to carry out this admission control procedure. The admission control entity may be instantiated using cloud resources as part of the pre-configuration, and may be associated with one or multiple edge nodes, for example.

Endpoints may register to the VN to indicate a present or future requirement to access to the service. Upon or after the registration operation, the endpoint receives a service-related identifier which is usable in packets to specify that such packets are to be treated by the VN and service. The endpoint may further receive a radio ID (similar to a MAC ID in 3G and 4G wireless networks) which is usable in access link resource assignment procedures. After registration, an endpoint may be associated with a VN Node. When an endpoint is associated with a VN Node, this VN node becomes an anchor point of the endpoint in the VN. Packets destined for the endpoint may be routed to the anchor point via the VN tunnels and then transmitted from the anchor point to the endpoint. The anchor point may change due to endpoint mobility. The association of an endpoint to a VN Node may be determined based on the endpoint's MAC state, mobility velocity, and other network requirements. This association between an endpoint and a VN node can be viewed as logical tunnel between the endpoint and the VN Node.

Various embodiments of the present invention include configuring protocols to be used by VN nodes, edge nodes, end points, services and/or applications. SDP-Com may be used to configure protocols used in the network slice, while SDP-Op may be used to support protocol selection for a device and/or application, for a selected tunnel given by SDT-Op. SDP may be used to manage end-point protocol configuration and tunnel protocol configuration. SDP-Com may configure some or all of: end-to-end protocols used between end points such as UEs and servers, per-tunnel protocols for non-RAN cluster tunnels, RAN cluster tunnel protocols, and link protocols used in RAN clusters, e.g. in association with tunnels or open tunnels. Further, SDP-Com is used to configure SDP-Op. For example, SDP-Com may configure, in SDP-Op, rules regarding per-device packet transmission protocols to use without violating service-level protocol configurations.

Embodiments provide for an apparatus for configuring a network to support delivery of a service to an endpoint associated with the service. Having reference to FIG. 8, the apparatus 600, which may be SONAC or components thereof, generally includes a computer processing element (s) 610, memory 620 and a communication interface 630 such as a network interface. However, it should be understood that the apparatus may be provided using network function virtualization, and therefore components thereof may be located in a cloud, datacenter, and/or distributed through the network. Further, it should be understood that the apparatus may be distributed through the network and/or across multiple cloud or datacenter locations. As such, the apparatus may include multiple computer processors, computer memory components and communication interfaces, which cooperate together.

Figure 8:
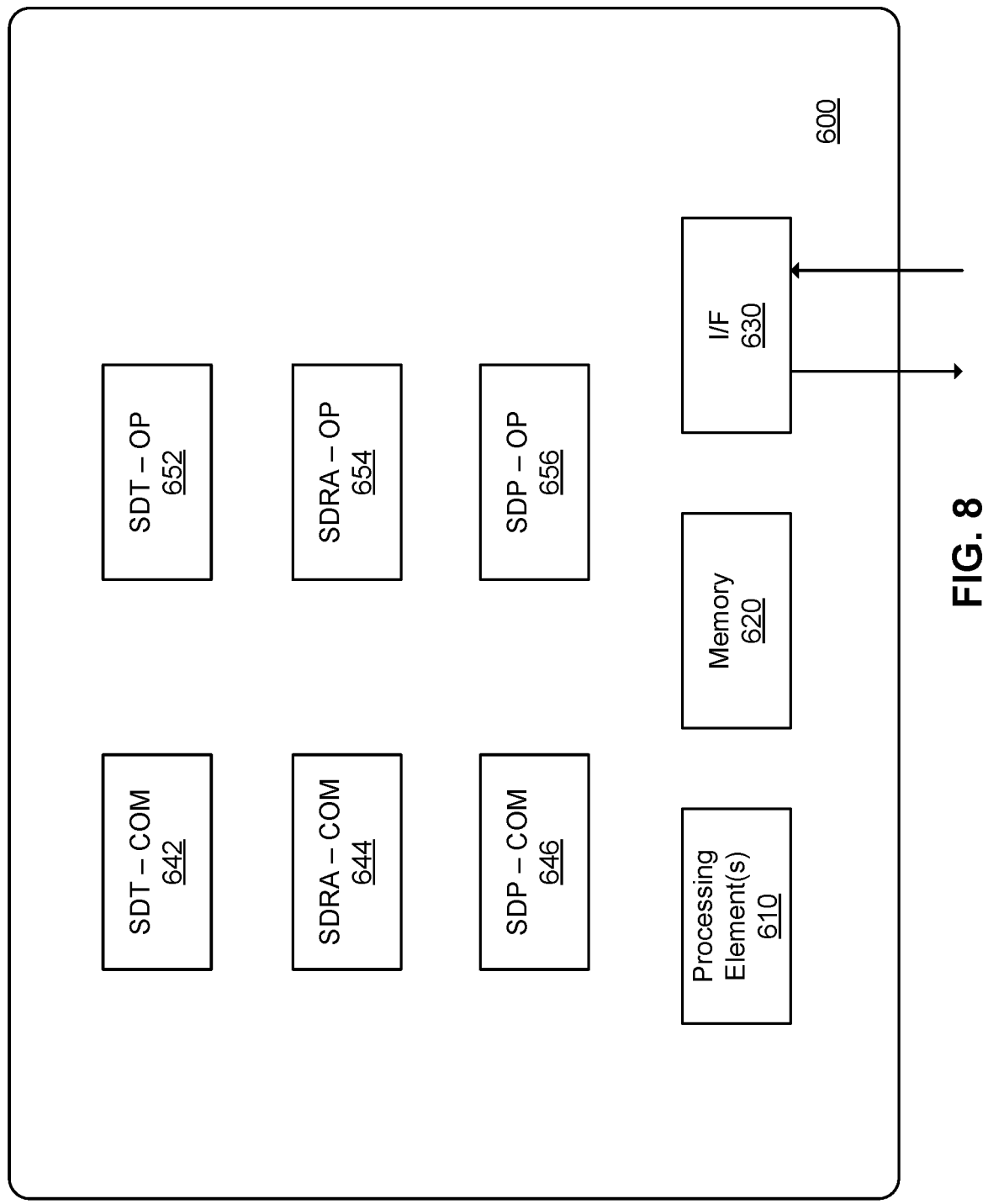
FIG. 8 illustrates an apparatus for configuring a communication network, according to an embodiment of the present invention.

FIG. 8 further illustrates various components of the SONAC 600, including SDT-Com 642, SDRA-Com 644 SDP-Com 646, SDT-Op 652, SDRA-Op 654, and SDP-Op 656. Different components may be located at different distributed portions of the apparatus, and are generally realized by operation of the processing elements 610, memory components 620 and communication interface 630.

In various embodiments, the apparatus configures the network by transmitting messages to underlying resources, such as network nodes, edge nodes, and cloud or datacenter nodes. The messages are transmitted by the communication interface 630, which may also receive messages from the underlying resources. The processor 610 in conjunction with the memory 620 may execute computer program instructions which generate the messages, include appropriate directions therein, and to interact with the underlying resources to cause the network to be appropriately configured.

In some embodiments, the SONAC 600 associates with multiple network nodes and has resources, such as processing and memory resources, located in the network cloud.

Figure 9:
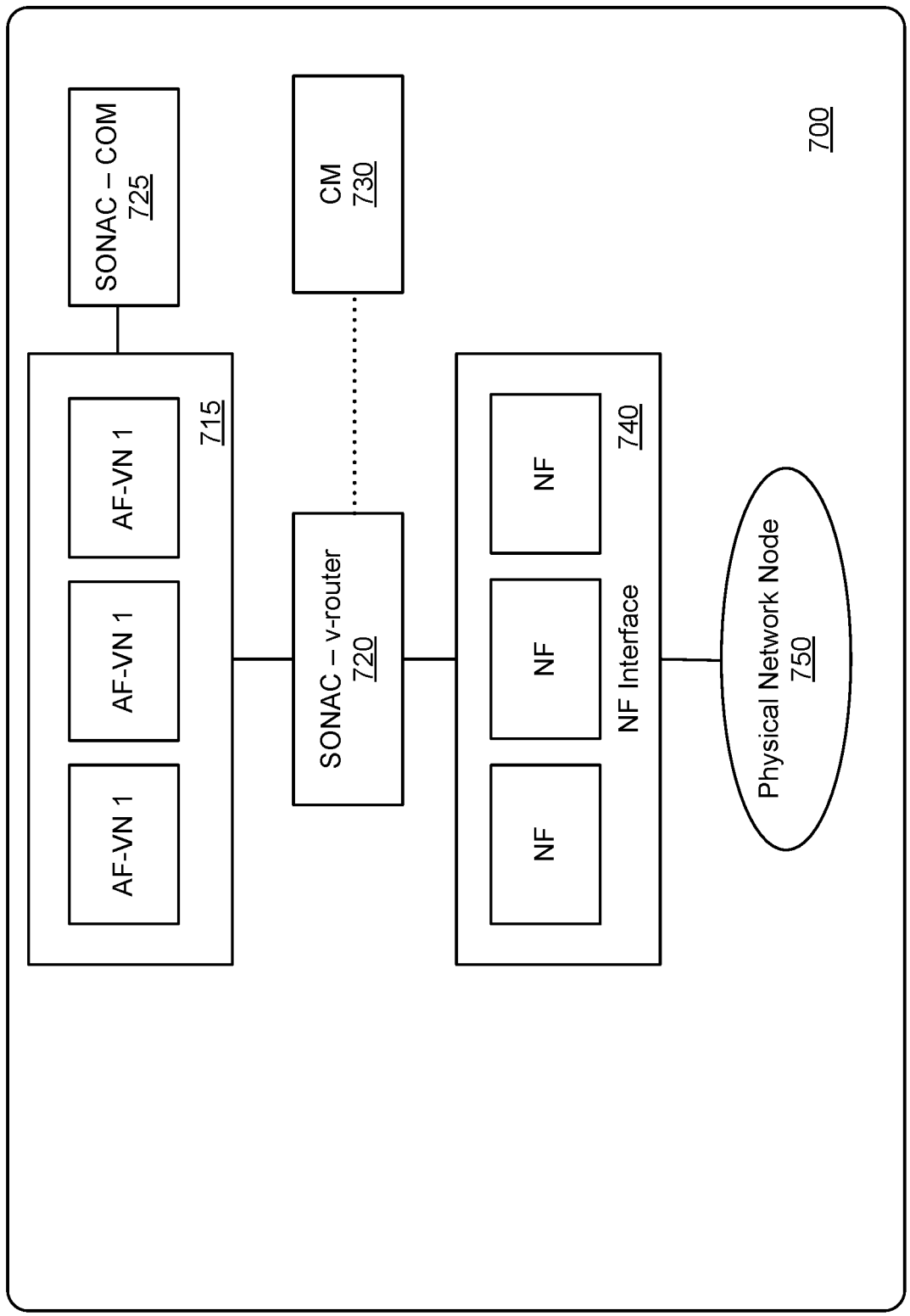
FIG. 9 illustrates an apparatus associated with a virtual network (VN) node, according to an embodiment of the present invention.

FIG. 9 illustrates an apparatus 700 associated with a VN node, according to an embodiment of the present invention, which may also be regarded as a functionality of SONAC, along with interfaces thereof. The apparatus includes a v-router 720, which may be regarded as or managed by a SONAC-Op component. The v-router 720 may be configured by SONAC-Com 725, which is illustrated as a separate component for clarity. The v-router 720 may also communicate with a connection management (CM) entity 730, in order to receive obtain current location information of endpoints for use in updating routing tables of the v-router. The v-router and/or SONAC-Op may also interface with one or more application functions (AF) 715 which may be used to facilitate service delivery, for example by performing in-network processing. The v-router 720 is also associated with a physical network node 750, such as a router or switch.

The v-router 720 can be VN specific. Alternatively, the v-router can be shared by multiple VNs and/or services, in which case network function interfaces 740 with multiple VNs may be provided. A VN node may support one or multiple network functions of a service and/or VN.

Figure 10:
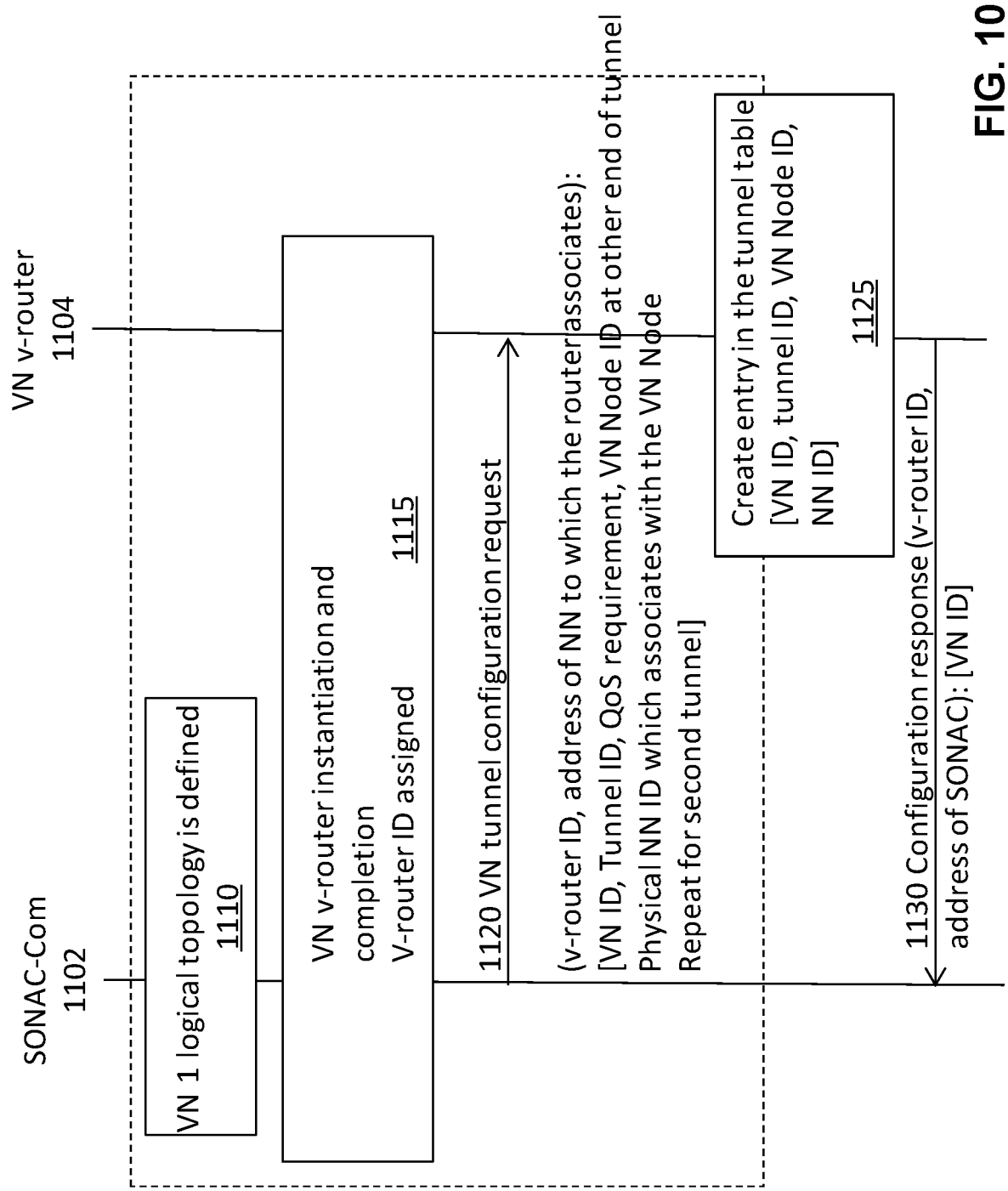
FIG. 10 is a signaling diagram outlining the steps for configuration of a v-router, using a tunnel configuration, according to one embodiment of the present invention.

FIG. 10 is a signaling diagram outlining the steps for configuration of a v-router, using a tunnel configuration, according to one embodiment of the present invention. This configuration procedure can be repeated at the same v-router for a second VN if a v-router supports multiple VNs. In more detail, SONAC-Com 1102 defines 1110 the logical topology of a VN being configured, such as VN 1. SONAC-Com 1102 then instantiates 1115 the v-router 1104, possibly along with other v-routers, and assigns a v-router ID to the v-router 1104. SONAC-Com 1102 then transmits a VN tunnel configuration request 1120 to the v-router 1104. The tunnel configuration request specifies various configuration information items required for configuring the v-router to utilize a logical VN tunnel. As illustrated, such information includes the v-router ID, address of the associated network node, VN ID, tunnel ID, QoS requirements parameters for the tunnel, the VN node ID at the other end of the tunnel, and the physical network node ID associated with this VN node. The tunnel configuration request may specify configuration information items for multiple logical tunnels. The v-router 1104 then creates 1125 an entry in its tunnel configuration table associated with the subject tunnel of the configuration request. As illustrated, the entry may contain information such as the VN ID, tunnel ID, VN node ID at the other end of the tunnel, and network node ID associated with this VN node. Multiple entries can be created for multiple tunnels. The v-router 1104 then transmits a configuration response 1130 to SONAC-Com 1102, indicative that the tunnel has been configured at the v-router. As illustrated, the configuration response can identify the v-router ID, the address of the SONAC-Com, and the VN ID specified in the request 1120.

Figure 11:
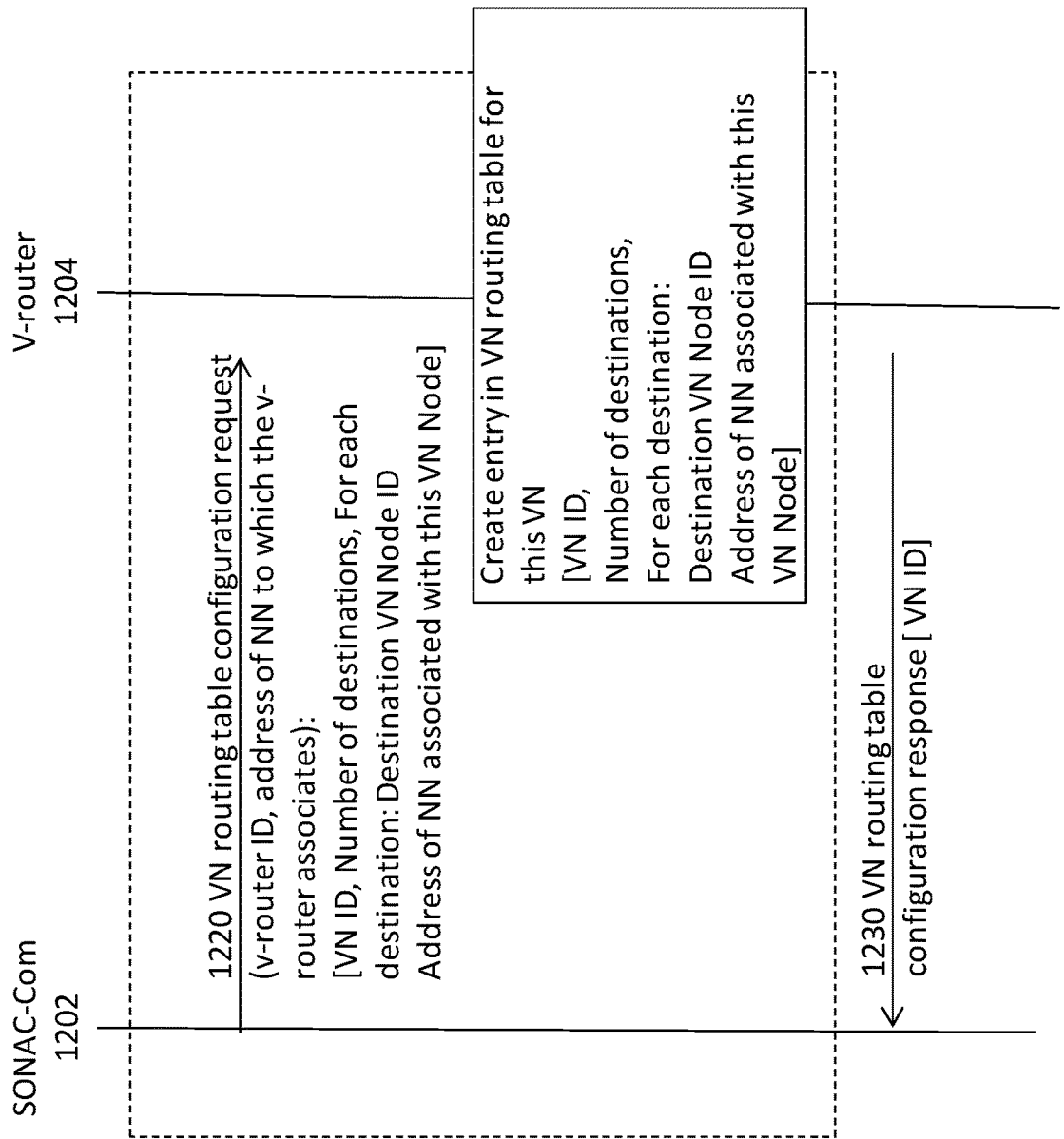
FIG. 11 is a signaling diagram outlining the steps for configuration of a v-router, for destination based VN routing, according to one embodiment of the present invention.

FIG. 11 is a signaling diagram outlining the steps for configuration of a v-router, for destination based VN routing, according to one embodiment of the present invention. This configuration procedure can be repeated at the same v-router for a second VN if a v-router supports multiple VNs. Although not illustrated, SONAC-Com 1202 may define the logical topology of a VN being configured, such as VN 1 and instantiate the v-router 1204, possibly along with other v-routers, and assign a v-router ID to the v-router. SONAC-Com 1202 transmits a VN routing table configuration request 1220 to the v-router 1204. The VN routing table configuration request specifies various configuration information items required for configuring the v-router. As illustrated, such information includes the v-router ID and address of the associated network node, and also includes particular configuration information including the VN ID, number of destinations being configured for the v-router, and, for each destination, the destination VN node ID and the address of the network node associated with this VN node. The v-router 1204 then creates 1225 one or more entries in its VN routing table associated with the subjects of the configuration request. As illustrated, the entries may contain information such as the VN ID, number of destinations being configured for the v-router, and, for each destination, the destination VN node ID and the address of the network node associated with this VN node tunnel ID. The v-router 1204 then transmits a configuration response 1230 to SONAC-Com 1202, indicative that the VN routing table has been configured at the v-router. As illustrated, the configuration response can identify the at least the VN ID specified in the request 1220.

As such, v-routers may be configured to forward packets explicitly via logical tunnels, or directly via underlying network nodes without requiring explicit treatment of logical tunnels. However, in the latter case, and in some embodiments, one may view the logical tunnels as being implicitly present.

In some embodiments, as part of the VN instantiation, the logical and physical topology of the VN is defined and realized. This involves instantiating VN nodes using available computing and memory resources, and associating the VN nodes with selected physical network nodes. The communication links between the VN nodes may also be partially or fully defined. In other embodiments, the VN topology may be pre-defined and/or pre-realized.

In various embodiments, resources are allocated to the VN based on estimated requirements thereof. For example, communication channel bandwidth between nodes of the VN can be allocated based on an estimate of data traffic to be handled by the VN between such nodes. As another example, computing and/or memory resources at a VN node can be allocated based on an estimate of demand for same in order to support service functions, data caching, and the like, in support of the service being provided by the VN.

Figure 12:
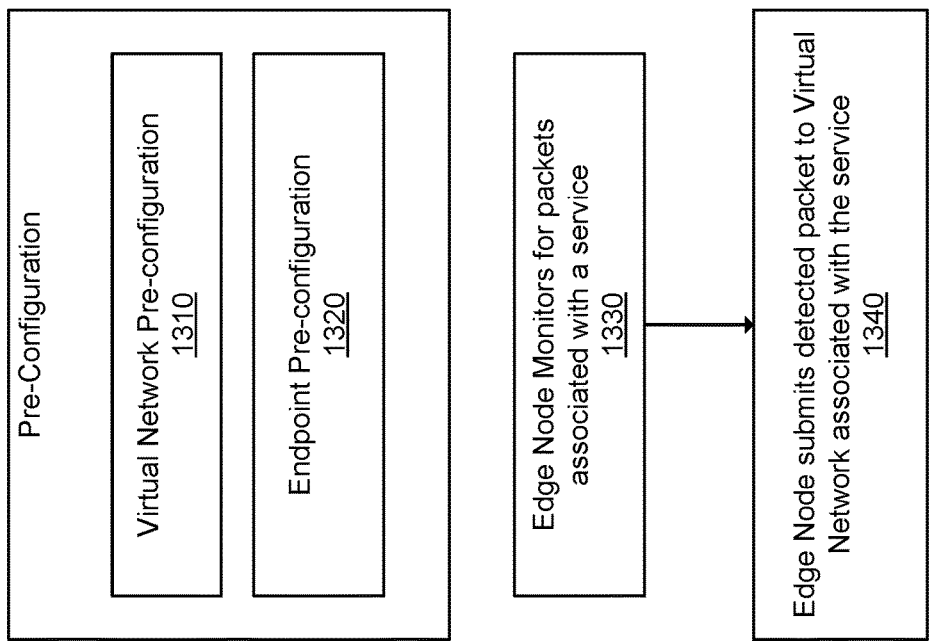
FIG. 12 illustrates operation of an edge node such as an access node or gateway, according to embodiments of the present invention.

According to embodiments of the present invention, and having reference to FIG. 12, an edge node of the communication network is configured to monitor 1330 for data packets, transmitted from an end point, which are associated with a service supported by a virtual network. For example, the data packets may include an identifier such as a service ID which is associated with the service. Additionally, or alternatively, the data packets may be transmitted using dedicated access link resources, such as time slots, frequency bands, or spreading codes, which are associated with the service. Monitoring 1330 for such packets may include monitoring the header or payload for the identifier and/or monitoring the access link resources used to transmit the packet, by monitoring characteristics such as the timing of packet receipt, frequency range of receipt, and/or de-spreading code used to decode the packet. Monitoring may include monitoring a pre-established radio bearer associated with the end point and/or service. Monitoring may include monitoring incoming communications for a radio ID associated with the end point.

Upon detection of a packet as being associated with a particular service, due to monitoring, the edge node submits 1340 the packet, or at least its payload, to a virtual network (VN) which has been pre-configured 1310 to automatically handle packets according to the service. The packet may be encapsulated by the edge node prior to submission. Alternatively, the packet may be encapsulated once it reaches the VN. Encapsulation may include adding a VN tunnel header to the packet.

Submitting 1340 the packet to the VN includes transmitting the packet to a VN node communicatively coupled to the edge node. In some embodiments, the VN node is associated with the edge node. In other embodiments, the VN node is associated with a different node which is communicatively coupled to the edge node. The VN node may be coupled to the edge node via an open tunnel of the VN, for example. Submitting the packet may include selecting one of the VN nodes or tunnels of the VN and submitting the packet to the selected VN node or tunnel.

The end point may be configured to associate its transmitted data packets with the service during a pre-configuration operation 1320. In the pre-configuration operation, the edge node, another edge node, or another device such as a configuration device, facilitates configuration of the end point by directly configuring the end point or causing the end point to self-configure based on provided information. In particular, the end point is configured to transmit packets, which are to be associated with the service, in a particular manner. This may include inserting an identifier such as a service ID into the packet header or payload and/or transmitting the packet using a particular set of access link resources which are associated with the service. The end point may register with the network, a connectivity manager, and/or a virtual network concurrently with or as part of the pre-configuration operation. The end point may transmit a configuration request message to the edge node or other device, and the edge node or other device may respond with configuration information, such as the service ID to be used by the end point.

Embodiments support communication from a service to the end point via the edge node in addition to or alternatively to communication from the end point to the service via the edge node. The end point pre-registers with the service, for example during pre-configuration. In some embodiments, if the end point is mobile, it is tracked by a connectivity manager (CM) entity following pre-registration. That is, a CM operating on the network tracks a location of the end point beginning at pre-registration and the VN is configured to route packets to the end point based on the tracked location. Packets destined for the end point are routed via the pre-established VN to an edge node which is communicatively linked to the end point. The routing is performed by VN routers (v-routers) over the pre-established tunnels and is informed by the CM.

It should be noted that in some embodiments multiple end points may be employed as described above, and that multiple edge nodes operatively coupled to the virtual network may be provided. The VN may be pre-established, and the edge nodes pre-configured, in order to support multiple, possibly mobile end points accessing a common service.

In some embodiments, an end point may be operative to communicate with a service without requiring the dynamic establishment of communication sessions on an as-needed basis. Rather, the VN, including tunnels and v-routers thereof, and the edge nodes, are pre-configured to accept and handle packets from the end points. The end point thus transmits its appropriately configured packet for handling by the pre-configured network. As such, latency associated with session set-up is mitigated.

Figure 13:
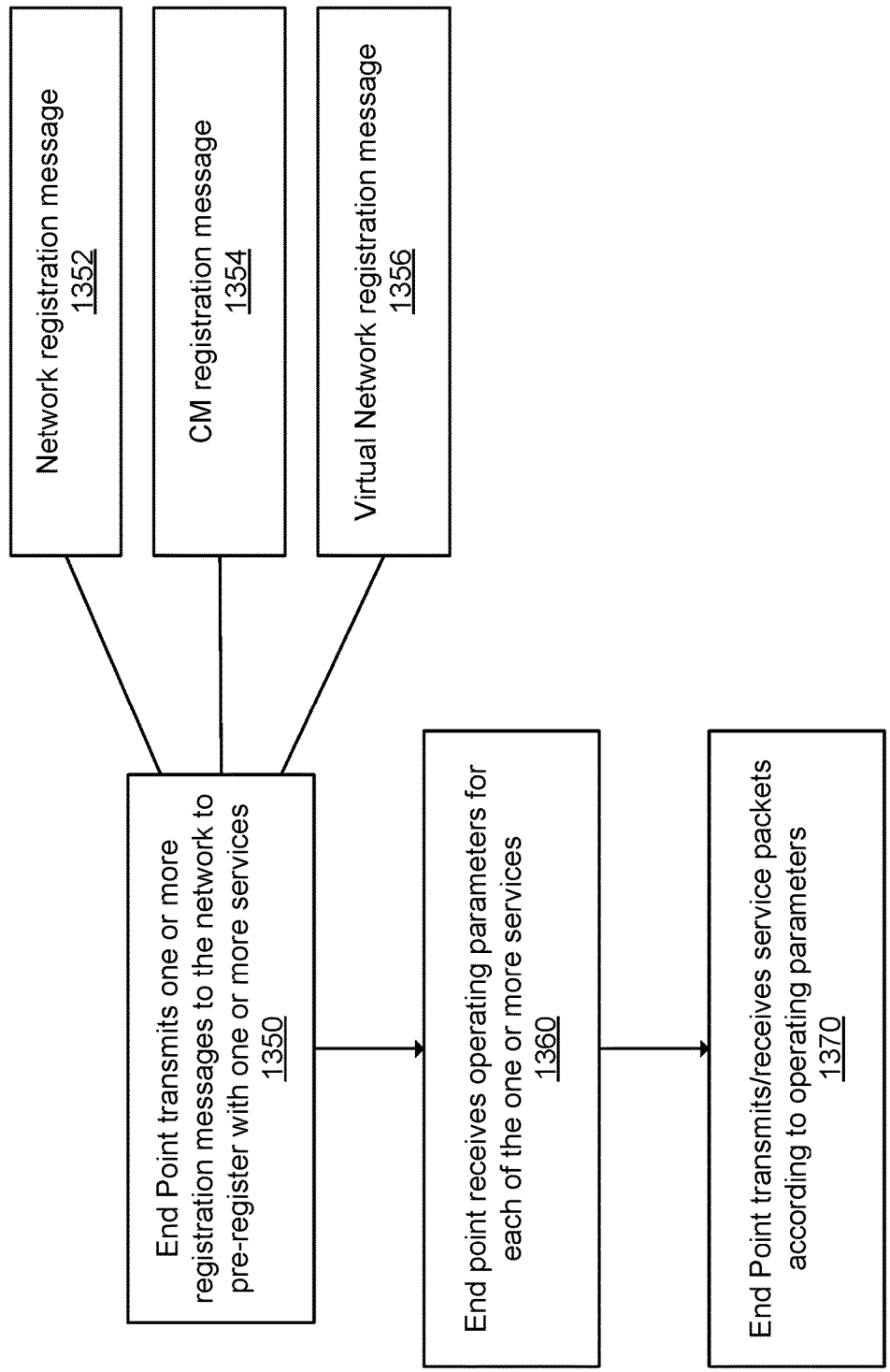
FIG. 13 illustrates operation of an end point according to an embodiment.

FIG. 13 illustrates operation of an end point, such as a mobile UE, a non-mobile UE, or a server, according to an embodiment of the present invention. The end point transmits 1350 one or more registration messages to the network in order to pre-register the end point with one or more services or one or more VNs supporting such services. The registration messages may include a network registration message 1352 for registering with the general network supporting the VN. The registration messages may include a CM registration message 1354 for registering with a CM entity associated with the network and/or the VN. The CM entity may subsequently track the location of the end point. The registration messages may include at least one VN registration message 1356 for registering the end point with the particular VN. The end point subsequently receives 1360 operating parameters for use in accessing a service. The operating parameters may be received in a configuration message transmitted to the end point. One such operating parameter is a service ID which is associated with a given service. Other such operating parameters are dedicated access link resources to be used in association to the service. The end point subsequently transmits and/or receives 1370 data packets associated with the service ("service packets") in accordance with the operating parameters, for example by including the service ID in transmitted packets which are to be associated with (e.g. handled by) the service. For example, packets transmitted by the end point, in accordance with the operating parameters, are received by an edge node and forwarded by the edge node for handling by a VN. The VN includes pre-established logical tunnels interconnecting nodes thereof and is configured to automatically handle the transmitted packets. The packets are handled according to the service, including routing the packets to a destination specified in the packets via pre-established logical tunnels of the VN.

Packets transmitted by the end point and received by the edge node may specify a name identifier which is separate from and independent of the destination's location. The name identifier is or refers to a substantially unique name or identification number of the destination device, which is tracked by entities operating in the network, such as CM and v-router entities. This location can refer to a location in the network topology and/or a geographic location. The v-routers (or SDT-Op) individually or collectively associate name identifiers with destination locations, and therefore operate to resolve a destination's location based on its identifier, and to route packets to the specified destination. For example, the first v-router to receive the packet may determine the location of the destination end point based on its name as specified in a packet. The first v-router may be associated with an edge node or at another network node. A v-router may interact with a connection manager, which tracks possibly mobile destinations, to perform this location resolution. As such, the end point is not required to indicate the location (e.g. IP address) of another end point for which a packet is intended. Rather, in various embodiments, only the name identifier, and other information such as a service-related identifier, is included in a packet submitted to the network by an end point.

Certain details related to embodiments of the present invention will now be described.

In various embodiments, when an end point, such as a UE or server, is to access a service, the end point registers to a VN supporting the service. The end point may register to the VN to indicate a requirement to access the service in future. The registration is typically separated in time from the actual access to the service. The registration may be performed via communication with one edge node, and access to the service may be performed via communication with a different edge node. Furthermore, once the registration is complete, access to the service may be made via multiple different edge nodes sequentially in time as the end point moves. Access to the service may be made concurrently via multiple access nodes of a RAN cluster which transmit or receive service-related packets using a spatial diversity, multiplexing or multicasting approach. The registration may be performed in a variety of ways.

In an implementation, registration may generally be performed by transmitting a registration message from the end point (i.e. a UE) to a network registration entity (e.g. an authentication, authorization and accounting (AAA) server), indicating an identity of the end point and the desired service or VN. The network registration entity may respond by storing the identity of the end point and providing operating parameters to the end point for use in accessing the service. The end point also registers to the network and to a connectivity management (CM) entity at, around or prior to this time. Registration to the CM entity initiates location tracking of the end point by the CM entity, if the end point is mobile. For non-mobile end points, the CM entity may register the fixed location of the end point.

The operating parameters may include a service-related identifier to be included by the end point in packets transmitted thereby, access link resources to use in transmitting packets to edge nodes, access link resources to use for receiving packets from edge nodes, or a combination of the above. The service-related identifier is used to specify packets which are to be treated by the VN and service. When a VN supports a single service, the service-related identifier may be a VN ID. When a VN supports multiple services, the service-related identifier may be the VN ID in combination with a service ID. The service-related identifier may additionally or alternatively include a network slice ID. The service ID or VN ID may be provided to the end point in a pre-configuration operation, or broadcast, along with a description of the associated service for receipt by end points, which self-configure as required. The operating parameters may include a radio ID for use in access link resource assignment. The radio ID may be similar, and may be used similarly, to a MAC ID as provided in 3G or 4G wireless networks. The binding between the radio ID, and the device ID and/or service ID can be established by the participating access node or RAN cluster.

The operating parameters, such as the service-related identifier, can be pre-assigned by SONAC-Com via out-of-band signaling. For example, a set of customer devices, such as wireless smart-reader devices, can be pre-configured to include a service ID which is pre-assigned to the customer. This pre-configuration can be performed during device set-up, prior to or during activation of the devices and/or prior to registration of the devices with the network.

The operating parameters, such as the service-related identifier can be assigned and communicated to a device by SDT-Op via wireless communication, upon registration of the device to the network. The device name and/or service (or slice) ID binding can be pre-configured.

In some embodiments, during registration, access link resources such as time, frequency and/or spreading code resources may be specified to the end point for use in accessing a service. The access link resources may be dedicated to an end point or to a service, or group of end points or services. In other embodiments, end points request access to a specified service over a general channel used for that purpose, and edge nodes (or schedulers) respond by indicating the appropriate access link resources to use during the access request phase.

Uplink access link resources may be shared among devices of a given network slice supporting a service. Downlink access link resources may include shared multicast resources which are shared among devices of a given network slice supporting a service. Packets may be delivered over a pre-configured virtual network/network slice which supports the service.

Upon registration, an end point may be associated with a VN Node. When an end point is associated with a VN Node, this VN node becomes an anchor point for the end point. Packets destined for the end point may be routed to the anchor point via the VN tunnels and then transmitted from the anchor point to the end point. The anchor point may change due to end point mobility. The CM entity may cause the anchor point to change in response to mobility and may cause v-router routing tables to update accordingly. The association of an end point to a VN Node may be determined based on the end point's MAC state, mobility velocity, and other network requirements. This association between an end point and a VN node can be viewed as logical tunnel between the end point and the VN Node. The anchor point may be an access node or a RAN cluster node which interoperates with multiple access nodes.

Figure 14A:
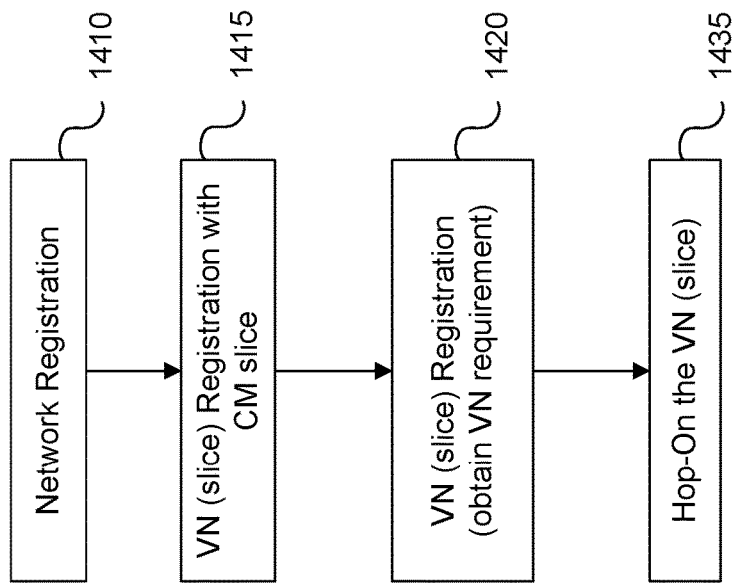
FIGS. 14A to 14C illustrate network registration and usage operations, with and without admission control, according to various embodiments of the present invention.

FIG. 14A illustrates a procedure followed when an end point requests access to a service supported by the VN. Network registration 1410 is performed in which the end point obtains authentication and authorization to connect to the network. The network performs the authentication and authorization operation and provides the end point (and, in some embodiments, the edge node) with an indication of whether the edge node is authorized to connect to the network. Next, registration to a connectivity management entity (CM) 1415 is performed, in which reachability operation is initiated by the CM. The reachability operation includes tracking, by the network, the location of the end point. Tracking may be initiated even before registering with a VN. Next, the network registers 1420 the end point to a VN. VN requirements may be obtained at this point. In particular, a determination can be made, by the edge node, as to whether admission control (AC) is required for accessing the VN. This may be indicated by a configuration message transmitted from the edge node, for example. At this point, if no AC is required, the end point can begin transmitting data (or otherwise accessing the service), thereby "hopping on" 1435 to the VN, that is, transmitting packets to an edge node which are appropriately marked for handling by the VN and/or service thereof.

Figure 14B:
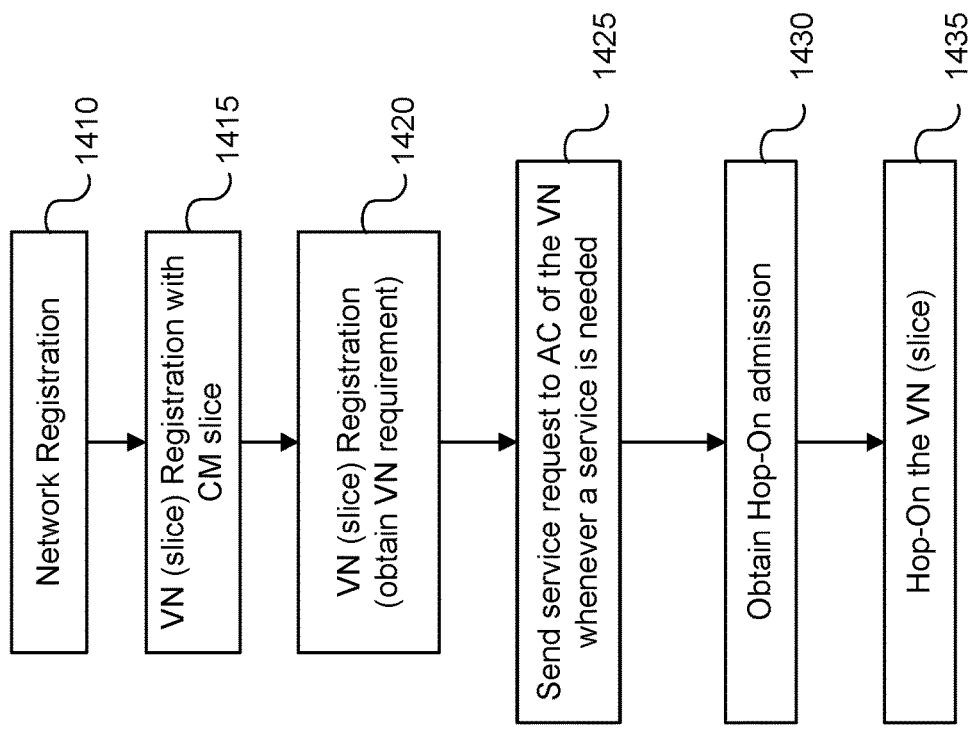

FIG. 14B illustrates an alternate aspect in which AC is required to access the service. and an AC procedure is performed. Operations 1410, 1415, 1420 are as described with respect to FIG. 14A. When an end point requires use of the service (e.g. to download a file with a given data rate), a service request is transmitted 1425 to an admission control entity, and a hop-on admission is obtained 1430, for example in the form of an authorization message. The end point may then begin transmitting data or otherwise accessing the service, thereby hopping on the VN 1435.

Figure 14C:
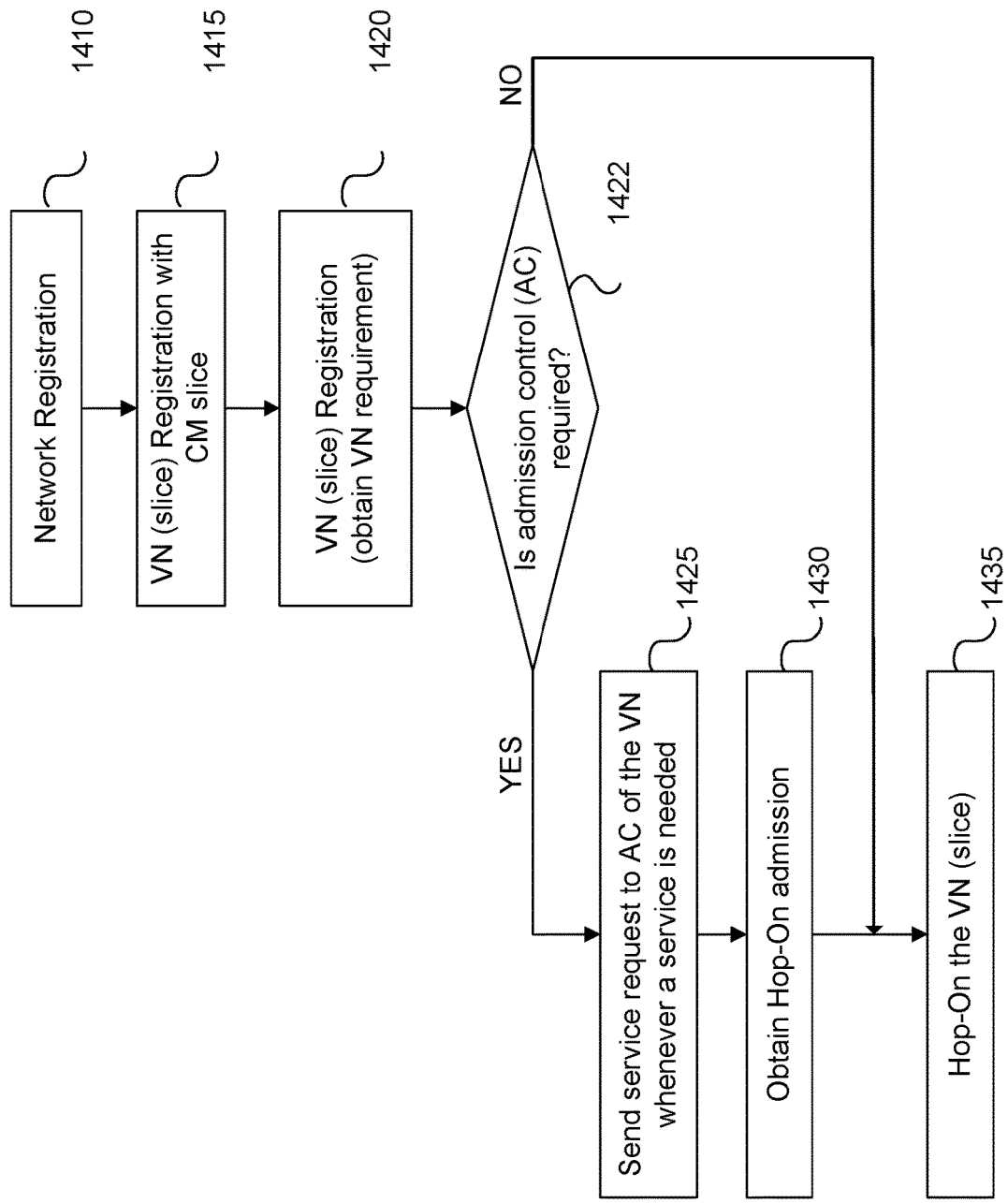

FIG. 14C illustrates an alternate embodiment in which selective AC may be applied by the edge node. In FIG. 14C, a determinative step 1422 is conducted in addition to the operations described in FIGS. 14A and 14B. The determinative step 1422 determines whether AC is required for the requesting end point. In the case that AC is required for the requesting end point, the edge node can direct the end point to follow the procedure of FIG. 14B. In the case that AC is not required for the requesting end point, the edge node can direct the end point to follow the procedure of FIG. 14A.

For hopping on a VN, after registration the end point simply sends a data packet which carries the name or ID of the destination and an identifier (such as a VN ID or service ID, or an identifier which is implicit in the access link resources used). Based on the identifier, the network will forward the data tunnel by tunnel over a VN until the data packet reaches the destination. The v-routers associated with VN Nodes determine the next tunnel ID (or next VN node ID) after a data packet is received and processed in a VN Node. This process uses end-point routing tables at each VN router. For fixed end-points, the routing tables can be set after end-point initial location registration. For mobile devices, v-routers acquire current location information from CM entities. Based on the destination name (or ID) and the acquired location information, a VN router will route the data packet to the appropriate next tunnel.

As noted above, end points can register with a CM entity which operates on the network to track the (mobile) end point's location over time. Location tracking begins at end point registration. As the end point moves through the topology of the networks, its location can be tracked by the CM. This can be achieved in a number of different ways known in the art including having the end point provide location update messages to the CM, either periodically or when a sufficient movement with respect to the topology has occurred. In other embodiments, the nodes connecting to the end points can communicate changes in reachability to the CM, allowing the CM to track where in the topology of the network the end point is connected. The VN is configured to route packets to the end point based on the tracked location of the end point. Location tracking can be performed in a variety of ways, for example by monitoring registrations or location update messages by the end point in different tracking areas, and/or monitoring the locations of edge nodes which are currently or recently in contact with the end point.

The CM may be configured to track the location of mobile end points and provide location information to v-routers. The CM can be provided as a tree hierarchy of local to more global CMs, which cooperate to provide location updates. When a lower-level CM lacks current location information, it may query a higher-level CM. When a higher-level CM registers a location update, it may pass the update to lower-level CMs.

In some embodiments, the CM pushes location updates to the v-router routing tables as they are received or on a schedule. The v-router routing tables use the currently available information regarding end point locations to configure how to route packets thereto. In some embodiments, the v-routers request a current location of the end point from the CM periodically or on an as-needed basis, for example when a v-router receives a packet destined for the end point or when it is determined that the last known location of the end point is incorrect.

As stated above, embodiments of the present invention include operating one or more edge nodes of the communication network to monitor for packets associated with a service, and to submit such packets to a service-oriented VN for handling thereby. The configuration may include, for example, configuring a function which associates with an edge node and which monitors headers and/or payloads of packets received by the edge node from end points. The function may be implemented at the edge node or remotely from the edge node, for example using cloud-based or datacenter resources and network function virtualization. Configuration of the edge node may be performed by configuring a VN node which is associated with (e.g. logically co-located with) the edge node.

In some embodiments, edge nodes are provided with one or more service IDs, VN IDs, radio IDs or other identifiers and configured to monitor packets for occurrence of such identifiers. An identifier being monitored for is associated with a service supported by the VN. Each edge node may also be configured to submit such packets to a designated VN node (of a VN supporting the service). The VN node may be associated with the edge node or communicatively linked to the edge node, for example via an open tunnel. Edge nodes may be provided with identifiers of UEs which have registered to use and/or which are pre-authorized to use specified services.

In some embodiments, edge nodes, such as wireless access nodes, are configured to use dedicated access link resources for transmitting and/or receiving packets corresponding to the service. Access link resources may include time slots, frequency bands, and/or spreading codes used for wireless multi-access communication. Use of such dedicated access link resources may include one or more of: transmitting using the resources, monitoring for reception of packets transmitted using the resources, specifying in a transmission scheduling request that the resources are to be used, and scheduling transmission according to the resources. In other embodiments, edge nodes are configured to use shared access link resources for transmitting and/or receiving packets corresponding to the service. The configuration of edge nodes to use dedicated or shared access link resources may be performed by SDRA-Com.

In some embodiments, rather than or in addition to forwarding packets to the VN based on an identifier contained therein, an edge node may be configured to forward packets to the VN based at least in part on the access link resources used to transmit the packet to the edge node. For example, when an end point is configured to use certain dedicated access link resources for transmitting packets according to the service, the edge node may automatically determine that a packet belongs to the service when it is transmitted using such dedicated resources, and accordingly forward the packet toward the VN associated with the service.

Because the VN topology, the routing table and the mapping between logical tunnels to physical network resource have been pre-configured, little to no signaling is needed for data traffic delivery from one originating end point to a destination end point in most cases. Because of end point pre-registration, subsequent transmission and reception operations at the end point and edge node are simplified. The originating end point simply transmits a packet in such a manner that the packet is associated with the service (e.g. by including a VN ID or service ID), and may also include in the packet an identifier of the destination end point for which the packet is intended. The packet is transmitted to the VN via an edge node. The packet may be transmitted after performing admission control to obtain authorization to use the VN. For routing data traffic over the VN to destination end point, v-routers are used. The location of a mobile destination end point is tracked by a CM entity and the location information is made accessible to the v-routers. In some embodiments, the originating end point and/or the associated edge node do not need to know the location of the destination end points, only the name identifier of the end point which enables the v-routers to direct the packets to the intended destination. Data packets of end points travel across a VN along the route guided by v-routers, which may be a function of SDT-Op.

In various embodiments, data packet transmission from end points is achieved by transmitting the packets to the network using the pre-configured VN resource. In some embodiments, this procedure can be a completely signaling-free procedure or a lightweight signaling procedure, for example in which only access link signaling is required if the VN has no pre-assigned access link resource, or if the pre-assigned resource is not shared among end-points of the VN. As such, some or all signaling related to session establishment, re-establishment for a device (session), which is present in legacy systems such as 3G/4G networks, is omitted in embodiments of the present invention. Data packet transmission from end-points corresponds to sending data to a network using established VN resources.

Figure 15A:
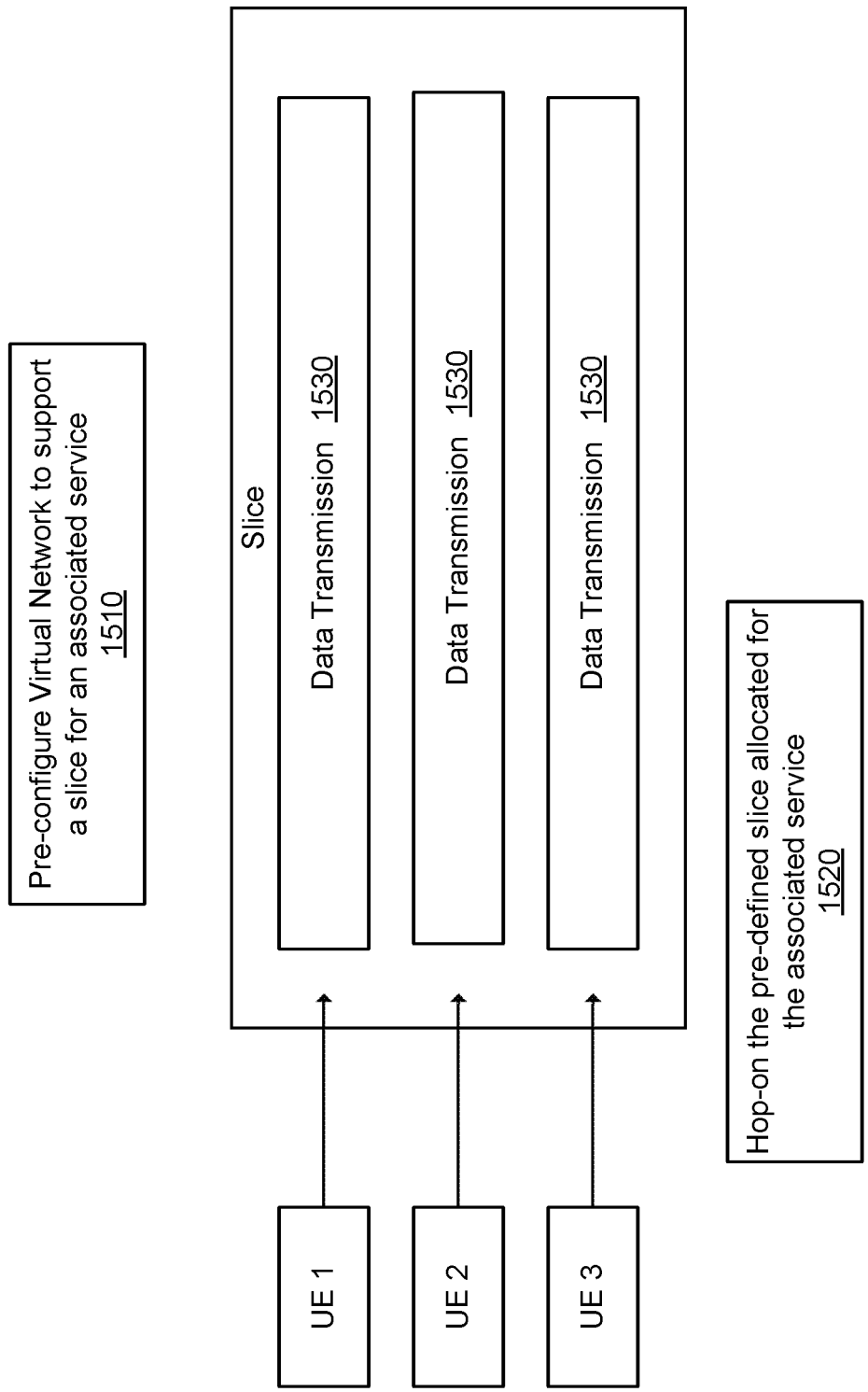
FIG. 15A illustrates network pre-configuration and usage operations, according to embodiments of the present invention.

As illustrated in FIG. 15A, embodiments of the present invention facilitate the ability for an end point to "hop-on" a pre-defined VN via a signaling-free procedure, or a procedure which requires only lightweight localised signaling. In particular, end points initiate 1520 usage of the VN using the hop-on procedure described herein, and substantially immediately begin transmitting data 1530. This results in short latency in comparison to the latency experience in conventional 3G/4G networks, which would require device session establishment following device initiation and prior to data transmission. Prior to the hop-on procedure, the VN is pre-configured 1510 to provide a designated service to devices which share similar service and QoS requirements.

Embodiments of the present invention relate to the delivery of data packets from an edge node to a destination end point which is serviced by the edge node. The edge node receives, from the VN, a packet which specifies a name identifier and a service ID. The edge node then determines specific location information for the end point, and associated parameters such as access link resources and a radio ID to use for communicating the packet to the end point and QoS parameters. Operation of the edge node (e.g. RAN cluster node or access node) may correspond to operation of a v-router associated with the edge node.

Some embodiments support delivery of a packet to an end point from a RAN cluster node to an end point in wireless communication therewith as follows. The RAN cluster node receives a packet from the egress of a logical tunnel of the VN, the packet specifying a name identifier as an indication of the intended destination of the packet. The RAN cluster node consults an end point routing table which associates name identifiers with current candidate access nodes usable to potentially reach end points having such IDs. The RAN cluster then delivers the packet to one, some or all of the candidate access nodes that are listed in the table as being associated with the name identifier. The candidate access nodes then wirelessly transmit the packet for reception by the intended end point.

Access nodes receive packets from the egress of a logical tunnel linking thereto, for example having its ingress at a RAN cluster node or other VN node. The access node reads the packet header and identifies the intended destination end point. The access node then determines the radio ID of this end point, if any. The access node then determines the VN, network slice and/or service level QoS parameters and/or per-device QoS parameters, and determines an access link resource assignment to use for transmitting the packet to the end point. The access link resource assignment may be taken from a pre-assigned resource pool associated with the VN and/or network slice, for example.

Embodiments of the present invention relate to the delivery of data packets from a source end point to an edge node which services the end point. The edge node receives, from the end point, a packet which specifies another name identifier and/or service ID. The packet may have been transmitted using pre-assigned and/or shared access link resources, for example, or established network resources in the case of a server-to-gateway interaction. The edge node then submits the packet to an appropriate VN node for handling, or operates itself as such a VN node. The edge node may select a logical tunnel of the VN or a VN node based on contents of the packet, such as the destination name identifier and/or service ID, and submit the packet to same. Operation of the edge node in this embodiment may correspond to operation of a v-router associated with the edge node.

Some embodiments support delivery of a packet from an end point, such as a UE, to an access node. The end point creates the packet and includes in the packet at least one of: the destination name identifier along with the VN, slice and/or service ID, or only the radio ID using the pre-configured per-VN or per-slice resource. The Radio ID may be an identifier of one of the destination device, the source device, or the identifier of the radio bearer on which the transmission is to be transmitted. One or more access nodes communicatively coupled to the UE receive the packet and submit the packet to the ingress of a logical tunnel of the VN/slice which is accessible to the access node. The logical tunnel may be selected based on the packet header using VN routing tables. The packet may be transmitted using pre-configured dedicated access link resources, or without use of pre-configured, dedicated access link resources.

In some embodiments, the location of an end point is tracked by the CM and made accessible to v-routers. As such, end points from which data packets originate need not know the location of the end points for which the data packets are intended. Data packets of end points traverse the VN along a route which is controlled by the v-routers, which may be functionalities of SDT-Op.

For transmission of packets both to and from end points, access link resource assignment may be performed using appropriate resource assignment signalling messages. This may include radio bearer setup in the case of wireless transmission.

Figure 15B:
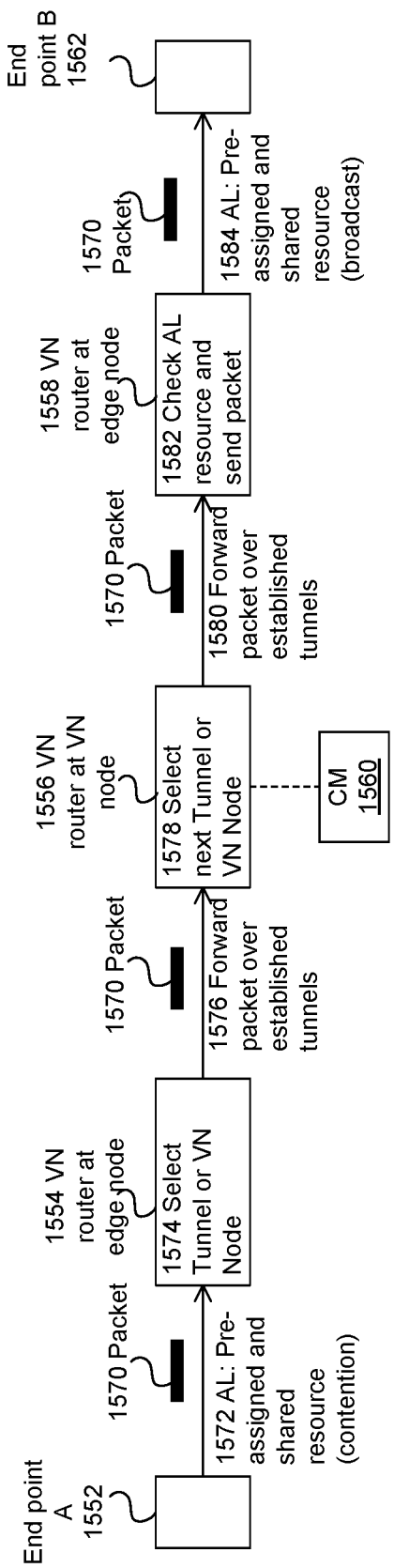
FIG. 15B illustrates an example of end-to-end packet routing for end points, according to an embodiment of the present invention.

FIG. 15B illustrates an example of end-to-end packet routing for mobile end points, according to an embodiment of the present invention. The routing includes operation of edge nodes to discriminate and forward packets to appropriate destination end points or v-routers, based on packet information such as the VN ID, service ID, and name identifier.

In more detail, end point A 1552 is to transmit a packet to end point B 1562. Both end points 1552 and 1562 are assumed to have registered to an associated service and with the CM 1560. The end point transmits a packet 1570 using certain access link resources 1572, which may be pre-assigned and/or shared resources. Shared resources may be accessed on a contention basis. A v-router 1554 associated with the edge node which receives the packet 1570 processes the packet and selects 1574 a next tunnel or VN node to which to submit the packet. The selection may be made on the basis of the routing tables of the v-router 1554. The v-router forwards 1576 the packet over established logical tunnels of the VN. A v-router 1556 at another VN node receives the packet and operates to select a next tunnel or VN node to which to submit the packet. The selection may be based on end point information supplied by a CM entity 1560 in response to a request or in push mode. The v-router 1556 selects 1578 a next tunnel or VN node to which to submit the packet. The v-router forwards 1580 the packet over established logical tunnels of the VN. A v-router 1558 at an edge node in communication with end point B 1562 receives the packet, checks 1582 the access link resource assignment to use for communicating with end point B 1562, and transmits the packet toward end point B. The edge node 1582 transmits the packet 1570 for receipt by end point B 1562 using certain access link resources 1584, which may in some embodiments be pre-assigned and/or shared resources.

One of end points 1552 and 1562 may be a server, in which case the transmission of the packet over an access link can be replaced with the transmission of a packet over established links or tunnels between the edge node and the server.

As such, signaling related to session establishment, re-establishment for a device (session) in 4G systems is omitted in embodiments of the present invention. Data packet transmission from end-points corresponds to sending data to a network using established VN resources. In some embodiments, this procedure can be a signaling-free procedure or a lightweight signaling procedure, for example in which only access link signaling is needed if there is no pre-assigned access link resource to a VN, or if the pre-assigned resource is not shared among end-points of the VN.

Embodiments of the present invention comprise performing admission control prior to allowing an end point to transmit and receive data packets of the service via the VN, for example as shown in FIG. 14B. Admission control may be performed by the edge nodes and/or other entities such as CM entities, admission controllers, and/or other functions which may be part of the VN or outside but related to the VN. Admission control may be used on a case-by-case basis, and may be omitted in some embodiments, for example as shown in FIG. 14A. According to admission control, when an end point requires use of a service (e.g. to download or stream data, or to begin a communication session with another end point), an admission control procedure is performed in an attempt to obtain authorization for the end point to use the service. Admission control may be used for example when authentication of end points is required, or when delivery of the service requires significant resource usage, and a determination of whether sufficient resources are available is to be made prior to service delivery. Admission control may be required, for example, when the service involves bulk data transmission over a VN with limited capacity.

Figure 16A:
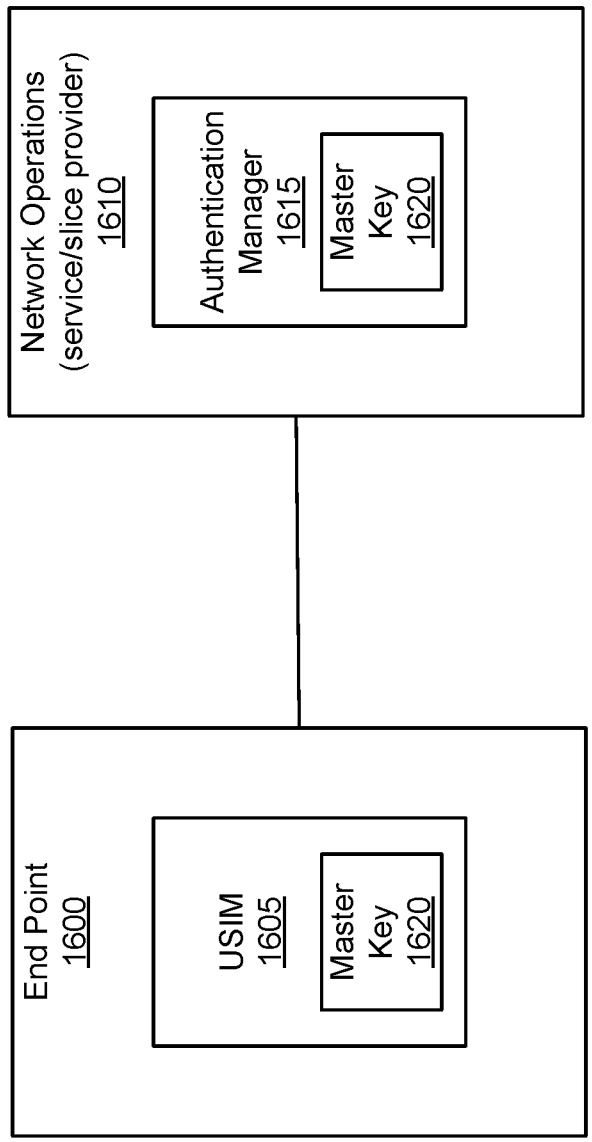
FIG. 16A illustrates master security key location in accordance with an embodiment of the present invention.

Embodiments of the present invention provide for security measures for authenticating devices using the VN and service supported thereby, for example in association with admission control. As illustrated in FIG. 16A, a master key 1620 is maintained by both an end point 1600 and an authentication manager 1615 of a network operations entity 1610. At the end point 1600, the master key 1620 may be stored in a secure module such as a USIM 1605. For authentication purposes, a set of keys and checksums are generated at an authentication center, such as by the authentication manager. The keys and checksums may be generated as a function of the master key, the function incorporating a random element. The set of keys and checksum are then transferred (along with an indication of the random element) to the end point. The end point then calculates the same set of keys using the same function and random element, based on its own copy of the master key. Authentication is then completed based on the above.

In various embodiments, derivation of key material proceeds as follows. A network AAA, or service (or slice) AAA, such as a customer service management AAA function (CSM-AAA) derives key material Kservice as a function of a service-related identifier, such as a service ID, slice ID of a slice supporting the service, and/or VN ID of a VN supporting the service. If the key materials are generated by the network AAA, they are then sent to the service (or VN or slice) AAA. The service AAA then distributes the key materials to service (or VN or slice) security functions which are located in some VN nodes. Next, after an end point is admitted to a service (and/or VN and/or slice), both the end point and the service security functions may use key derived keys to cipher and de-cipher data packets and/or to check integrity of signaling messages. The key derived keys may be derived for example via functions of: a device (end point) ID, a service or slice ID, a VN ID, a current absolute time, an ID of a current security function, a current nodeB (e.g. gNB) ID, and/or an ID of radio bearer being used.

It is noted that key materials can be forwarded by the service AAA to a security function in a target VN node, for example during a handover operation related to an end point.

Figure 16B:
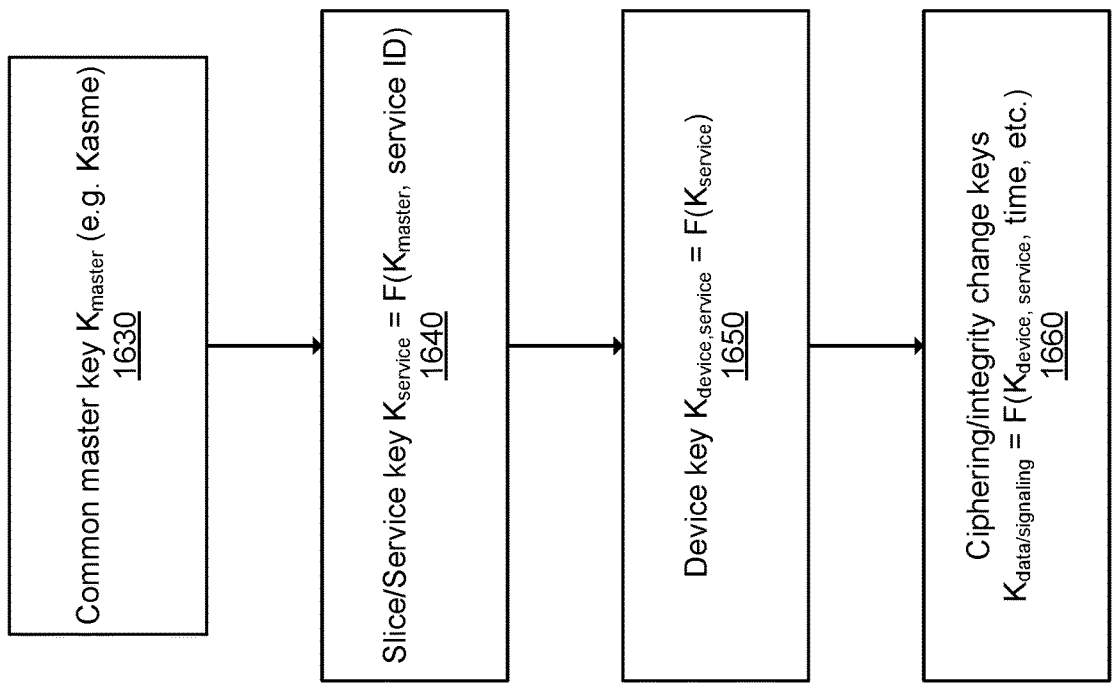
FIG. 16B illustrates security key material derivation in accordance with an embodiment of the present invention.

FIG. 16B illustrates a key material derivation procedure according to an embodiment of the present invention. A common secret master key, such as the Kasme key used in the Long-Term Evolution (LTE) wireless networking standard, is provided 1630. The common secret master key is associated with key materials used during network authentication and/or authorization. Next, a service (or VN or slice) key Kservice relevant to the current service (VN/slice) is provided 1640 as a function of the master key and a service (VN/slice) ID. This key is associated with key materials used during service (VN/slice) deployment, and such key materials are service (VN/slice) dependent. The service (VN/slice) key may be managed by a service (VN/slice) AAA or network AAA entity. Next, device (end point) key materials Kdevice,service are provided 1650 as a function of the service (VN/slice) key Kservice. The device key materials are created after a device is allowed to hop-on a slice. The key materials may be created by the service (VN/slice) AAA (CSM-AAA), which may derive the key materials and distribute them to security functions of the service (VN/ slice). Next, ciphering/integrity change keys Kdata/signaling are provided 1660, for example as a function of the device key materials and other parameters such as current time. The ciphering/integrity change keys may be used for real-time traffic data and signaling, and may be created at data transmission time by security functions, such as but not limited to packet data convergence protocol (PDCP) functions.

Embodiments of the present invention provide for an end point registration procedure. Network and VN registration may be per-device (end point) based or per-customer based. The per-customer based procedure can be used to request VN/service/slice access for all devices of a customer.

Examples of device registration procedures are presented in FIGS. 17A, 17B, 17C, and 17D. Before an end point such as a UE connects to the VN, the end point transmits a service request to an admission control entity supervising the virtual network. The admission control entity determines whether to allow the end point to use the service and, if so, transmits an authorization to the end point. The authorization may further be provided (by either the admission control entity or the end point) to an edge node, VN node or v-router to inform same of the authorization. In some embodiments, the edge node transmits the service request on behalf of the end point, and receives the authorization to determine whether to grant the end point access to the VN. The admission control entity, edge node, VN node and/or v-router are configured to carry out this admission control procedure. The admission control entity may be instantiated using data center or cloud resources as part of the pre-configuration, and may be associated with one or multiple edge nodes, for example.

Figure 17A:
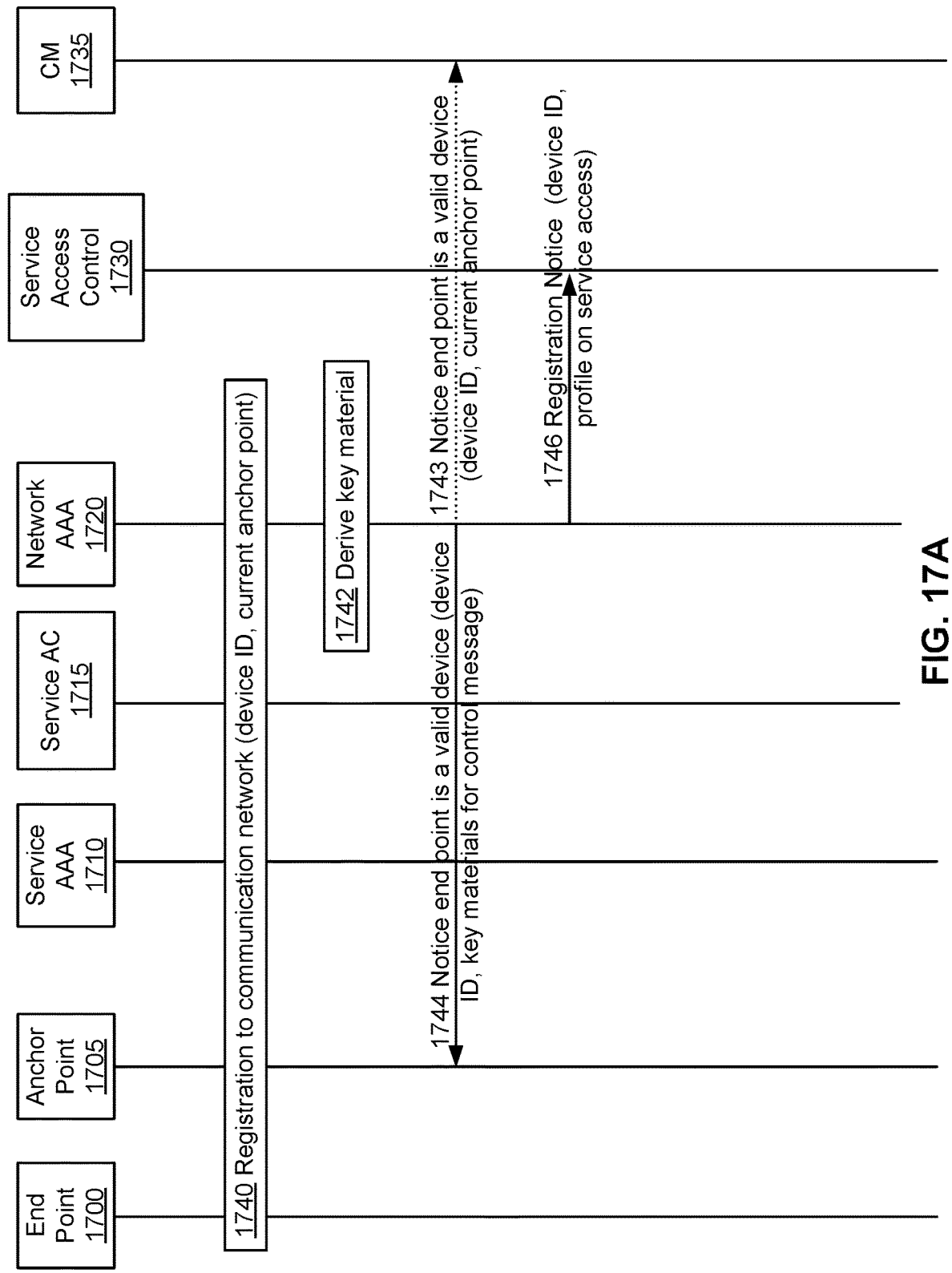
FIG. 17A illustrates a per-device registration procedure in accordance with an embodiment of the present invention.

Having reference to FIG. 17A, which illustrates part of a per-device registration procedure, an end point 1700 registers 1740 to the network. The network registration procedure 1740 may for example be similar to a network registration procedure in a legacy 3G/4G wireless communication network. The end point 1700 is then authenticated and authorized to use the network. Next, the network AAA 1720 derives 1742 the key materials for all control signaling messages. Optionally, the network AAA 1720 notifies 1743 a CM entity 1735 (e.g. a global CM) that the end point is a valid device (e.g. is authorized and authenticated). The CM 1735 may add the authorization and authentication to the location record corresponding to the end point 1700. The end point's device ID and current location/anchor point may be specified in the notice. The network AAA 1720 also notifies 1744 to an anchor point 1705 (or edge node) of the end point 1700 to indicate that the end point is a valid device. The notification 1744 also includes the key materials to be used for all signal ciphering/integrity checks to the security function at the current anchor point of the VN (or slice) for this end point. The anchor point may be at a nodeB, such as a gNB, for example. The network AAA 1720 also sends a registration notification 1746 to the service access controller 1730 including information of the end point's device ID, and profile on service/VN/slice usage restriction, etc. At this point, the end point is registered with the CM and service access controller.

Figure 17B:
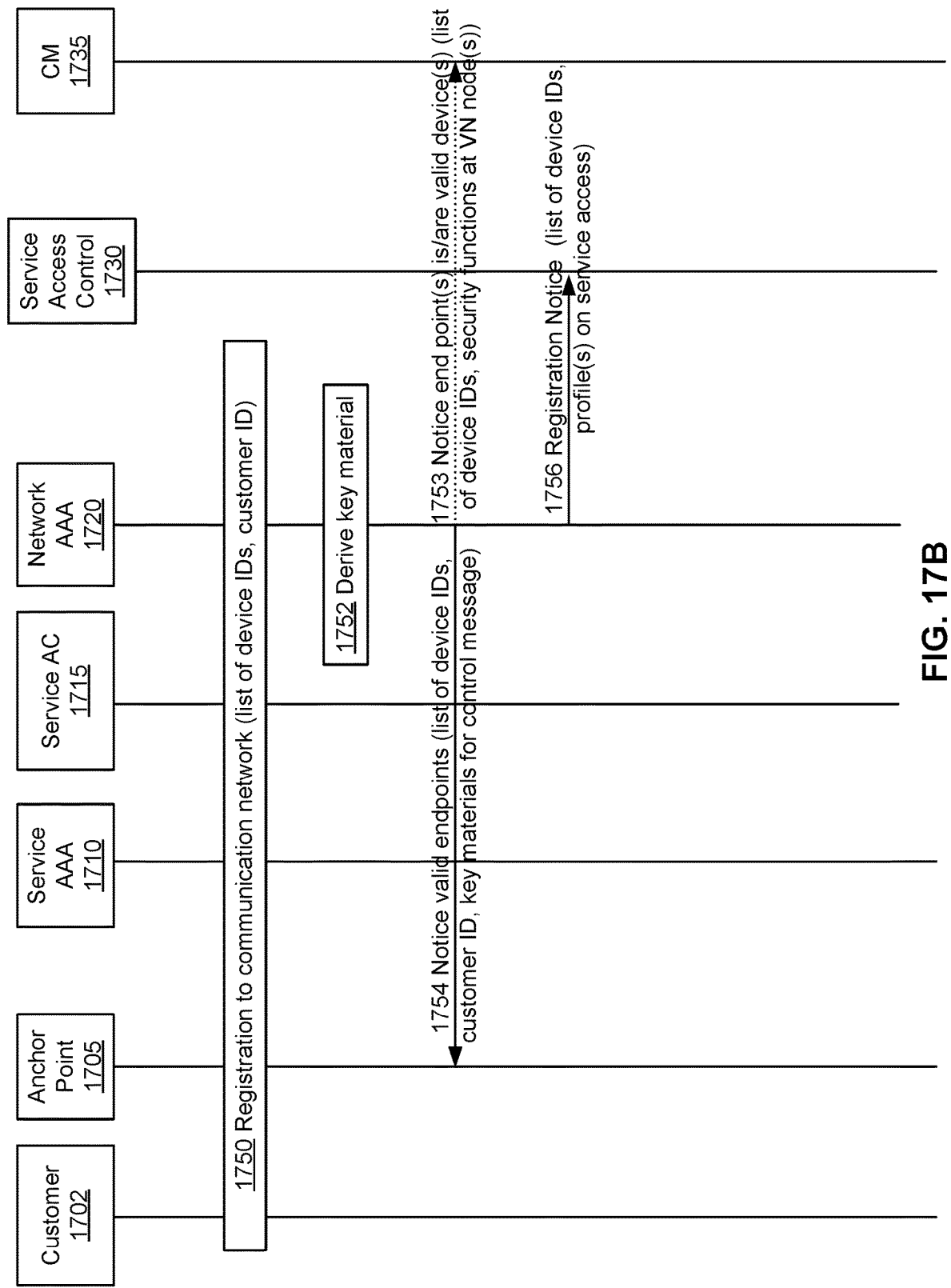
FIG. 17B illustrates a per-customer registration procedure in accordance with an embodiment of the present invention.

FIG. 17B illustrates part of a per-customer based registration procedure that allows a customer (i.e. a customer of the network operator) to register multiple devices associated with that customer. The customer may be a business or government organization, for instance, that maintains a list of authorized users (devices) that are authorized to access a service provided by that customer. The devices may be owned by the customer, or may be owned by the users. The customer may update the list as required, to provide authentication and authorization at the edge of the VN. In another aspect, the customer may be the owner of one or more endpoints which are registered with the network operator. The customer may seek to authorize and authenticate all of its devices in a single registration operation. Referring to FIG. 17B, the customer 1702 (i.e. a device representing the customer) registers 1750 with the network the devices (users) who are authorized to access the service(s) associated with the customer. The customer ID and a list of authorized devices can be specified during the registration. The registration procedure may for example be similar to a legacy 3G/4G network registration procedure. The customer, and the devices thereof, are then authenticated and authorized to use the network. Next, the network AAA 1720 derives 1752 the key materials for all control signaling messages for the devices being registered by the customer. The key materials may be a function of the customer ID, device IDs, etc.

Optionally, the network AAA 1720 sends a notification 1753 to a CM entity 1735 (e.g. a global CM) to indicate a list of customer devices which are valid devices. The valid device IDs and current location/anchor points may be specified in the notification. The CM entity 1735 may update its records to include the authentication and authorization information in association with its end point location information. The network AAA 1720 also sends a notification 1754 to an anchor point 1705 (or edge node) of the end point 1700 to indicate a list of the customer devices which are valid devices. The notification 1754 may be sent to multiple edge nodes/anchor points. The notification 1754 also includes the key materials to be used for all signal ciphering/integrity checks to the security function at the security functions located at multiple VN nodes. The network AAA 1720 also sends registration notification 1756 to the slice access controller 1730 including a list of device IDs and the customer ID, and a profile on slices usage restriction, etc. At this point, the customer's devices are registered with the CM 1735 and service access controller 1730.

Figure 17C:
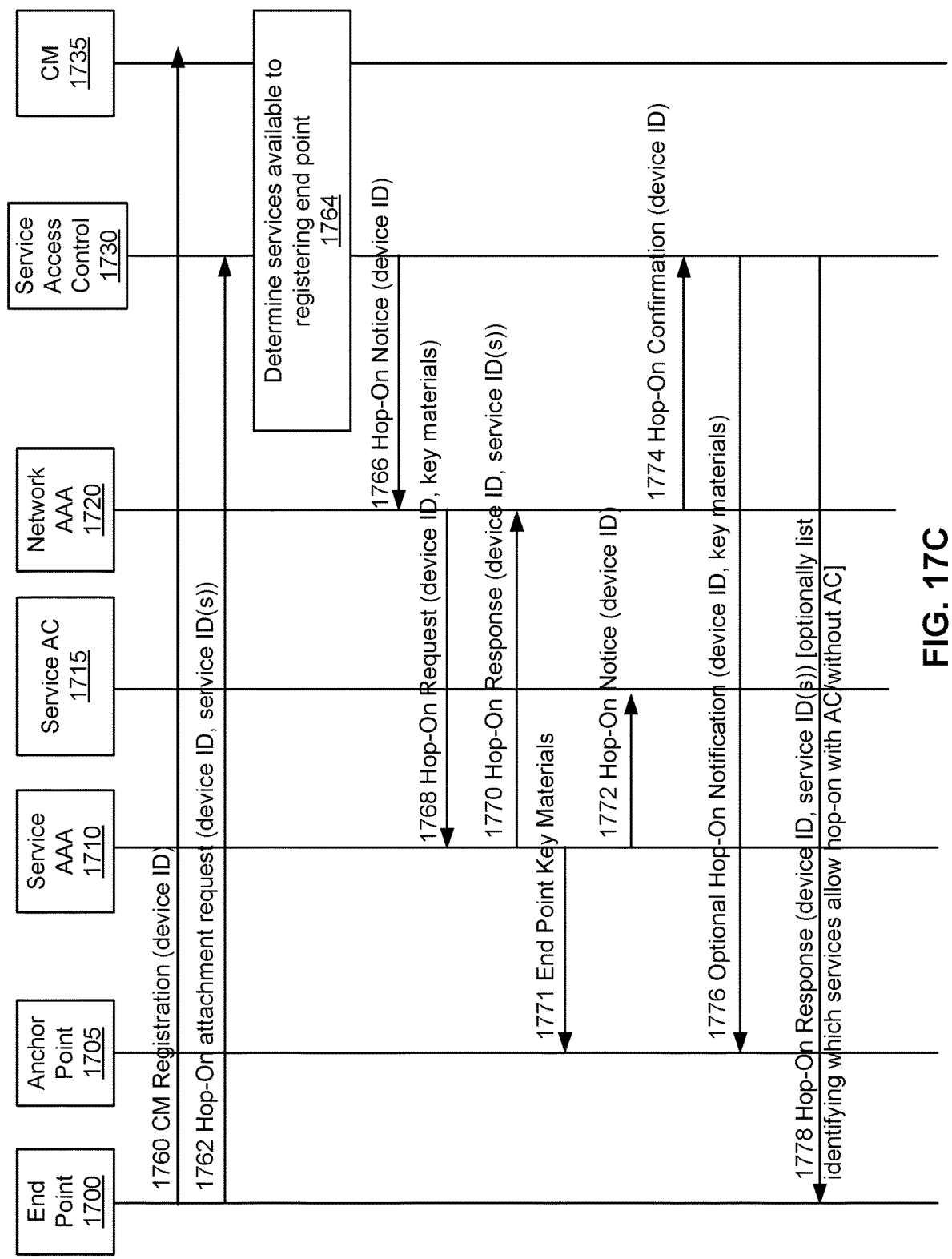
FIG. 17C illustrates further registration operations following the procedures of FIGS. 17A and 17B, in accordance with an embodiment of the present invention.

FIG. 17C illustrates operations which occur after the operations illustrated in FIGS. 17A and 17B. In the following, and in some embodiments, the end point 1700 may be substituted with the customer device 1702, in which case the operations can be carried out on a per-customer basis, by the customer device 1702 on behalf of multiple end point devices. The end point 1700 sends 1760 a CM registration message to the CM 1735, including the end point device ID and current location (or list of device IDs and current locations). The end point 1700 sends a hop-on (or service access) attachment request 1762 to the service access controller 1730. The service access controller 1730 determines 1764 services available to the end point 1700 (or customer devices) and determines services (VNs/slices) which the end point 1700 is (or customer devices are) allowed to access via hop-on. The service access controller 1730 informs 1766 the network AAA entity 1720 of the determined list of services (VNs/slices) which the end point is (or customer devices are) allowed to hop-on in a hop-on notice which designates the device ID(s) and a list of the allowed services/slices. The network AAA entity 1720 calculates key material for each of the allowed services/slices and sends 1768 a hop-on request to the service (or VN or per-slice) AAA 1710. Alternatively, the service (or VN or per-slice) AAA 1710 generates the key material. The key material may be a function of the slice ID, device ID, device key, etc. A hop-on response 1770 is transmitted from the service (or VN or per-slice) AAA 1710 to the network AAA entity 1720. The service (or VN or per-slice) AAA 1710 also sends 1771 the key materials of the end point(s) to the service/VN/slice security function at the current anchor point(s) 1705 of the end point(s) (e.g., at the anchor point, access node, gNB, etc.). The service (or VN or per-slice) AAA 1710 also sends notice 1772 to the service admission controller (AC) 1715 of services/VNs/slices which allow hop-on of the end point(s) but need admission control. The notice may include the device ID(s).

The network AAA 1720 also sends 1774 confirmation of the hop-on notice to the service access controller 1730. The confirmation may include the device ID(s), and list of IDs of services (slices) which are authorized for use. Optionally, the service access control function 1730 sends 1776, in a hop-on notification, the key materials of the end point 1700 to a security function at the current anchor point 1705 of the end point 1700 or to multiple security functions at multiple VN nodes. At this point, slice security functions at one or more VN nodes are equipped with required key materials of the end point. The service access control function 1730 also sends 1778 the hop-on response to end point 1700 (or customer device 1702), including the list of services/VNs/slices for which hop-on is allowed and an indication of which services/VNs/slices need further admission control. At this point of time, the end point 1700 is (or customer devices are) ready to hop-on.

Figure 17D:
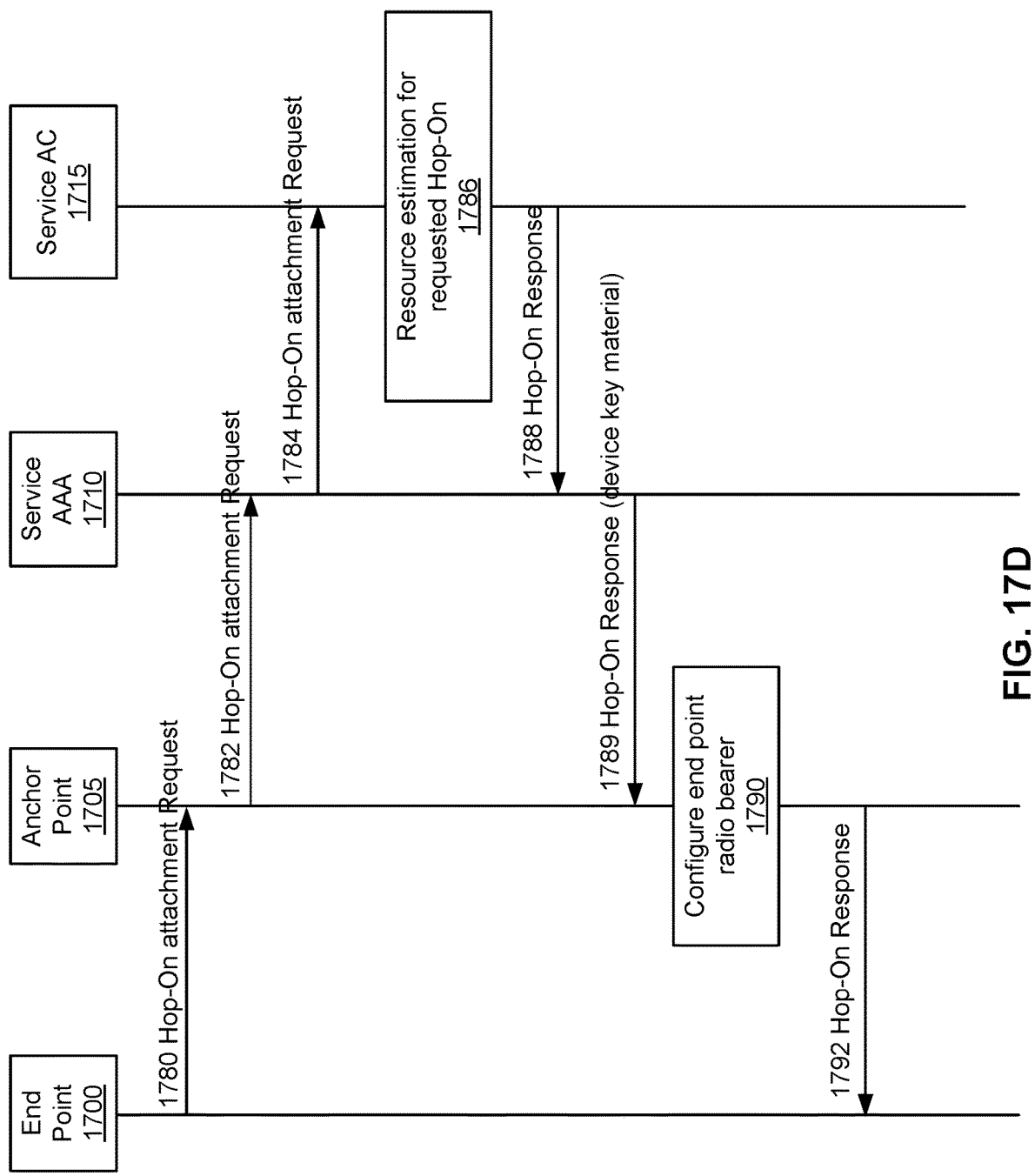
FIG. 17D illustrates an end point hop-on procedure with admission control, according to an embodiment of the present invention.

FIG. 17D illustrates an end point hop-on procedure with admission control, according to another embodiment of the present invention. Before starting hop-on, the end point sends a hop-on request to the network. A processing function of this signaling forwards the message to a per-service (or VN or slice) AAA, where the end point's security materials are available. The per-service AAA forwards the key material to a security function (data plane) of this service/VN/slice. The end point starts hop-on. At the session finish the device's keying materials are removed. The end point 1700 transmits 1780 a hop-on attachment request to its anchor point 1705, or to an associated signaling process function or security function. The anchor point 1705 forwards 1782 the hop-on attachment request to the service AAA 1710, which in turn forwards 1784 the request to the service admission controller 1715. The service admission controller 1715 estimates 1786 resources for accommodating the requested hop-on and provides an appropriate admission control decision in a hop-on response 1788 to the service AAA 1710. The service AAA 1710 forwards 1789 the response, including device keying material if applicable, to the anchor point 1705. The anchor point 1705 configures 1790 the end point radio bearer and provides 1792 the hop-on response to the end point 1700.

According to embodiments of the present invention, end point (device) operational states can be dependent on device registration states. Table 1 shows multiple device registration states, the device being an end point potentially using the hop-on communication mode. Table 1 shows four different registration states in different respective rows, namely: registered or not registered with a given network; registered or not registered with a given slice, VN or service; authorized or not authorized to utilize the hop-on mode without requiring admission control; and authorized or not authorized to utilize the hop-on mode but subject to admission control. Table 1 shows two different operational states in the different columns, namely in the hop-on operational state ("Hop-on") or not in the hop-on operational state (blank). Based on the status of the registration states, the device is determined to be either in or not in the hop-on operational state. In the hop-on operational state, the device is registered to the network and a slice and authorized to utilize the hop-on mode (e.g. to transmit service-related packets via the VN), either unconditionally or subject to admission control. In particular, when the device is in the network registered state, and also in the slice/VN/service registered state, and also in one of the two states for which hop-on is authorized, then the device is determined to also be in the hop-on operational state.

TABLE 1

Device Registration and Operational States

| Registration state | | | Hop-On | | Hop-On |
|---|---|---|---|---|---|
| Network registered | N | Y | Y | Y | Y |
| Slice registered | | N | Y | Y | Y |
| Hop-On allowed without AC | | | Y | N | |
| Hop-On allowed after AC | | | | | Y |

Further details of the end point hop-on operation will now be described. In some embodiments, when the device is in a hop-on operational state (i.e. registered to the network and the slice/VN/service, and allowed to use the hop-on mode with or without authorization), the device can be assigned a logical resource only or both a logical resource and a physical resource.

In some embodiments, when the device is in the hop-on operational state, the transmissions to the device (e.g. downlink transmissions) can be either paging-free or paging-before-transmission types of transmissions.

In some embodiments, paging-free transmissions may be performed without related signaling. For example, transmission points can directly transmit data to devices without any signaling (such as scheduling messages). Such data may be transmitted using a pre-assigned shared or dedicated resource. For paging-free, the location information at the transmission point level is known. However, the logical and/or physical access link resource may or may not be available.

In some embodiments, paging-free transmissions may be performed with limited related signaling. For example, transmission points can transmit resource assignment signaling and use the related assigned resources to transmit data to devices.

In some embodiments, for paging-before-transmission, data destined for a device (e.g. downlink data) may be sent to an anchor point associated with the device. Subsequently, the CM entity instructs one or multiple transmission points to page the device. After the device acknowledges the page, the CM entity informs SDT-Op to route data to one or more identified transmission points, such as a transmission point servicing a region associated with receipt of the paging response. The transmission point(s) then transmit data in the same manner as described above for the paging-free transmission case.

In some embodiments, when the device is in the hop-on operational state, the transmissions from the device (e.g. uplink transmissions) can be performed without related signaling or with limited related signaling.

For transmissions from the device performed without related signaling, the device may transmit data using a pre-defined transmission resource, such as a dedicated or shared resource. In some embodiments, the device then waits for an acknowledgement or negative acknowledgment and may re-transmit the packet as necessary.

For transmissions from the device performed with limited related signaling, the device may transmit a resource request using dedicated or shared resources. After receiving a resource assignment in response to the request, the device may transmit data using the assigned transmission resource, such as a dedicated or shared resource.

In some embodiments, an end point (device) using the hop-on mode can be associated with multiple states, including a packet data convergence protocol (PDCP) connected state, a radio link controller (RLC) connected state, and a physical over-the-air (OTA) resource connected state.

In the PDCP connected state, only PDCP (security) materials are kept by both the anchor point of the device and by the device. In the RLC connected state, both the PDCP and the RLC materials are kept, by both the anchor point and the device. In the physical OTA resource connected state, PDCP, RLC and physical OTA resources are assigned.

In some embodiments, an end point (device) using the hop-on mode can be tracked at different location tracking granularities. For example, one of the location tracking granularity levels may be selected for use in tracking the device at a given time. The level of the granularity can be determined by the CM entity/function based for example on device mobility attributes, and service quality requirement. A first location tracking granularity level is a paging-free level, in which the location is tracked at the cell or transmission point level. A second location tracking level is a paging-before-transmission level, in which the location is tracked at a non-cell or transmission point level and paging is required before data delivery to a hop-on device.

Table 2 illustrates aspects of the PDCP state, RLC state, and physical OTA resource state. The cumulative nature of the states is shown, namely in which the RLC connected state requires the PDCP connected state, and the physical OTA resource connected state requires both the RLC connected state and the PDCP connected state.

TABLE 2

PDCP, RLC state, and physical OTA resource states

| Resource state name | Resource | Physical OTA resource connected state | RLC connected state | PDCP (security) connected state |
|---|---|---|---|---|
| PDCP | Logical resource - security or PDCP (shared or per device) is kept | Y | Y | Y |
| RLC | Other logical resource is kept (RLC/MAC) (shared or per device) | Y | Y | N |
| Physical over-the-air (DL/UL | Actively use physical OTA resource for the purpose of data | Y | N | N |

TABLE 2-continued

PDCP, RLC state, and physical OTA resource states

| Resource state name | Resource | Physical OTA resource connected state | RLC connected state | PDCP (security) connected state |
|---|---|---|---|---|
| dedicated resource) | transmission (Grant needed or grant-free) | | | |

Table 3 illustrates a relationship between the PDCP connected state, RLC connected state, and physical OTA resource connected states and the tracking granularity, according to an embodiment of the present invention. Namely, the paging-free tracking level can be implemented when only the PDCP connected state is established, in which case when data needs to be sent, lightweight signaling is required for setting up the RLC connection and OTA resource. The paging-free tracking level can alternatively be used when the PDCP connected state and the RLC connected state are established, in which case when data needs to be sent, lightweight signaling is required for assigning the OTA resource. The paging-free tracking level can alternatively be used when all three of the PDCP connected state, the RLC connected state, and the physical OTA connected state are established, in which case no signaling is required when data needs to be sent.

The paging-before-transmission tracking level requires knowledge of a device's location when data needs to be sent. As such, a paging procedure is triggered, for example by CM or SONAC-Op. Subsequently, the tracking level of a device becomes the paging-free tracking level. For the paging-before transmission tracking level, a device can be in the PDCP connected state only or in the PDCP connected state and the RLC connected state. When the RLC is in the connected state, it is implicitly assumed that the PDCP is connected. Similarly, when the Physical OTA is in a connected state, it is implicitly assumed that both the PDCP and the RLC are connected. It is noted that both the RLC function and the PDCP function are located at the anchor point function. For the paging-before-transmission tracking level, these functions may or may not be at a RAN transmission point.

done on at least one of a per flow and per slice basis (including a per flow per slice basis). The mapping can be created in accordance with the characteristics of the DRB (e.g. the characteristics resulting from the associated set of transmission parameters) and the requirements of the traffic flow (e.g. QoS requirements etc.)

From the view of the basestation in a downlink transmission environment, a DRB is uniquely associated with a UE (or other electronic device). There may be more than one DRB associated with the UE, but only one UE associated with each DRB. When the basestation has traffic to transmit to the UE, it can determine which DRBs are associated with the UE, and from the available DRBs select a DRB. This selection can be done in accordance with QoS requirement, and other connection type requirements.

From the view of the basestation in an uplink transmission environment, traffic received on a given DRB can be associated with the UE that is uniquely associated with the DRB. Traffic received over a DRB can be forwarded to a gateway associated with a virtual network (e.g. a virtual network within a network slice), based on a selection from the networks associated with the DRB. If the DRB is uniquely associated with a single network slice, then the forwarding can be done with limited delay due to decisions on where to forward the data.

In the context of a sliced network environment, the present invention provides a mechanism to allow the selection of a DRB in association with the network slice carrying the traffic for transmission. If a particular slice is associated with a URLLC service, a DRB can be pre-mapped to the slice so that the transmission needs of the slice are reflected in the characteristics of the DRB. Those skilled in the art will

TABLE 3

PDCP, RLC state, and physical OTA resource states vs. tracking granularity

| Location granularity (anchor point) | | RAN transmission point (paging-free) | | Not in RAN transmission point (paging before transmission) | |
|---|---|---|---|---|---|
| PDCP connected state | Y | Y | Y | Y | Y |
| RLC connected state | Y | Y | N | Y | N |
| Physical OTA connected state | Y | N | N | | |

A Data Radio Bearer (DRB) is a logical construct used to differentiate the different logical channels through which a basestation (e.g an eNodeB or a gNodeB) communicates with an electronic device (e.g. a mobile device such as an MTC device or a UE). The DRB has an associated a set of transmission parameters that may include a specification of waveform, parameters associated with the waveform, whether or not acknowledgements are required etc. It is possible for each access node (e.g gNodeB or eNodeB) to map traffic flows to different DRBs. This mapping can be appreciate that traffic flows from a service within a URLLC slice can be mapped to a DRB that provides reliability in the transmissions to the UE.

Figure 18A:
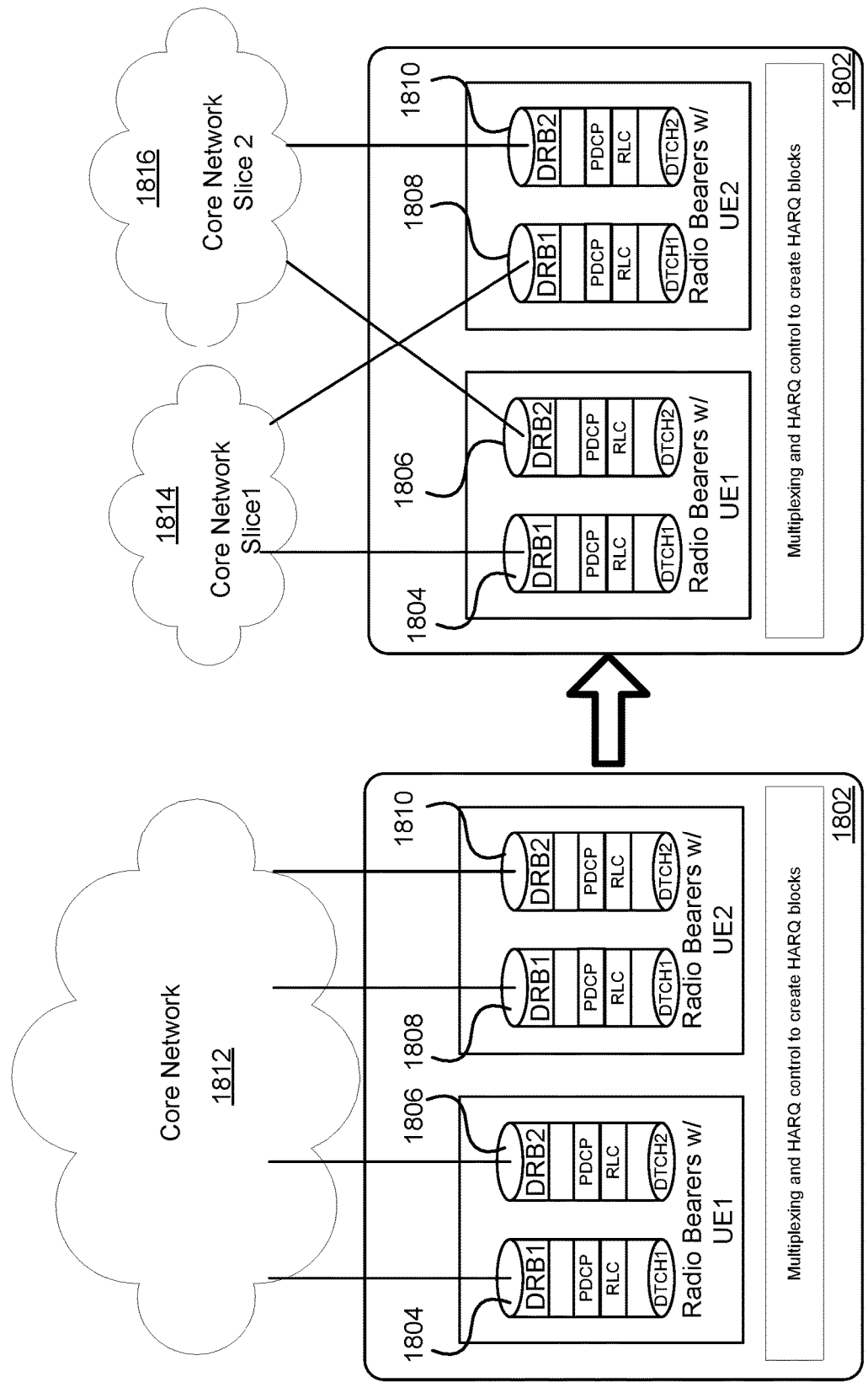
FIGS. 18A to 18C illustrate examples of mappings according to embodiments of the present invention.
Figure 18B:
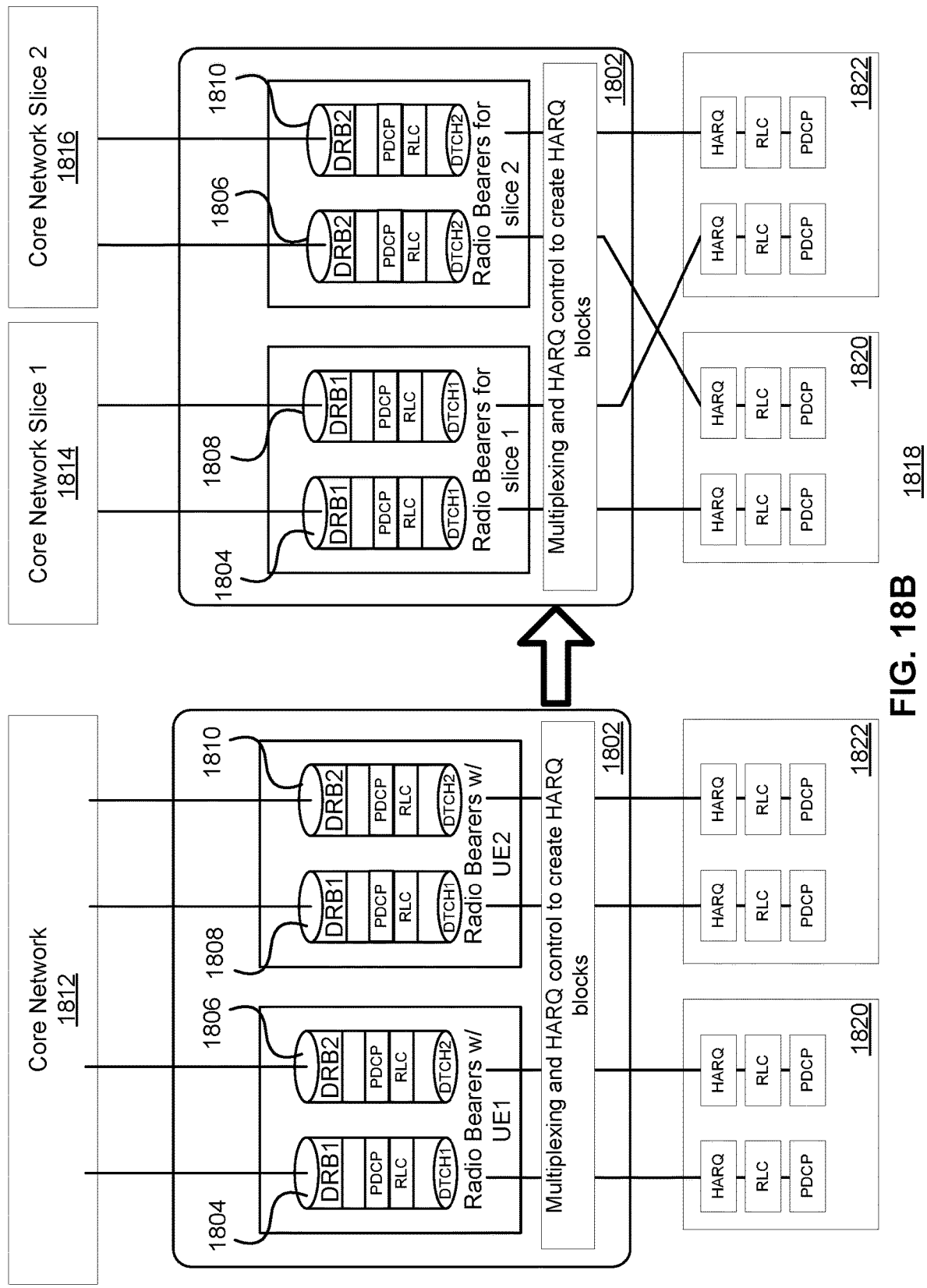
Figure 18C:
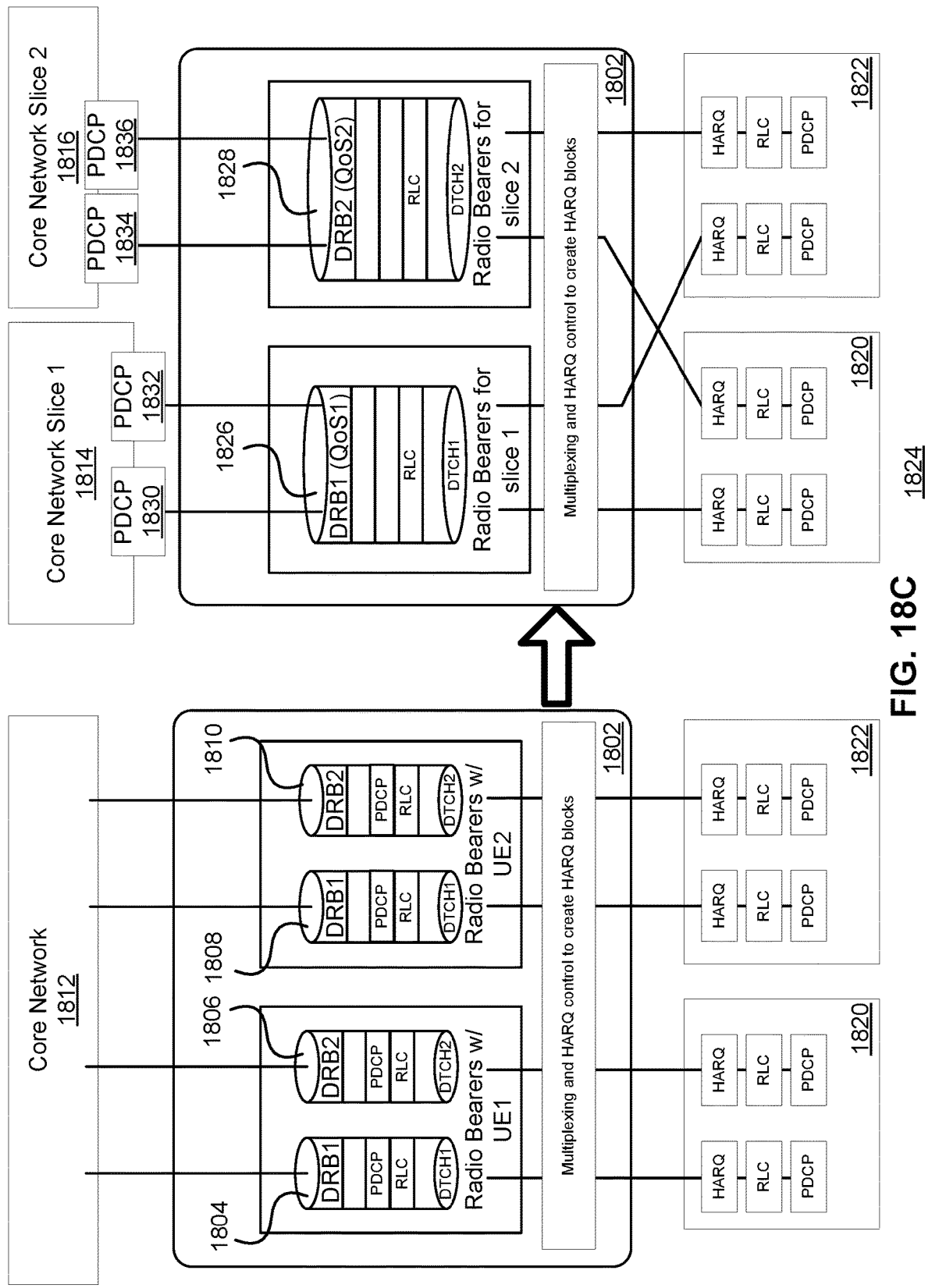

FIGS. 18A-C provide examples of how mappings can be performed and used. As will be understood in view of the following discussions, both security and authentication can be associated with the DRB (or with the slice-to-DRB mapping) to aid in the provision of per device security.

FIG. 18A illustrates the movement 1800 from, on the left side, a conventional DRB mapping, where at an access node, a plurality of DRBs is associated with each UE (here illustrated as UE1 and UE2), to a DRB assignment to different services in different core network slices (shown on the right). Within an access node 1802, DRB1 1804 and DRB2 1806 associated with UE1 are both sent to a gateway connecting the access node 1802 with the single core network 1812. Similarly, DRB1 1808 and DRB2 1810 associated with UE2 (which are distinct from the similarly named DRBs associated with UE1) also transmit received traffic to a gateway associated with the core network 1812.

Using a change in logical assignments of where traffic on different DRBs is sent, as shown on the right side of the Figure, radio bearers 1804 and 1808 which are respectively associated with UE1 and UE2 by the access node 1802 are configured to forward traffic received from the UEs to a core network slice 1 1814. This is due to an association of these DRBs with a service within slice 1 1814. Similarly, traffic received on Data Radio Bearers 1809 and 1810 are directed to core network slice 2 1816.

Those skilled in the art will appreciate that each DRB has an associated packet data convergence protocol (PDCP) and Radio link control (RLC) layers, and may have defined Dedicated Traffic Channel (DTCH) assignments. There may be variance in the PDCP, RLC and DTCH configuration between DRBs, which would result in different DRB characteristics. The differences in these characteristics can be used to align traffic flows from the core network slices 1814 and 1816 with the appropriate DRB.

By configuring a DRB that is uniquely associated with a UE to be used exclusively for traffic associated with a service in a particular network slice, per device security can be configured, and per flow reliability can be offered within the limits of the available resources of the access node 1800. A DRB with sufficient reliability and speed can be associated with traffic from a particular slice to provide a QoS based DRB mapping. From the perspective of the device, the PDCP, RLC and HARQ parameters can be provided to the UE, which will ensure the required QoS, without having to provide QoS information to the UE. When configured to transmit traffic received on a specified DRB to a particular core network slice, the requirement to do end-to-end bearer setup may be obviated. When the UE leaves the service range of the access node, the handover process can include the releasing (or resetting) of any DRB mapping.

FIG. 18B illustrates a configuration for an embodiment, in which an access node 1802 associates DRBs with the core network slices. As with the above embodiment, this may allow for per device security, and can be used to provide reliability on a per device flow basis. RAN slices can be associated with QoS requirements, and the parameters of DRB that can satisfy the requirements can be determined in advance. When a UE connects to the access node to attach to a service, the predetermined DRB parameters can be used to create a DRB to the UE that will map directly to the required network slice. Again, this can be used to avoid an end-to-end bearer setup, and handover procedures can include the resetting of the DRB assignment when a UE departs the service area.

As before, the configuration on the left side of the figure is shown, much as it is described in FIG. 18A. In addition, UEs 1820 and 1822 are illustrated. Within the UEs are functional configurations that show a matching of the required HARW, RLC and PDCP configuration associated with the Access node 1802 and the DRB parameters. The configuration 1818 on the right side of the figure shows the access node 1802 configured the group DRBs 1804 and 1808 with each other because of the connections to the core network slice 1 1814. Similarly, DRBs 1806 and 1810 are grouped with each other because of the connections to core network slice 2 1816. UE 1820 has its second protocol stack which is associated with DRB 2 1806 direct its traffic to the access node 1802, where it is received over DRB2 1806 and connected to the core network slice 2 1816. It should be understood by those skilled in the art that the DRB parameters (e.g. the PDCP and RLC configurations) may be standardized across all the DRBs associated with a given core network slice. Thus, for example, DRB1 1804 and DRB1 1808 which correspond to UE1 1820 and UE2 1822 may have the same DRB parameters to ensure that they are both provided a similarly reliable connection.

FIG. 18C illustrates a DRB mapping embodiment 1824 in which some embodiments can provide per device security and reliability as discussed above. The left side of FIG. 18C illustrates an embodiment in which UEs are each assigned unique DRBs that connect to a core network, as described above. On the right side, the configuration 1824 illustrates a configuration in which both UE1 1820 and UE2 1822 can be considered, by the access node 1802, to use a single DRB, DRB1 1826, to connect to core network slice 1 1814. The AN 1802 can ignore the PDCP layer which is typically different for each UE, by moving the PDCP layer into core network slice 1 1814. Thus, UE1 1820 uses a PDCP configuration that is paired with the PDCP layer 1830 in core network slice 1 1814. It may use the same or a different PDCP configuration for traffic associated with core network slice 2 1816 which will be handled by PDCP 1834. In a configuration in which UE1 1820 uses the same PDCP configuration for all traffic, PDCP 1830 and PDCP 1834 would be configured similarly, if not identically. Similarly, PDCP 1832 and PDCP 1836 are associated with traffic from UE 2 1822. This allows access node 1802 to treat all traffic as being associated with one of two DRBs. DRB1 1826 is configured to support a first QoS level, while DRB2 1828 is configured to support a second QoS level. Both QoS levels will be typically determined in accordance with the requirements specified by services in the corresponding core network slices.

It should be understood that the RLC and PDCP at the UE, is paired with the corresponding RLC and PDCP configurations at the radio bearer and core network slice. In some embodiments, the UE will support different RLC configurations for each DRB. As will be understood, this configuration can be used to provide per device security, channel reliability. The Radio Access Network is configured to associated radio bearers with core network slices to meet QoS requirements. There will be a matching RLC and HARQ process with the AN, and a match between the device and Core Network PDCP implementation. The device can be configured to support per slice radio bearer RLC, HARQ and PDCP. From the RLC configuration of the radio bearer, the PDCP Packet Data Units (PDUs) can be encapsulated within a single RLC PDU. Sequence Numbers can then be used to indicate the RLC PDUs, to allow for in order delivery. The use of a sequence number on the RLC PDU can be paired with a UE side acknowledgement process to alert the access node if an RLC PDU is lost. From the uplink perspective, this configuration allows for an assignment of the physical resources on a per device basis, to allow for transmission of the SN with the RLC. The UE can create an RLC PDU for transmission, and the network can use the same SN to ensure in sequence delivery (with a corresponding acknowledgement process as described above).

From the perspective of the network, the PDCP and per slice RLC should be configured, along with the AN HARQ process. Matching configurations can be sent to the UE for implementation. Upon UE handover, the slice RLC, HARQ and device PDCP configurations can be provided to the target location.

The configuration of FIG. 18C can also be used to provide a configuration that is used for per device security, along with in-sequence delivery. Preconfigured slice specific radio bearers can be prepared with defined QoS, RLC and HARQ configuration at the AN. The UE can then be configured with a slice specific radio bearer configuration for the RLC and device PDCP. A device specific PDCP configuration can be used to provide enhanced security. The Radio Access Node can be configured to map radio bearers with a HARQ and RLC configuration determined in accordance with a service with a network requirement for QoS. The Device can be configured with a slice specific radio bearer RLC and HARQ configuration, and a device specific PDCP. The network slice is then responsible for the PDCP, and an ensure that no PDCP PDUs associated with different devices are encapsulated into an RLC PDU. A Sequence Number (SN) can be introduced to indicate the slice specific RLC PDUs. In downlink communication, from the network slice, an SN on the RLC PDU can be paired with a device side acknowledgement process (e.g. ACK/NACK) on a per RB basis. Because the RB is associated with a slice, there is a complete RLC and PDCP acknowledgement.

In an uplink direction, the network can be configured to indicate that the assigned physical resource is associated with a particular device, and RLC PDUs can be tracked with an SN. At the device side, the UE can create an UL RLC PDU and transmit it through the defined DRB. The network can use the same SN to ensure in-sequence delivery and ack/nack to UL RLC PDU. The AN can be configured to setup the PDCP with the slice, and then use a slice specific RLC, in addition to a HARQ. When a UE is being handed over to another AN, the slice specific RLC configuration can be reset, and the HARQ configuration and device specific PDCP configuration details can be migrated to the target location.

As noted with reference to FIG. 18C, it is possible to move a device specific PDCP layer into the Network Slice associated with the DRB. It should be further understood that in some embodiments, the RLC layer can be removed from both the AN and the UE. This simplification, eliminates RLC processing, and can rely upon the PDCP (which can be implemented at the UE and in the connected slice) to provide both security and in sequence delivery. The AN can preconfigure the Radio Bearer, with a per slice HARQ configuration, and a device specific PDCP configuration. This simplified setup can reduce the setup to a definition of the PDCP parameters. In a handover situation, only the PDCP configuration information needs to be moved to the target location.

In another configuration, the PDCP configuration can be slice specific instead of device specific. This allows for an even more simplified configuration that makes use of slice wise ciphering (or possibly per slice/service ciphering) with an accompanying acceptance that there may not be a reliability requirement. There is a simplified per-slice RB mapping that provides the needed slice and security function (through a slice specific PDCP configuration). Upon connecting, the electronic device is configured for the slice RB HARQ and the implemented per slice PDCP. The UE may be required to obtain access link authorization prior to transmission. The handover process for this configuration may require key synchronization between the slice specific PDCPs.

Those skilled in the art will appreciate that the different configurations discussed above can be combined at a single AN. For example, a service that has a high requirement for security and reliability, may have an AN configuration as shown in 1818 for a set of DRBs associated with a first core network slice, and a simplified slice specific PDCP configuration as discussed above for a second DRB associated with a second core network slice.

Figure 19:
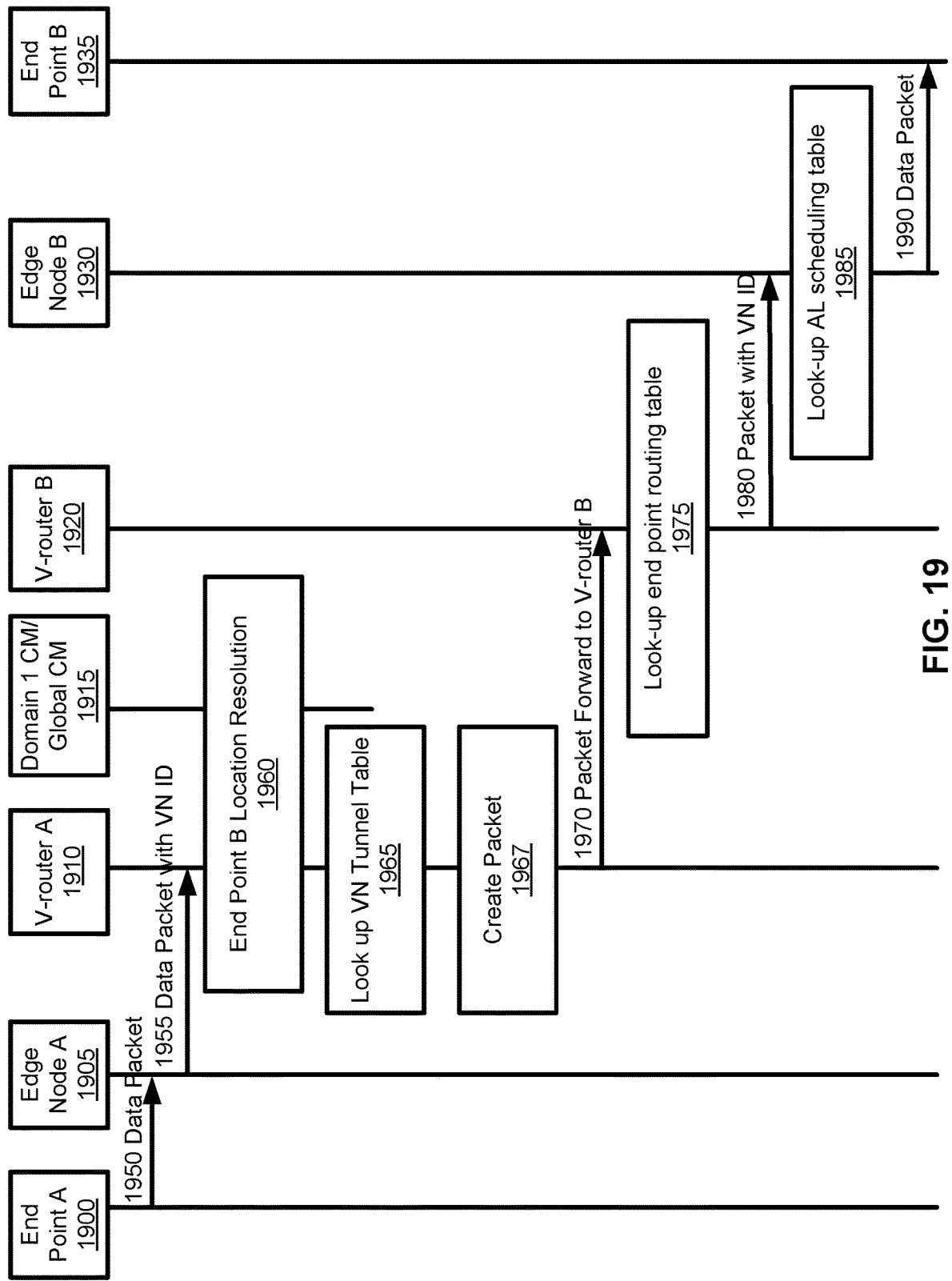
FIG. 19 illustrates an example communication procedure, according to embodiments of the present invention.

FIG. 19 is a signaling diagram illustrating an example of a hop-on procedure for a first end point A 1900 transmitting a packet to another end point B 1935. A service-based resource allocation is also assumed, in which dedicated VN and access link resources are allocated to this VN. In this assumption, dedicated access link resources are assigned to the VN for both transmission to and from the end points 1900, 1935 and all end points 1900, 1935 using the service share the same resources, so that there is no need to differentiate between end points 1900, 1935. By using dedicated access links, there is no signaling incurred for access link allocation or session establishment. On the network side, location resolution signaling is performed. End point A 1900 is associated with an edge node A 1905 and has a data packet to transmit to end point B 1935 currently associated with edge node B 1930. The VN ends at the access link and admission control is not used. It is assumed that the access links in both edge nodes 1905, 1930 correspond to dedicated resources for the virtual network being used.

In more detail, end point A 1900 transmits 1950 a data packet designating the VN is to be used and also designating the data packet is destined for end point B 1935. The edge node A 1905 detects that the packet is to be associated with the VN (or a service thereof) and forwards 1955 the packet to the pre-configured next virtual node which hosts v-router A 1910. In some embodiments, the edge node A 1905 may encapsulate the packet prior to forwarding. The VN node 1910 interacts with a CM 1915 to perform a location resolution operation 1960 for determining the current location of end point B 1935. The CM 1915 may be a domain-level CM or a global CM of a hierarchical CM entity. The VN node 1910 then looks up 1965 a VN tunnel table in order to determine which VN tunnel is to be used to forward the packet toward end point B 1935 via edge node B 1930 which is as indicated by the CM 1915. The VN node 1910 then creates and addresses 1967 the tunnel packet. The VN node 1910 then prepares and forwards 1970 the packet to v-router B which is part of routing the packet toward edge node B 1930 via an appropriate set of VN tunnels. The first tunnel is determined by the v-router at the VN node 1910, with subsequent tunnels being determined by subsequent v-routers in a hop-by-hop manner. In the forwarding process, another VN node, holding v-router B 1920 and serving as an anchor node for end point B 1935, receives the packet and performs a lookup operation 1975 in an end point routing table to determine that the packet is to be forwarded to edge node 1930 which is operating as an edge node for end point B 1935. The device routing table holds the association between end point B 1935 and edge node 1930. The v-router 1920 then forwards 1980 the packet to edge node 1930. Edge node 1930 looks up 1985 scheduling information associated with the VN in an access link scheduling table. In the present example, edge node 1930 determines that dedicated access link resources are to be used for transmitting the packet to end point B 1935 according to the service, and that service based scheduling should be used. The edge node 1930 then transmits 1990 the packet to end point B 1935 using these dedicated access link resources and service-based scheduling.

If the location of end point B 1935 is fixed, location resolution may be omitted. It is also noted that one or both of end point A 1900 and end point B 1935 may be replaced with other types of end points, such as servers.

Figure 20:
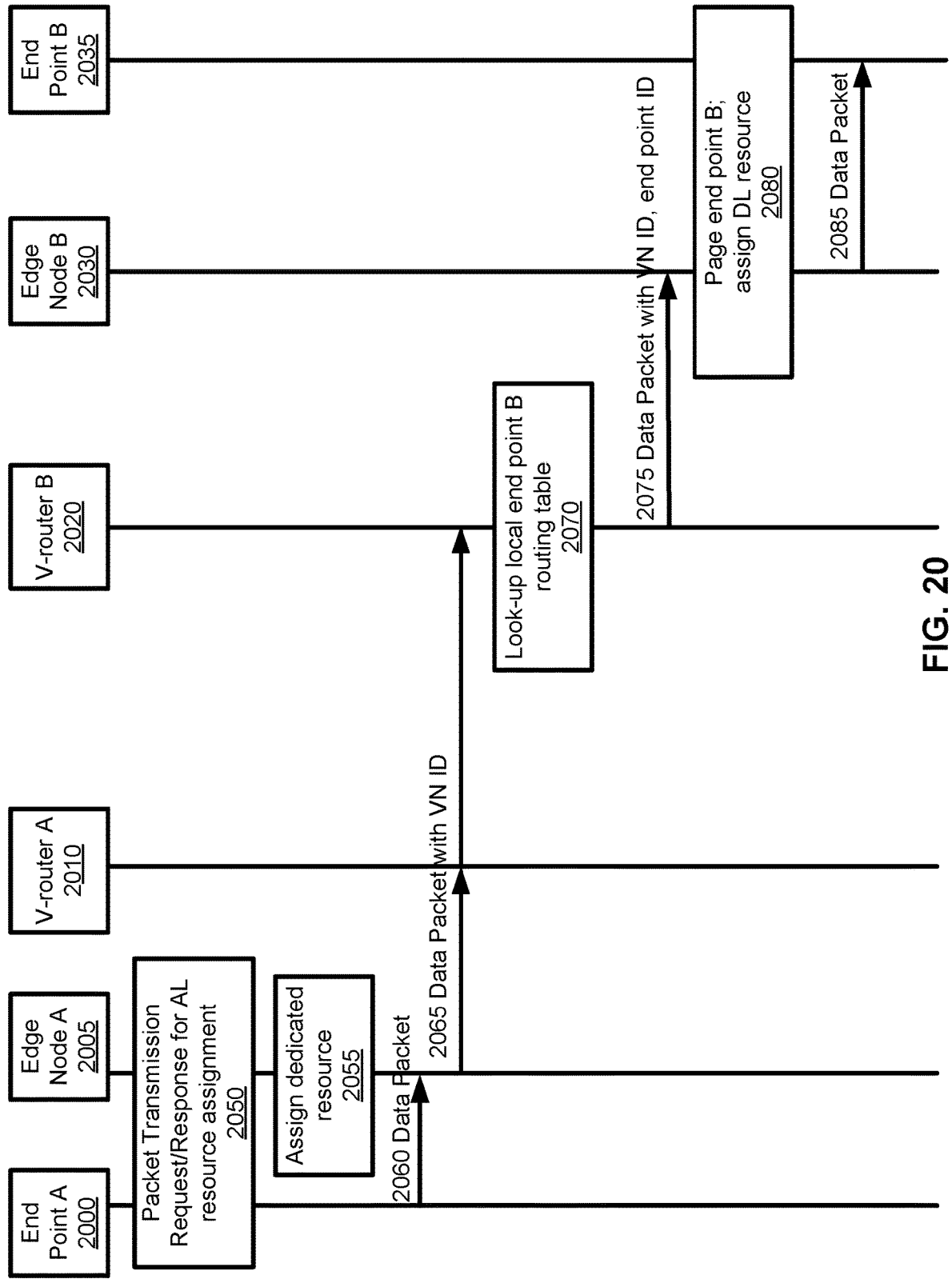
FIG. 20 illustrates another example communication procedure, according to embodiments of the present invention.

FIG. 20 is a signaling diagram illustrating an alternative example of UE traffic delivery by hop-on, in which the VN again allows hop-on without admission control. In FIG. 20, the VN ends at an edge node (e.g. access point). In this case the access link (AL) resources are assigned for a UE/session, and no session establishment set up at network side is required.

In more detail, end point A 2000 transmits 2050 a request for packet transmission permission and/or an assignment of access link resources. The request is transmitted to an edge node A 2005, and in response the edge node A 2005 transmits a resource assignment message to end point A 2000. An indication of the virtual network may be included in the request and/or response. The edge node A 2005 then assigns 2055 the dedicated resource, including a resource identifier, a device identifier and a virtual network identifier. End point A 2000 then transmits 2060 a data packet designating treatment by the VN, and designating end point B 2035 as a destination for the packet. The packet is then forwarded 2065 from the edge node A 2005 to v-router B 2020 to which end point B 2035 associates. For example, v-router B 2020 may be part of an anchor VN node for end point B 2035. The forwarding is performed via v-router A 2010 to which end point A 2000 associates, and may include routing via multiple v-routers, and location resolution requests and responses (not shown). V-router B 2020 performs a lookup operation 2070 to determine that edge node B 2030 is serving end point B 2035, and forwards 2075 the packet to edge node B 2030, including a designation of the virtual network, the identity of end point B, and other information such as a paging cycle for end point B. The edge node B 2030 pages 2080 end point B 2035 and assigns downlink resources for transmitting the packet to end point B after receiving a paging response. The edge node B 2030 then transmits 2085 the packet to end point B 2035 in accordance with the schedule.

For FIG. 20, it is noted that, in one embodiment, if the UEs are not mobile, the only signaling required is the signaling 2050 (transmission request and response) and 2080 (paging and response).

Figure 21:
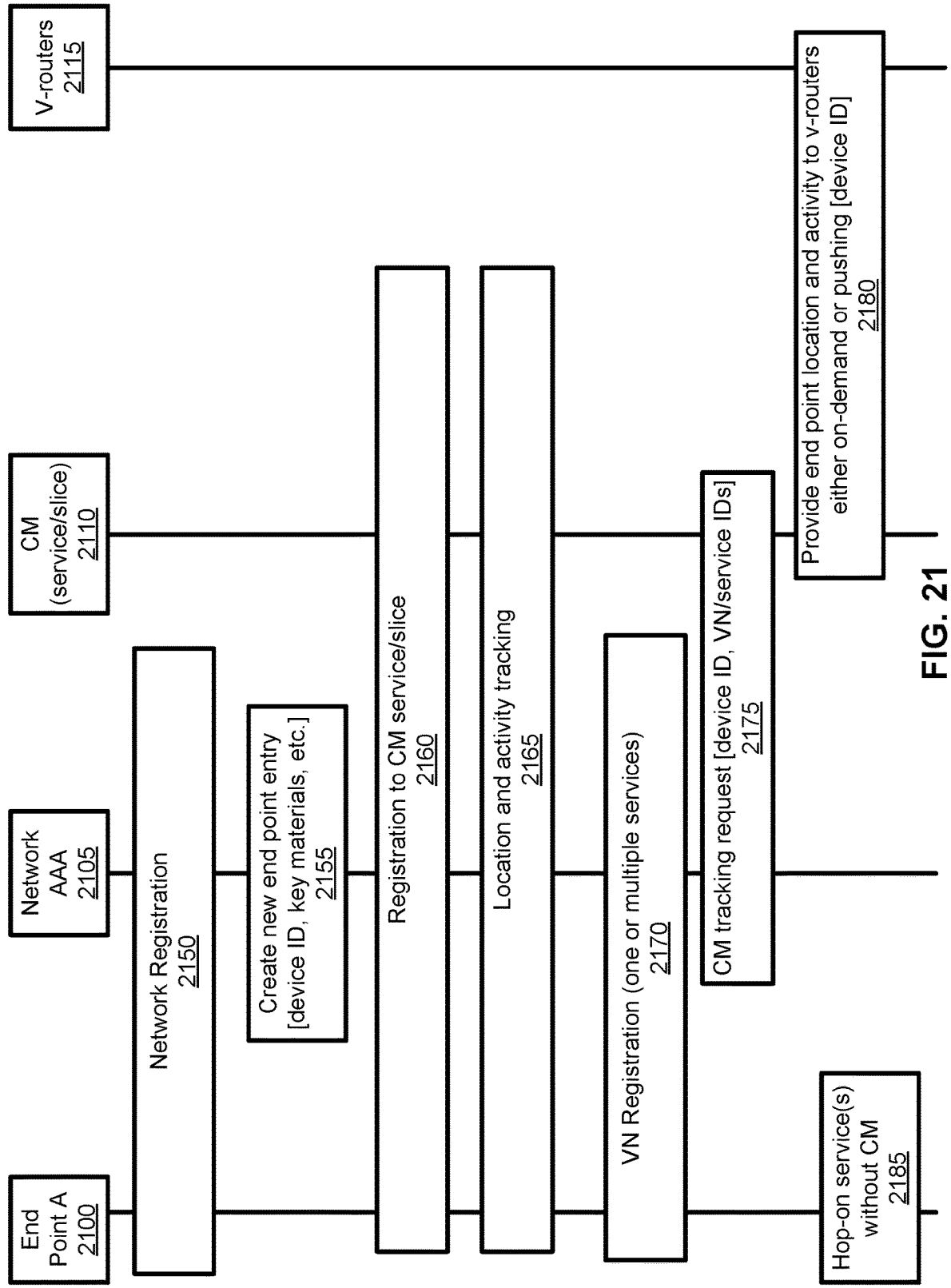
FIG. 21 illustrates an example pre-registration procedure, according to embodiments of the present invention.

FIG. 21 is a signaling diagram illustrating an example of operations required before hop-on, from the network perspective, according to an embodiment of the present invention. The illustrated process assumes that the logical connection between CMs and VN v-routers has been established (e.g. by SONAC-Com) during VN composition. In this process, no admission control is required.

In more detail, end point A 1100 performs a network registration operation 1150 in association with a network registration entity 1105. The network registration entity 1105 may be an authentication, authorization and accounting (AAA) server, for example. Network registration 1150 is separate from registration to a service or VN. The network registration entity 1105 creates 1155 a new database entry indicating the identity of end point A 1100, and encryption key materials. Following registration with the network, end point A 1100 registers 1160 to a CM 1110, which may reside in a network slice. The CM slice holds CM entities which begin tracking end point A 1100 upon registration. End point location tracking and end point activity tracking are subsequently performed 1165 by the CM entities following the registration. End point A 1100 subsequently registers 1170 with a VN, for example by interaction with the network registration entity 1105, to access one or more services. The network registration entity 1105 responds by submitting a tracking request 1175 to the CM slice 1110. The tracking request includes an identity of end point A 1100 and an indication of the VN (and service(s)) to which end point A 1100 has registered. Where a VN supports only a single service, then the VN ID may be used to identify that service. Where the VN supports multiple services, then the VN ID in combination with a service ID may be used to identify and distinguish between the services.

In response to the tracking request 1175, the CM entities begin providing 1180 location and activity status information for end point A 1100 to the v-routers 1115 of the VN. The information may be provided in a variety of ways, for example by providing information updates as changes to the status information are received, providing updates on a predetermined schedule, and/or providing updates upon request by the v-routers. Subsequently, end point A 1100 may "hop on" 1185 the VN by transmitting and/or receiving data packets.

Figure 22:
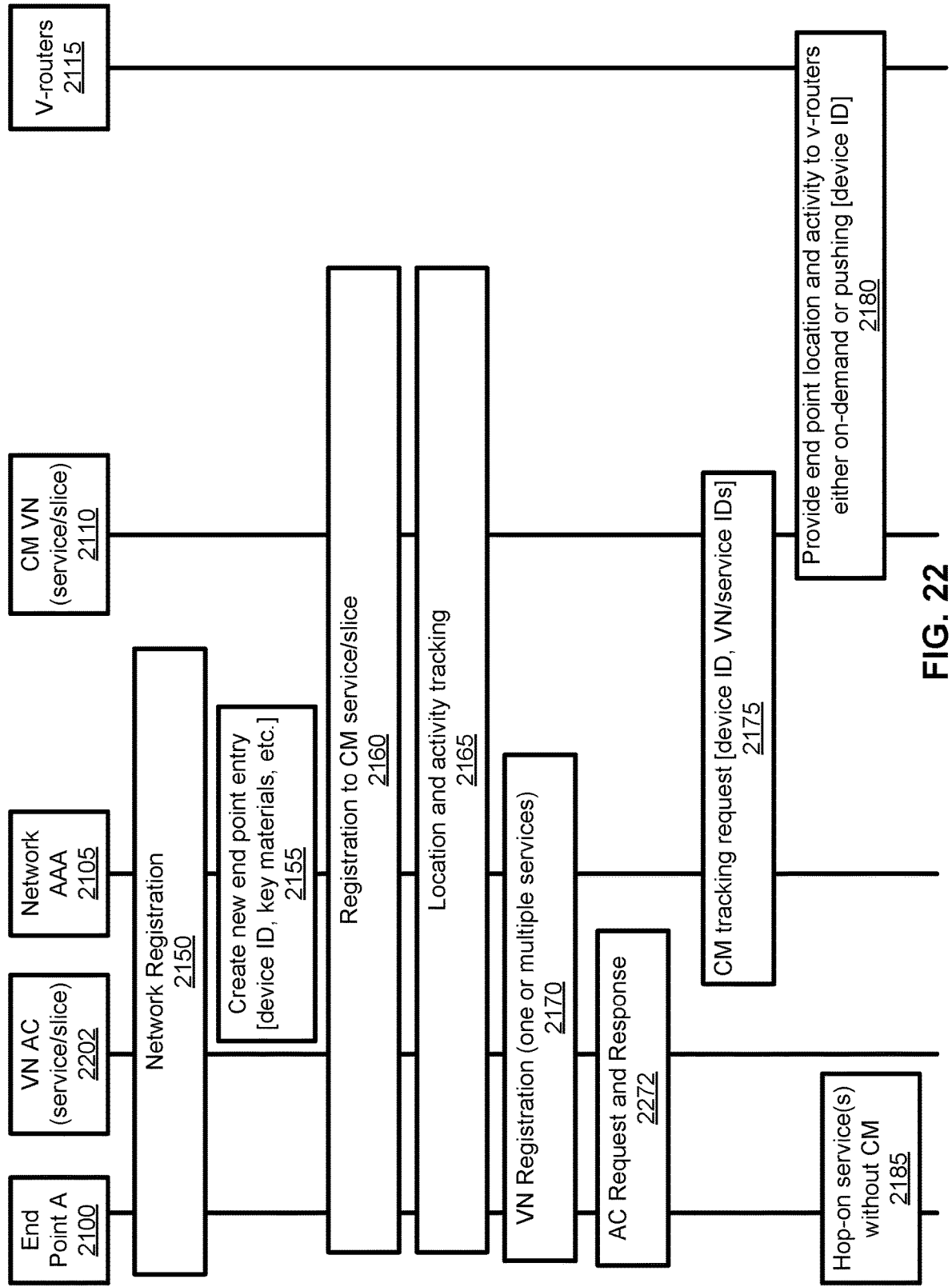
FIG. 22 illustrates another example pre-registration procedure, according to embodiments of the present invention.

FIG. 22 is a signaling diagram illustrating an example of the steps required before hop-on, from the network perspective, according to another embodiment of the present invention in which admission control is implemented. The illustrated process assumes that the logical connection between CMs and VN v-routers has been established during VN composition.

The procedure of FIG. 22 is similar to that of FIG. 21, and the description of similar elements is as described above. A per-VN (or per-slice or per-service) admission controller 2202 is provided. In this case, following registration 2170 of end point A 2100 to the VN, end point A 2100 transmits 2272 an admission or "hop on" request to the admission controller 2202 and receives a response from the admission controller 2202 indicative of whether the end point A 2100 is admitted to use the VN. If end point A is not admitted, the procedure terminates. If end point A is admitted, provision of location and activity status information for end point A 2100 to the v-routers of the VN commences as described above. Additionally, end point A 2100 may "hop on" 2185 the VN by transmitting and/or receiving data packets.

It is noted that, in FIGS. 21 and 22, end point A may be replaced with another type of end point, such as a server. When the end point is not mobile, location tracking may be omitted.

According to some embodiments, if an end point is fixed, dedicated resources are assigned for transmitting both from and to the end point, and there is no need to differentiate between different end points using an edge node, signaling-free hop-on can be enabled.

In one embodiment, access link resources for transmitting packets from end points to a VN are dedicated and there is no need to differentiate among end points. In this case, an end point can transmit a data packet to the VN using the dedicated access link resources to send data to a server without any signaling. This may be used for example for smart metering or similar applications. Similarly, if the server has a packet to transmit to one of the end points, the packet can be routed to an anchor VN node for the end point, and from there transmitted over a broadcast channel which is dedicated for use by the VN. Again, this may be performed substantially without signalling overhead at the time of data transmission. VN router operations and interaction with physical network nodes are performed locally. When signaling overhead is reduced, latency is also reduced. When dedicated resources are assigned for tunnels of the VN, latency can be further reduced.

Alternatively, if there are no dedicated access link resources allocated to a VN, some access link signaling may be required for assigning resources for transmission both to and from end points. However, network side signaling may still be reduced.

Figure 23:
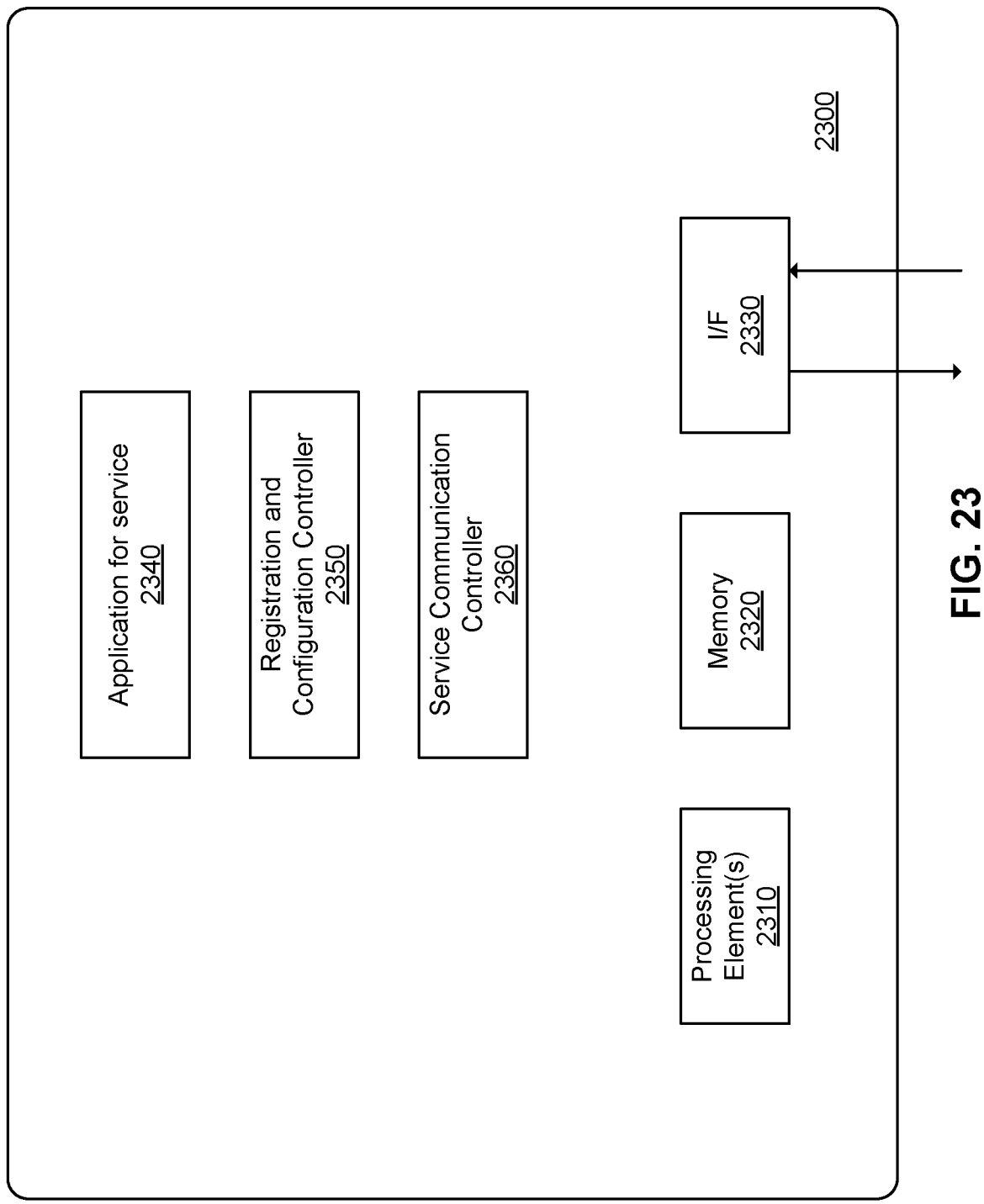
FIG. 23 illustrates an end point provided according to embodiments of the present invention.

FIG. 23 illustrates an end point 2300, such as a UE or server, provided in accordance with an embodiment of the present invention. The end point 2300 generally includes one or more processing elements such as a computer processor 2310, a memory 2320 and a communication interface 2330 such as a network interface or wireless transmitter and receiver. The end point may include an application 2340 which is associated with the service, for example which generates data for transmission to the service or relies on data received from the service. The end point includes a registration and configuration controller 2350 and a service communication controller 2360. The application 2340, registration and configuration controller 2350 and service communication controller 2360 may for example be provided by operation of the processor 2310 executing program instructions stored in the memory 2320.

The registration and configuration controller 2350 transmits (using the communication interface 2330) a registration message to the network via an edge node to register the end point with the service. Upon receipt of operating parameters from the edge node for use in accessing the service, the registration and configuration controller 2350 configures the service communication controller 2360 in accordance with the operating parameters. The service communication controller 2360 then causes the end point to utilize the operating parameters when interacting with the end point in association with the service. For example, the service communication controller 2360 may insert a VN ID and/or service ID into service-related packets to be transmitted. As another example, the service communication controller 2360 may cause the end point to use certain reserved access link resources when transmitting and/or receiving service-related packets.

Figure 24:
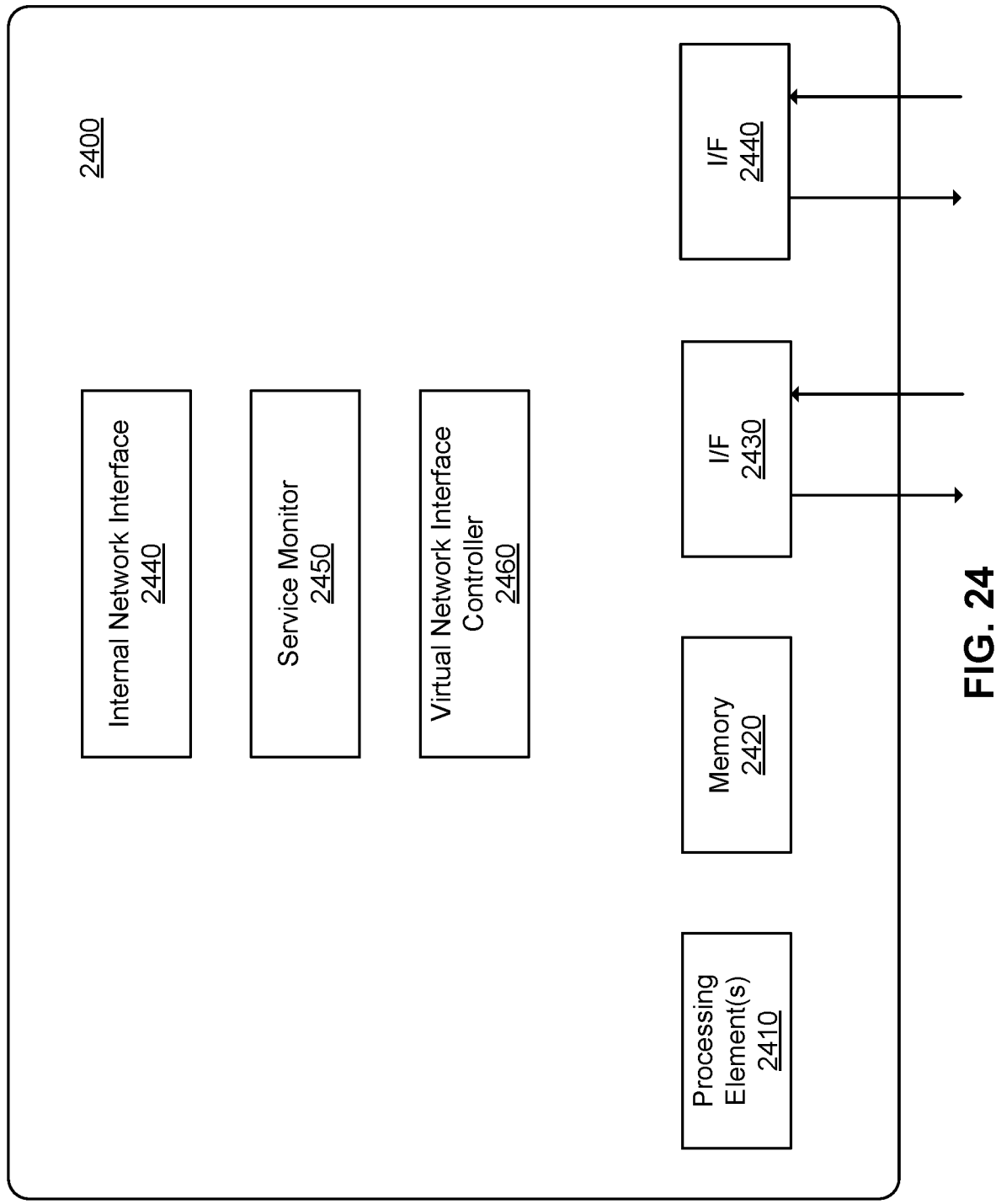
FIG. 24 illustrates an edge node provided according to embodiments of the present invention.

FIG. 24 illustrates an edge node 2400, such as a wireless access node or gateway, provided in accordance with an embodiment of the present invention. The edge node 2400 generally includes one or more processing elements such as a computer processor 2410, a memory 2420, an end point communication interface 2430 such as an external network interface or wireless transmitter and receiver, and an internal network interface 2440. The edge node includes a service monitor 2450 and a virtual network interface controller 2460. The service monitor 2450 and the virtual network interface controller 2460 may for example be provided by operation of the processor 2410 executing program instructions stored in the memory 2420.

The service monitor 2450 monitors for packets, transmitted by end points and associated with a service. The packets may be detected as being associated with a service by including an appropriate identifier, such as a service ID and/or a VN ID related to a VN supporting the service. The packets may be detected as being associated with a service at least in part via the access link resources used to transmit the packet, as inferred by the service monitor based on reception of the packet (e.g. based on timing of receipt, frequency band on which the signals conveying the packet are received, and/or codes used).

The service monitor 2450 provides packets which are determined to be associated with the service to the virtual network interface controller 2460. The virtual network interface controller 2460 then forwards such packets to the VN, for example to a VN node operating at the edge node or operating at another network node communicatively coupled to the edge node. The virtual network interface controller 2460 may mark the packets as being for handling by the VN and/or encapsulate the packets for transport using a tunnel supported by the VN.

Figure 25:
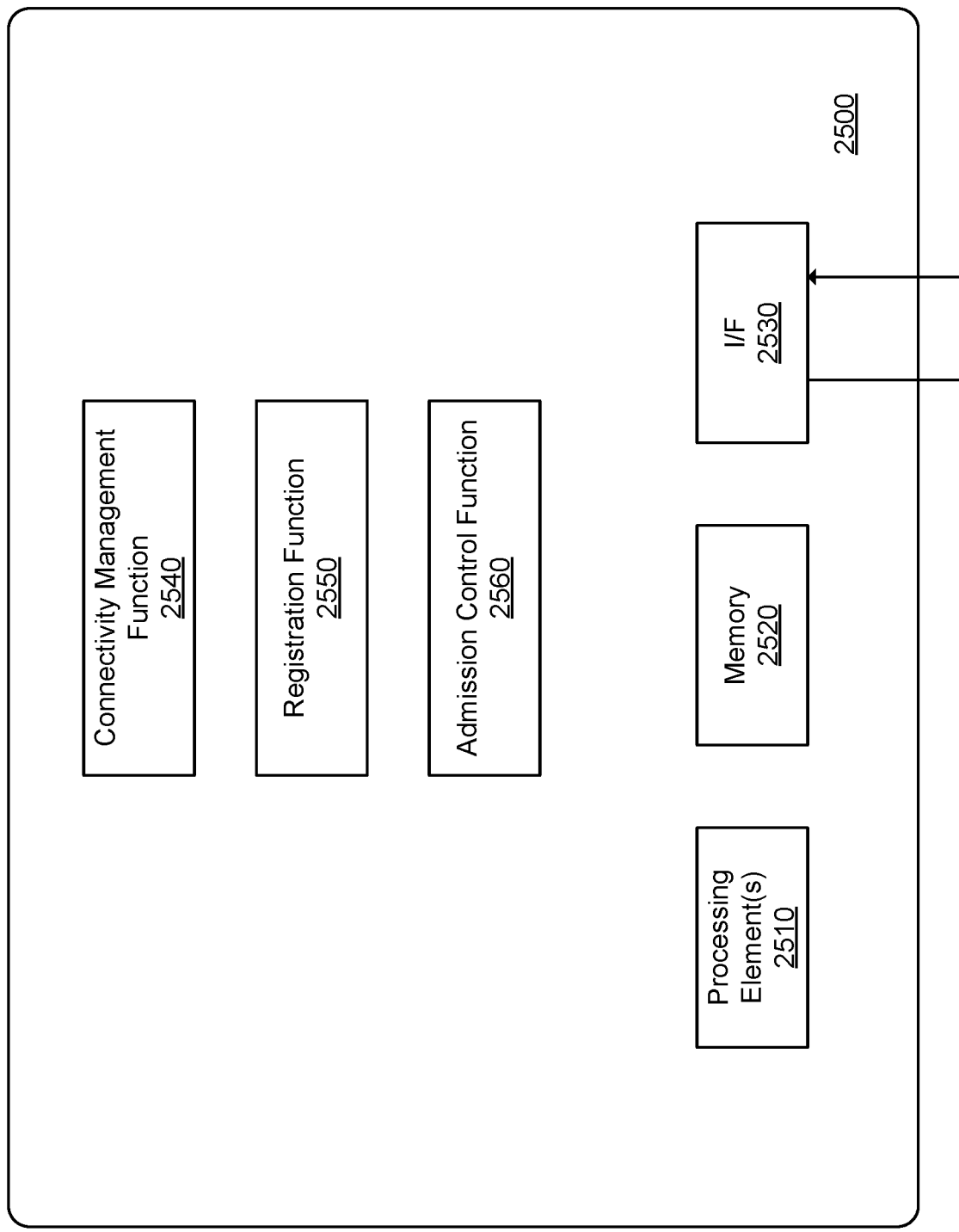
FIG. 25 illustrates another apparatus provided according to embodiments of the present invention.

FIG. 25 illustrates another apparatus 2500, which may be for example a connectivity manager, admission controller, or AAA server. The apparatus includes one or more processing elements such as a computer processor 2510, a memory 2520 such as an electronic computer memory, and a network interface 2530 configured to bi-directionally communicate with other network nodes in the communication network. In this and other apparatuses, the processor and memory configuration may be supplemented or replaced with other electronic hardware configured to perform a desired set of computing operations, such as integrated circuits or logic gate systems. The processor and memory (or other hardware components) may be operated to provide a desired functionality of the apparatus, for example by implementing a connectivity management function 2540 which registers and tracks end point locations and provides location updates to v-routers, a registration function 2550 which registers end points to a particular service and provides configuration information thereto, and an admission control function 2560 which receives and responds to admission control requests when an end point attempts to transmit service-related data via the VN.

Figure 26:
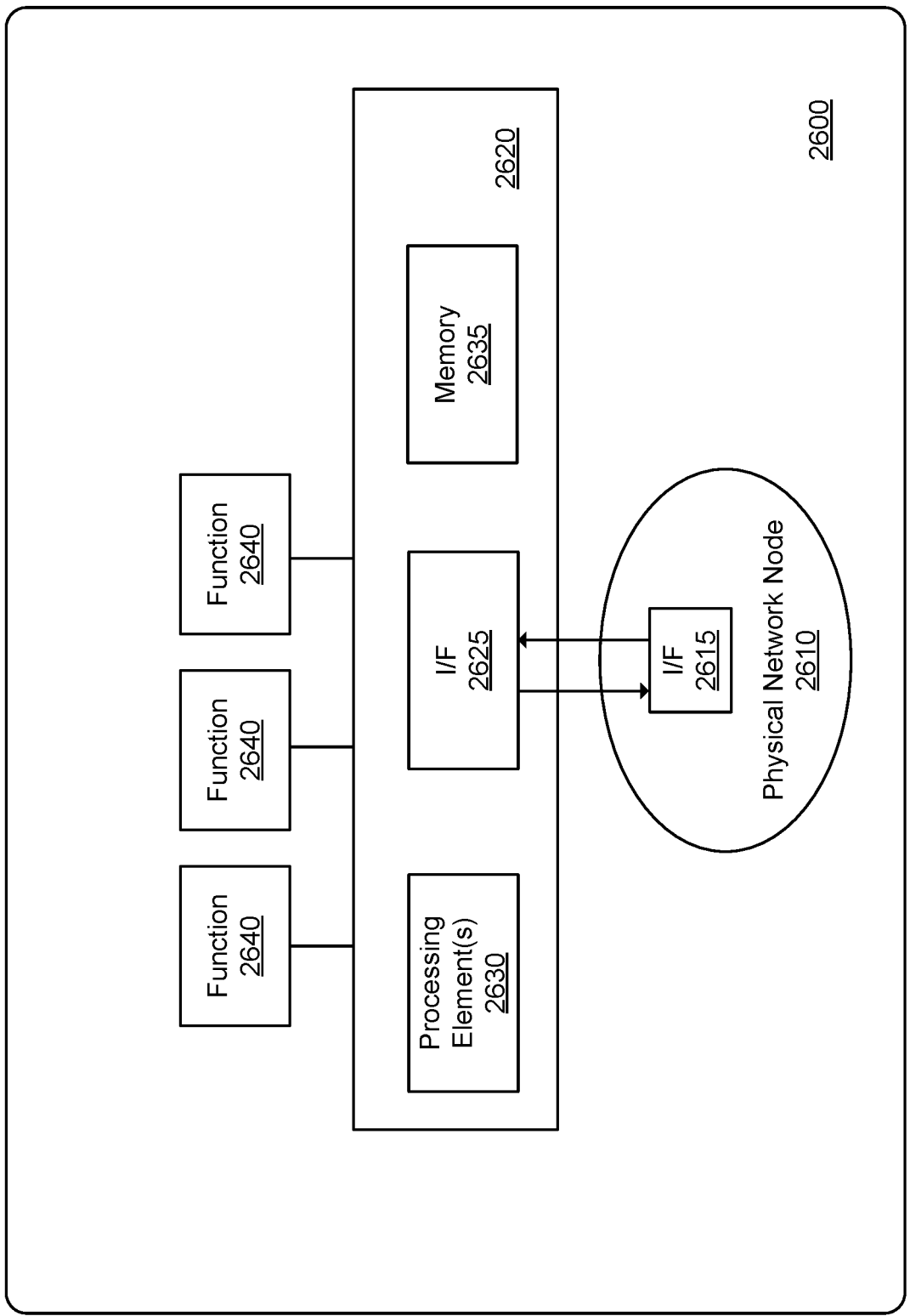
FIG. 26 illustrates yet another apparatus provided according to embodiments of the present invention.

FIG. 26 illustrates an apparatus 2600 in the network which is provided using a virtualization approach. The apparatus illustrated in FIGS. 24 and 25 may be virtualized, for example. The apparatus includes a physical node 2610, which may be a core network node or an edge node of the communication network. The physical node includes at least a communication interface 2615. The apparatus further includes cloud or data centre computing resources 2620 including one or more processing elements, such as computer processor(s) 2630 and memory resources 2635 that are allocated for use to the physical node 2610. The cloud/data centre resources 2620 are typically located at least partially remotely from the physical node 2610 and linked to the physical node 2610 via communication between the communication interface 2615 and a communication interface 2625 located in the cloud or data center. In other aspects, the cloud/data centre resources 2620 may be supported by one or more servers either co-located with the physical node 2610, or communicatively linked to the physical node 2610. The cloud/data centre resources 2620 may be used to implement one or more functions 2640 of the apparatus.

Embodiments of the present invention provide for a method and apparatus for routing data packets through a network. A virtual network (VN) is instantiated within the network such that a subset of the network nodes is associated with VN nodes. Logical tunnels between selected pairs of VN nodes are defined as part of the VN. Virtual network virtual routers (v-routers) are associated with some or all of the VN nodes. Each v-router is configured to route packets, received at the VN node and corresponding to a service supported by the VN, onto an appropriate one of the logical tunnels having ingress at the VN node. A logical tunnel having its ingress at a first VN node and its egress at a second VN node can be implemented by a set of network nodes of the communication network which forward appropriately marked data packets in a hop-by-hop manner from a network node associated with the first VN node toward another network node associated with the second VN node.

It is noted that the logical tunnels and the v-routers are provided prior to an end point requests usage of the VN, according to a service. In some embodiments, the logical tunnels and the v-routers are provided prior to the VN being assigned to support a service. This is in contrast to existing approaches, which establish communication session paths between endpoints in response to a request for serving a particular end point device.

Some embodiments additionally or alternatively comprise routing data packets via open logical tunnels having ingress at a given VN node, but having a tunnel egress that is unspecified. Some embodiments additionally or alternatively comprise routing data packets via open logical tunnels having egress at a given VN node, but having a tunnel ingress that is unspecified.

Figure 27:
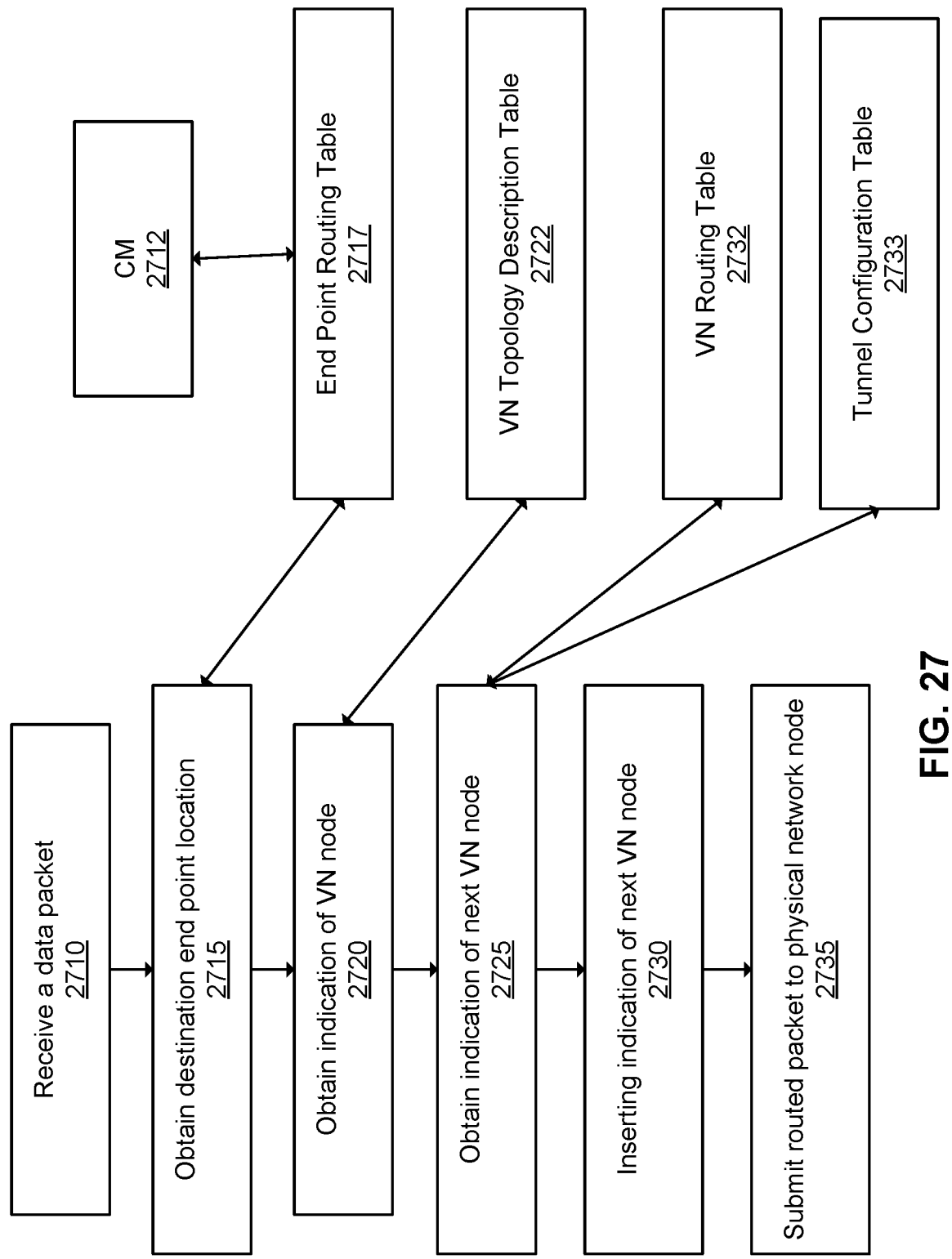
FIG. 27 illustrates interaction between an end point, a connection management entity, and a virtual router of a virtual network, according to embodiments of the present invention.

Having reference to FIG. 27, embodiments of the present invention provide operations for routing a data packet toward a destination end point over a virtual network (VN) pre-configured on a network. The VN may be operated in support of a particular service with which the data packet is associated. The routing is performed by a virtual router (v-router) associated with a VN node of the VN. The VN node is associated with a particular physical network node of the network. The operations include the virtual router receiving 2710 a data packet associated with the VN. The destination end point may be specified explicitly in the data packet by including a name identifier (i.e. a name ID) corresponding to the destination end point in the packet header. The operations include the virtual router obtaining 2715 a location corresponding to the destination end point as identified by the name identifier. The location may be obtained via a lookup operation performed on an end point routing table 2724 which correlates end point name identifiers with current logical locations available on the VN. The end point routing table may be dynamically updated via communication with a CM 2712 or other network entity which tracks locations of registered end points. The operations include the virtual router obtaining 2720 an indication of a destination VN node corresponding to the obtained location. The indication of the destination VN node may be obtained via a lookup operation performed on a VN topology description table 2722. The operations include the virtual router obtaining 2725 an indication of a next VN node on a pre-configured path between the VN router and the destination VN node. The indication of the next node may be an identifier of a next VN node on the path, or an identifier of the physical network node which is associated with such a next VN node. In some embodiments, the indication of the next VN node is obtained via a lookup operation performed on a VN routing table 2732. In some embodiments, the indication of the physical network node associated with the next VN node is obtained via a lookup operation performed on a tunnel configuration table 2733. The operations include the virtual router inserting 2730 the indication of the next VN node into the data packet to produce a routed data packet. The operations include the virtual router submitting 2735 the routed data packet to the physical network node (associated with the current VN node) for transmission across the network to the next node (e.g. the physical network node associated with the next VN node). As such, based on a name or ID of the destination end point, and the acquired location information, the v-router will route the data packet to an appropriate next tunnel or next VN node.

In some embodiments, the physical network node forms the first node in a set of network nodes which ends at an end node, which is the next physical network node associated with the next VN node. The set of network nodes may also include one or more intermediate network nodes between the first node and the end node. The set of network nodes may be a chain of nodes, each of which forwards the data packet in a hop-by-hop manner, or a more complex network structure including one or more parallel paths. The set of network nodes operates to provide a logical tunnel between the VN node and the next VN node. The set of network nodes forwarding the packet may thereby implement a logical tunnel.

The above-described tables are stored in memory locations which are accessible to the v-router, for example in local computer memory or computer memory of a datacenter or set of cloud resources which also house computer processing facilities of the v-router.

Embodiments of the present invention provide for a method for routing a data packet in accordance with the operations described with respect to FIG. 27. Other embodiments of the present invention provide for a v-router configured to perform the operations described with respect to FIG. 27, or a VN node having such a v-router, or more generally a functionality associated with a network node which performs such operations. For example, a network node may be configured, through local or remote configurable computing or packet processing resources, to operate as described with respect to FIG. 27.

Embodiments of the present invention provide for operation of a network of interconnected v-routers at a respective plurality of interconnected VN nodes, to route a data packet toward an end point, specified in the packet, in accordance with a service supported by the VN. At least one of the v-routers operates as described with respect to FIG. 27. In various embodiments, once one of the v-routers obtains some information, such as a location corresponding to the destination end point and/or a destination VN node, this information can be inserted into the data packet, and v-routers which subsequently handle the data packet can obtain the information, if necessary, from the data packet. Plural v-routers each handle the data packet in turn, in a hop-by-hop manner, to forward the data packet toward the destination end point.

In some embodiments, following location registration, the v-routers of the VN are configured to create an entry (associated with the registered end point) in an end point routing table held thereby. The entry includes current routing information for the end point, associated with the end point name identifier (name ID). Information may include, for example, a service identifier such as a VN ID and/or service ID, end point name ID, and an identity of a next VN node to use for routing packets toward the end point via the VN. In the examples provided below, the VN supports a single service, and accordingly the VN ID can also serve as a service ID (i.e. the service is identified by referring to the VN ID). In embodiments where a VN supports multiple services, then the combination of a VN ID and a service ID would be required to identify a particular service (i.e. the service is identified by referring to the combination of VN ID and service ID).

FIGS. 28A, 28B, 28C, 28D, and 28E illustrate an example operation of a VN in relation to the VN routing process for a mobile end point. In this example, v-router 1 is to forward a data packet to destination end point device B which is associated with VN Node 2. V-router 1 checks its end point routing table and determines that the next VN node ID=2.

The v-router inserts VN ID and VN node ID to the packet and submits the packet to SDRA-Op for handling.

Figure 28A:
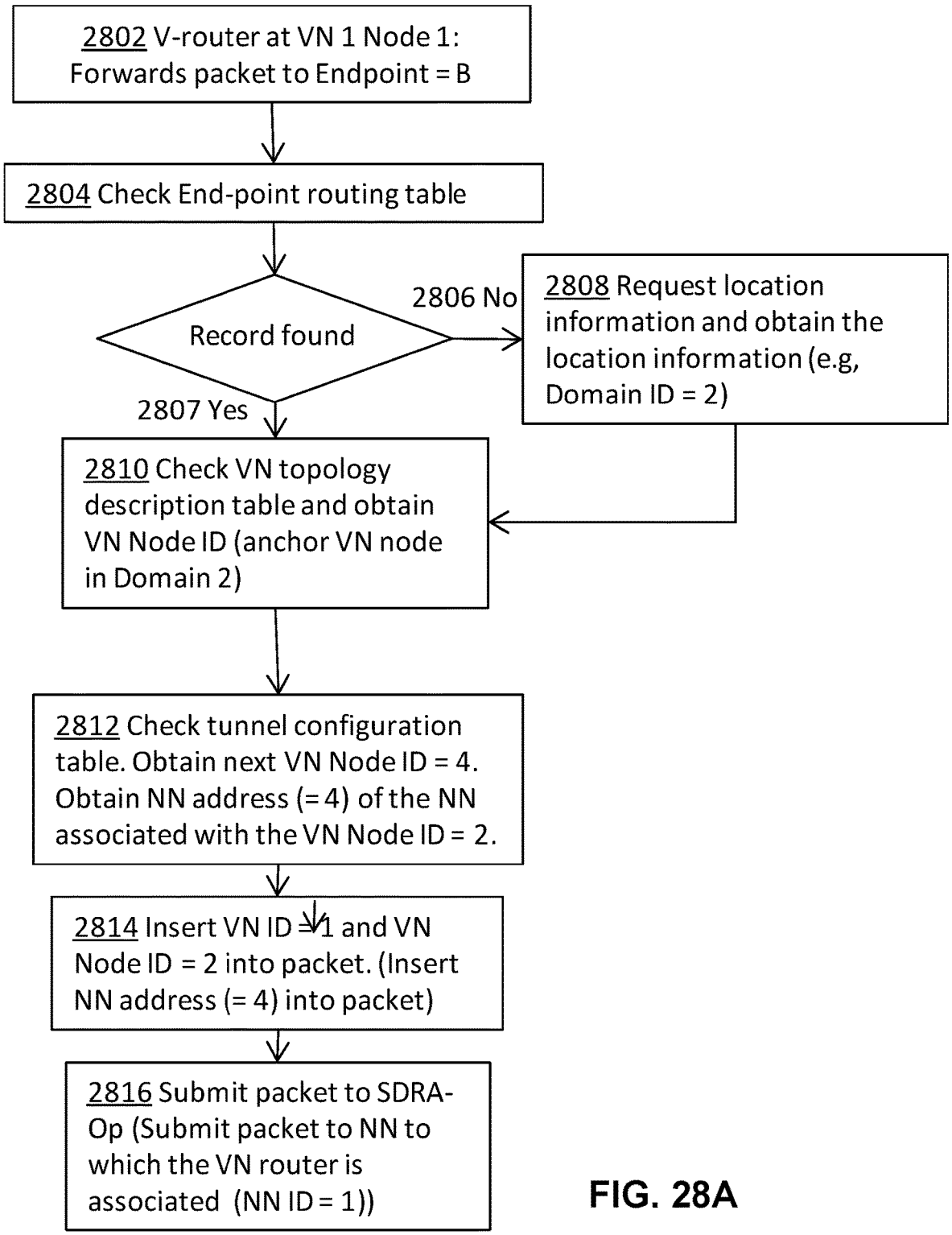
FIG. 28A illustrates operation of a v-router according to an embodiment of the present invention.

FIG. 28A illustrates operation of a v-router according to an embodiment of the present invention. FIG. 28A is described in relation to the embodiment of virtual router and virtual node layout in relation to an exemplar physical layout of network nodes depicted in FIG. 28E. The v-router 2862 labelled "VN 1 Router 1" and located at VN 1 node 1 2852 (see FIG. 28E) is presented with a task 2802 to forward a packet to a destination end point with name ID "end point B". To execute this task, the v-router checks 2804 an end point routing table accessible thereto, for a record associated with this end point. If a record is not found 2806, then the v-router 2862 transmits a request 2808 for location information to a CM entity 2880 (see FIG. 28E), and obtains a response including location information for end point B. Otherwise, if a record corresponding to end point B is found 2807 in the end point routing table, the location information request 2808 can be omitted. The location information may be, for example, an identity of a network domain (e.g. "Domain ID=2" via which end point B is currently accessible.

Figure 28E:
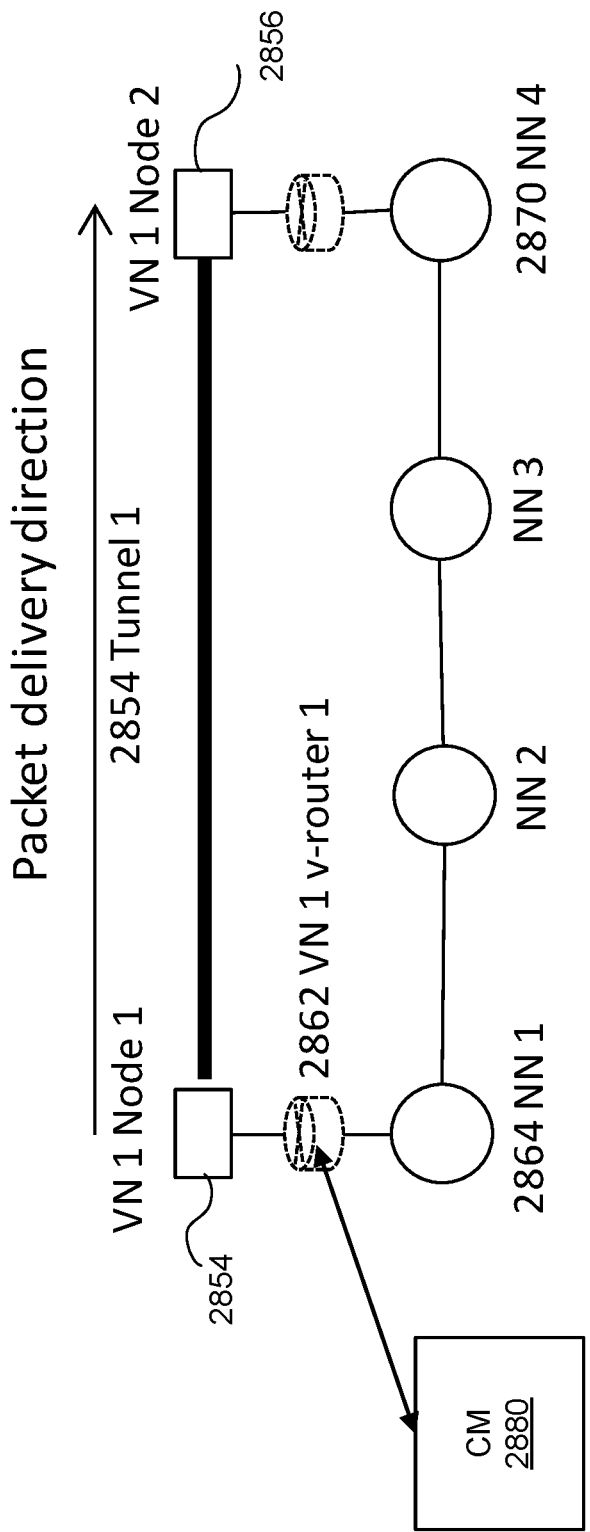
FIG. 28E illustrates an embodiment of virtual router and virtual node layout in relation to an exemplar physical layout of network nodes.

Next, the v-router 2862 checks 2810 a VN topology description table accessible thereto, and obtains the identity of a VN node, such as an anchor VN node, which is also associated with the obtained location information, and which is therefore usable to route packets toward end point B. In the present example, the anchor VN node is accorded identity "VN Node 2" 2856 (see. FIG. 28E). Next, the v-router 2862 checks its tunnel configuration table and obtains the identity of the next VN node, the identity of the tunnel to use to forward the packet toward VN Node 2 2856, and/or the network-level address of the network node associated with VN Node 2 2856 (i.e. NN 4 2870). In the present example, because VN 1 Node 1 2852 is directly connected to VN 1 Node 2 2856 via a single logical tunnel 2854 of VN 1, the next VN Node is also equal to the destination VN Node 2 2856.

Next, the v-router 2862 configures the packet for transmission, for example by inserting 2814 the VN ID and next identity of the next VN node (VN Node 2 2856) into the packet, and/or by inserting the network-level address of the network associated with VN Node 2 (NN 4 2870) into the packet. The v-router then submits 2816 the packet for forwarding by the appropriate logical tunnel 2854, for example by submitting the configured packet to SDRA-Op, or by submitting the packet to the network node to which the v-router 2862 associates (i.e. NN 1 2864).

FIG. 28B illustrates an end point routing table 2820 held by the v-router 2862, according to an example embodiment of the present invention. The table holds location information for end points as obtained by the v-router, for one or possibly more VNs supported by the v-router.

FIG. 28C illustrates a VN topology description table 2830 held by the v-router 2862, according to an example embodiment of the present invention. The table holds, for one or possibly more VNs supported by the v-router, associations between domain identifiers descriptive of potential end point locations and VN node IDs usable to communicate with end points in such locations.

FIG. 28D illustrates a logical tunnel configuration table 2840 held by the v-router 2862, according to an example embodiment of the present invention. The table holds, for one or possibly more VNs supported by the v-router, associations between destination VN nodes and next-hop information for routing packets toward such destination VN nodes. The next-hop information may indicate a next VN node along a path to the destination VN node, a next logical tunnel along the path, and/or the network-level address of the network node to which the next VN node along the path associates.

The operations described above with respect to FIGS. 28A to 28E can be varied in several ways. Generally, the v-router, having a packet to forward to an identified destination and via a designated VN, obtains (from the CM or from its internal end point routing table), location information for the destination. The v-router combines the location information with other stored information indicative of the (relatively static) topology and configuration of the VN, and forwards the packet via the VN based on the combined information. This may include determining another node of the VN network which is closer (in the VN topology) to the destination's location, and forwarding the packet toward said other node via logical tunnels of the VN.

FIGS. 29A and 29B illustrate operation of a v-router (V-router 1) 2902 associated with a first VN Node 1, according to another embodiment of the present invention. The v-router 2902 receives 2920 a packet for forwarding to a destination end point named Device B. The name identifier Device B of the destination end point may be provided in the packet but not necessarily its location. VN 1 Node 2 2904 is the current anchor node for Device B, and is both the next VN node and the destination VN node from VN Node 1 2901. The v-router 2902 checks 2915 its end point routing table and retrieves 2920 a location for Device B in the form of a location identifier, i.e. a destination VN ID/service ID and a destination VN Node ID. Alternatively, the location identifier may comprise the destination VN ID/service ID and the NN ID of the NN associated with the destination VN Node. In this implementation, the NN is operative to forward received data packets including the VN ID/service ID to the associated VN Node for processing. The obtained location may be an identity of VN 1 Node 2 2904 as the anchor node for the destination end point Device B. The v-router 2902 inserts 2925 the VN ID (VN 1) and the next/destination VN Node ID (VN 1 Node 2) into the packet, and submits 2930 the packet with inserted VN ID and VN Node ID to SDRA-Op for handling. FIG. 4C illustrates an embodiment of an end point routing table 2932 for VN 1, including an association between end point IDs, destination VN node IDs, and next VN Node IDs. The exemplar routing table 2932 provides both destination-based and tunnel-by-tunnel routing information. Destination-based routing involves the v-router 2902 inserting the destination VN node identifier, or corresponding NN ID, into the packet. Tunnel-by-tunnel routing involves the v-router 2902 inserting the next VN node identifier, or corresponding next NN ID, into the packet. With tunnel-by-tunnel routing the actual location of the destination end point need not be resolved by the v-router 2902. The last VN Node in the path between the source and the destination end point B is operative to resolve the actual anchor point of the destination end point B.

As described above, embodiments of the present invention include obtaining a location corresponding to the destination end point, for example based on a name or other identifier of the destination end point as specified in the data packet. The correspondence between the destination end point identifier and the location may be stored in an end point routing table, or equivalent data structure. In some embodiments, obtaining the location can be omitted by at least some v-routers, for example if the data packet specifies a valid location corresponding to the destination end point. This may be the case when a v-router previously handling the packet has already obtained and inserted the location into the packet, and the validity of the location has not expired. In some embodiments, the v-router may be operative to check a local end point routing table to obtain the location associated with the name identifier, and if the local end point routing table does not have a corresponding entry, the v-router may be operative to forward the data packet to another v-router that is pre-designated to obtain location information for data packets received by that v-router.

In some aspects, a combination of destination routing and tunnel-by-tunnel routing may be used across a traffic path between a source end point and a destination end point. The source end point is only required to know the VN/service ID and the destination end point name ID in order to exchange information.

In some embodiments, the end point location may correspond to a particular region of the network, such as but not limited to a domain, cluster, edge node service area, or RAN cluster service area. A region of the network may correspond to one or a collection of network nodes, for example in or servicing a common geographic area. The location of the network may indicate a portion of the network which is usable to communicate with the end point.

In some embodiments, the end point location may be an IP address or other network address of the end point. Such an address may be a logical location of the end point, in a network sense.

In some embodiments, when the end point routing table accessible to a v-router does not include a valid entry corresponding to a given end point identifier, the v-router may perform a location resolution operation in which the end point is retrieved from a CM entity or other equivalent entity which tracks end points. In some embodiments, when the end point routing table accessible to a v-router does not include a valid entry corresponding to a given end point identifier, the v-router may forward the packet for handling by another v-router designated for such a task. The other v-router may be, for example, a v-router at a network node located at a higher level in a hierarchically structured VN. For example, a v-router at a cluster or domain level may pass the packet to a v-router at a domain or global level, respectively.

End point routing tables may be updated based on end point mobility. Additionally, or alternatively, end point routing tables may be updated based on changes to network topology, or changes to edge node coverage areas.

Obtaining the location corresponding to the destination end point can be performed in different ways depending on whether the end point is fixed or mobile. For an end point having a fixed location, the location registration procedure can be performed by the network. For a mobile end point, the location registration and subsequent location tracking and updating can be performed by the network in cooperation with the end point.

Figure 30:
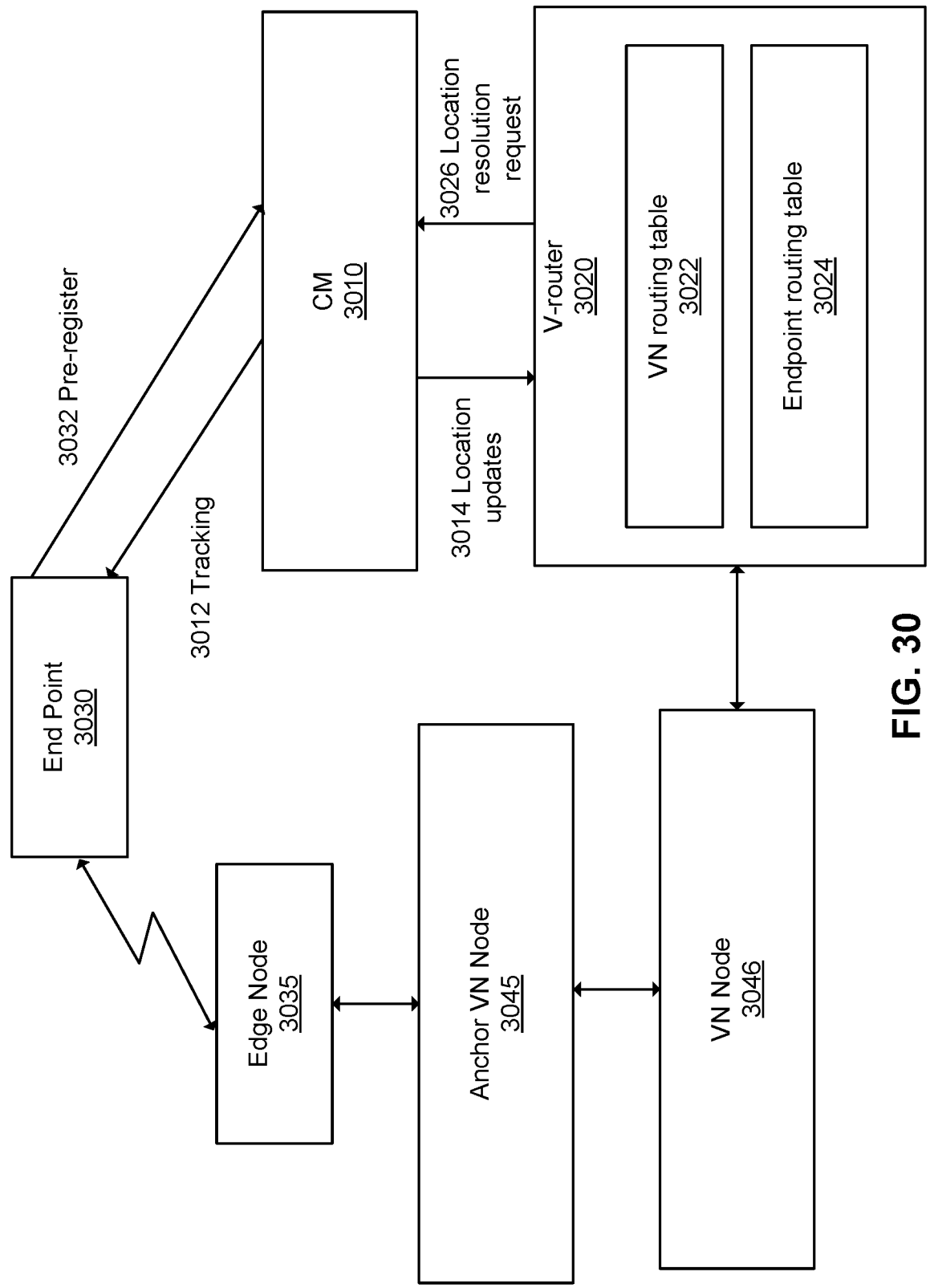
FIG. 30 illustrates interaction of a connectivity manager (CM), a v-router and an end point, according to embodiments of the present invention.

Embodiments of the present invention provide for a method and apparatus for forwarding packets toward a specified destination node via a virtual network. The packets may be associated with a service supported by the virtual network. FIG. 30 illustrates interaction of a connectivity manager (CM) 3010, a v-router 3020 and an end point 3030, according to embodiments of the present invention. The end point 3030 may be a UE or a server which communicates with a physical network via an edge node 3035. The physical network includes a plurality of interconnected physical nodes, and a subset of the physical nodes are associated with VN nodes, each of the VN nodes including a respective v-router. The end point 3030 may be mobile, and thus may communicate with the network via different edge nodes over time.

The end point 3030 pre-registers 3032 with the CM 3010 prior to requesting access to the service. The pre-registration triggers tracking 3012 of the end point 3030 by the CM 3010. Pre-registration and tracking are mediated by the communication network infrastructure. The tracking operation includes tracking location and optionally also activity of the end point 3030. As such, the end point location may be tracked prior to its registration with a service or VN and/or user plane network slice supporting the service. The end point location may be represented for example by a RAN cluster which is currently usable to communicate with the end point, or a VN node which is currently usable to communicate with the end point via an edge node and/or RAN cluster. Such a VN node is referred to as an anchor node. The tracking operation may include a reachability operation which interacts with the end point 3030 to allow the CM to determine the location of either of the endpoints. As noted above, this may include the CM receiving location information from the end points, or it can include other techniques such as receiving an indication from nodes connected to the end points that the end point has disconnected, or connected. The location information can be provided in context with the topology of the VN, or it may be provided in absolute terms (e.g. a GPS location) that can be mapped to the network topology.

As part of the tracking operation, the CM 3010 provides location updates 3014 to v-routers, including the v-router 3020, indicative of the current location of the end point 3030. The location updates may be provided in response to one or more triggers, such as: receipt of a location resolution request 3026 by a v-router, a timer or scheduling trigger, or a mobility event of the end point. A combination of triggers may be utilized.

Different trigger conditions may be used for different v-routers. For example, v-routers close to the network edge may receive location updates upon movement of the end point 3030 between access nodes or RAN clusters, while v-routers further from the edge network may receive location updates only upon movement of the end point 3030 between domains. In some embodiments, the triggers for providing location updates to a given v-router may be configured such that the v-router tends to receive location updates for an end point 3030 only when such location updates will change the VN tunnel used by the v-router to route packets toward the end point 3030. For example, provision of location updates to the v-router may be inhibited when such location updates will not change the VN tunnel (having ingress at the VN node hosting the v-router) used by the v-router to transmit packets toward the end point.

The CM 3010 may include multiple CM components, one or more of which is operatively coupled to a given v-router. The CM components may be organized in a manner which reflects the VN topology. For example, the CM components may be organized in a hierarchical structure. In one embodiment, each VN node may include or be associated with a different CM component. CM components are operatively coupled together and share information such as end point location information.

A hierarchical structure may be used when the VN exhibits a tree-like topology such as is illustrated in FIG. 1A. CM components are associated with each of a plurality of network nodes, including NN 11, NN 13, NN 15, NN 21, NN 23 and NN 25. Such network nodes are associated with VN nodes for example as illustrated in FIG. 1B. A global CM component 146 is provided at the top of the hierarchy, two domain-level CM components 144 are provided below the global CM component 146 in the hierarchy, and four cluster-level CM components 142 are provided below the domain-level CM components 144. The interconnections between CM components, by which location information is propagated, are not shown in FIG. 1A. The CM may be instantiated prior to definition of one or more VNs which are to be supported by same. The CM may support multiple VNs and/or multiple services.

The CM may be provided in a dedicated network slice, referred to as a CM slice, or in a network slice which houses a variety of control and/or management functions. Associations between particular v-routers and particular CM entities and/or CM components of a CM entity may be defined by SDT-Com or SDT-Op. The association may be made by providing one or both of a CM and a v-router with an identifier of a v-router and a CM, respectively.

The v-router 3020 operates to route data packets toward the end point 3030. The packets are routed toward the end point via VN tunnels, based on the current location of the end point 3030 as indicated to the v-router via the location updates 3014. The routing path to the end point may include other VN nodes and associated v-routers, as well as an edge node 3035 or RAN cluster of multiple edge nodes communicatively coupled to the end point 3030.

In some embodiments, the v-router 520 includes at least a VN routing table 3022 and an end point routing table 3024. Tables refer to data stored in computer memory which associates input data to output data, whether or not in tabular form. In many embodiments, the VN routing table 3022 is relatively static, and may be created during VN instantiation for example by SDT-Com. The VN routing table specifies associations between other VN nodes reachable from the v-router 3020 and VN tunnels (having ingress at the VN node hosting the v-router) to be used for routing packets toward such VN nodes. The end point routing table 3024 is dynamic, such that entries thereof are created and updated according to the location updates 3014 provided by the CM 3010. The end point routing table specifies associations between end points reachable from the v-router 3020 and anchor VN nodes currently usable to reach these end points. After an end point registers to the VN, it can be associated with a VN node which acts as an anchor node of the end point in the VN. As such, when a packet designating the end point 3020 as destination is received at the v-router 520, the v-router consults the end point routing table 3024 to determine the anchor VN node 3045 currently associated with the end point 3030. The v-router then consults the VN routing table 3022 to determine the VN tunnel to use to reach the anchor VN node 3045. The v-router then forwards the packet toward the anchor VN node 3045 via the determined VN tunnel. Upon receipt of the packet, the anchor VN node may forward the packet on to the end point, for example via an associated edge node or RAN cluster.

In various embodiments, the v-routers associated with VN nodes of the VN are required to identify the next logical tunnel (or next VN node) to which to submit a data packet after receipt and processing by the VN nodes. This identification utilizes an end point routing table at each v-router. For fixed end points, the table can be obtained after end point initial location registration. For mobile end points, a v-router acquires location information from its associated CM entities and updates the end point routing table based on same. Based on the destination name (or ID) and the acquired location information, a v-router will route the data packet to the appropriate next logical tunnel. The VN thus forwards data tunnel by tunnel over the VN until the data packet reaches its destination.

In some embodiments, each v-router may consult its end point routing table to determine an anchor VN node. In other embodiments, once the anchor VN node is determined by one VN node, it may be specified in the packet and re-used by one or more subsequent VN nodes on a limited basis. Re-use may cease (and an end point routing table consulted again) for example after expiry of a timer, after a predetermined number of hops, or upon determining that the end point is no longer reachable via the anchor VN node.

Figure 31A:
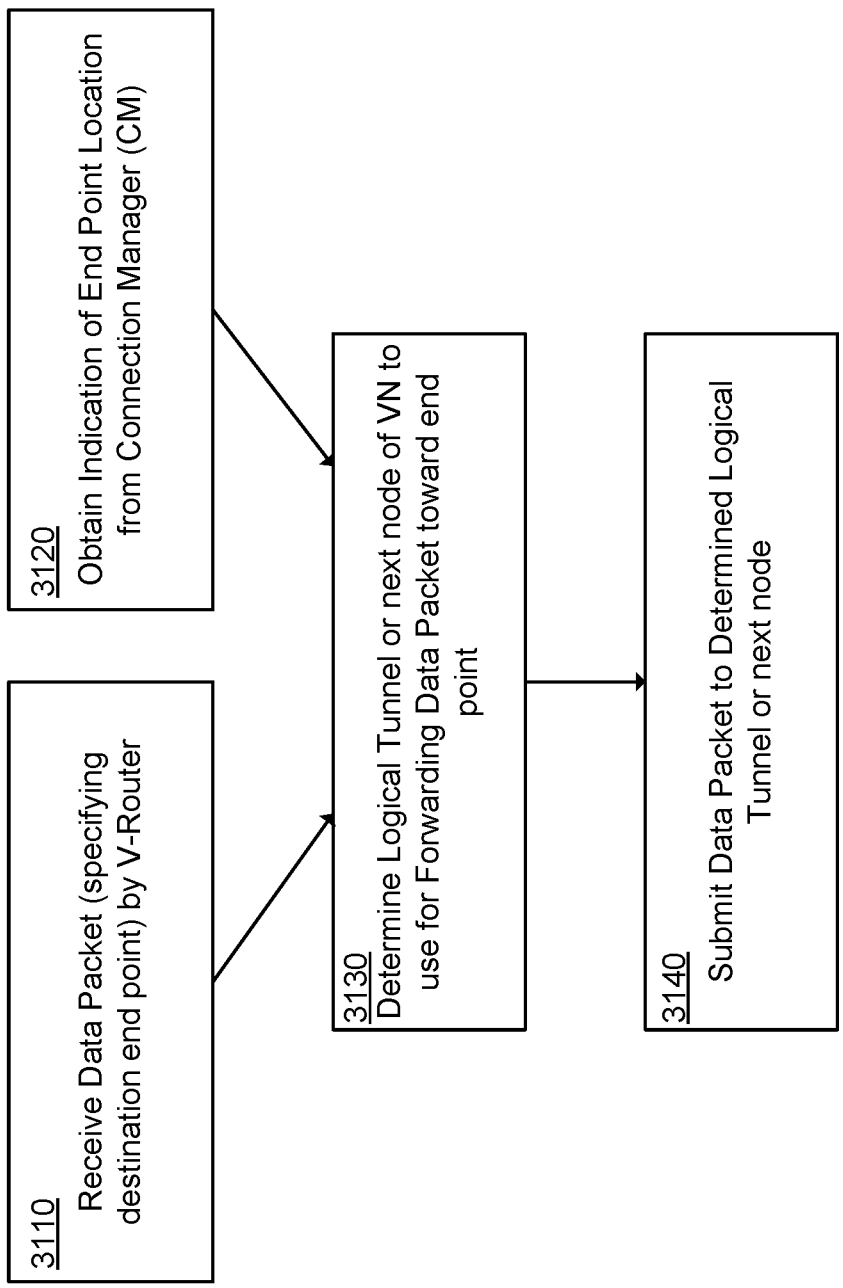
FIGS. 31A & 31B illustrate embodiments of operation of a v-router at a VN node to route data packets to an end point.

In view of the above, embodiments of the present invention provide for operation of a v-router at a VN node to route data packets to an end point in accordance with a service supported by the VN. Having reference to FIG. 31A, the operation comprises receiving 3110 a data packet by the v-router, the data packet associated with the VN and specifying the end point as its destination. The operation further comprises obtaining 3120 an indication of location of the end point, the end point location being tracked by a CM and the CM providing the indication of location to the v-router. The operation further comprises determining 3130 a logical tunnel of the VN for use in forwarding the data packet toward the end point, based at least in part on the obtained indication of location of the end point. The operation further comprises submitting 3140 the data packet to the determined logical tunnel for forwarding toward the end point, i.e. forwarding the data packet via the logical tunnel.

Figure 31B:
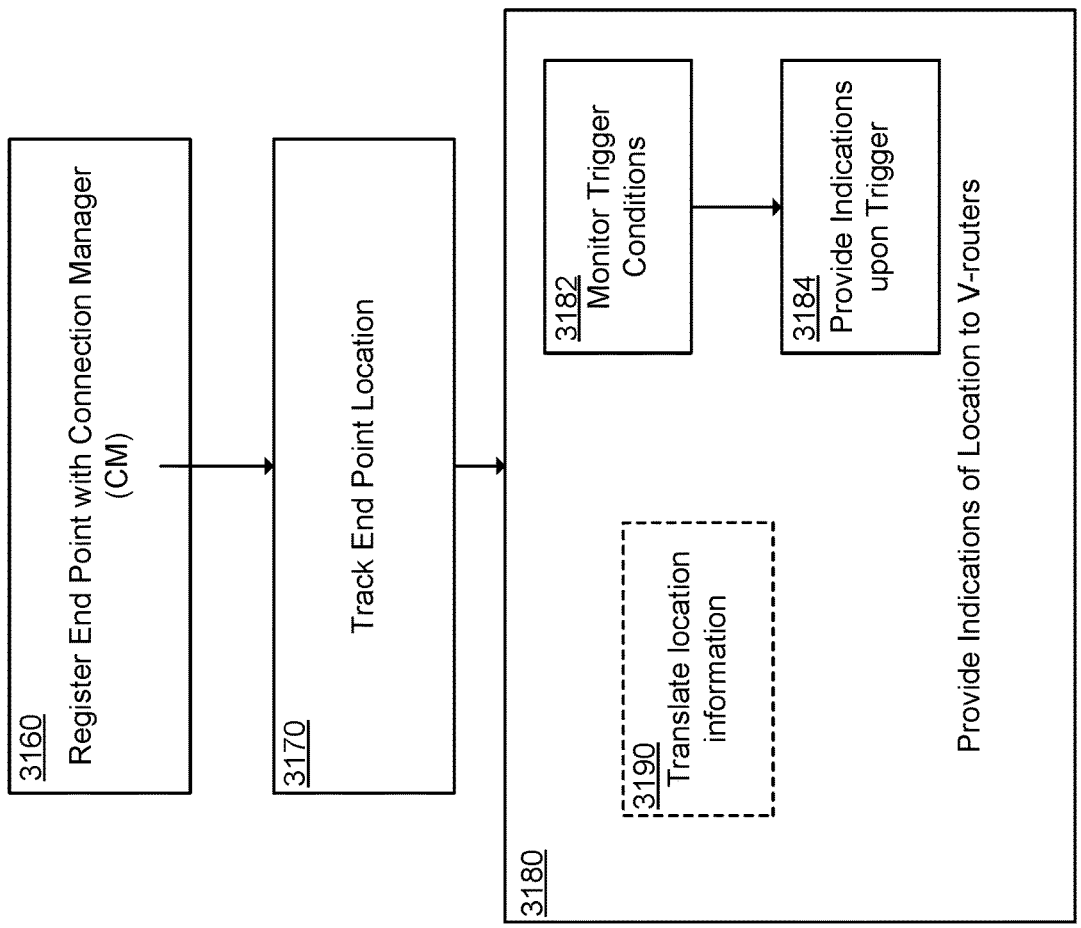

Further in view of the above, embodiments of the present invention provide for operation of a CM entity to maintain routability of data packets to an end point, in accordance with a service supported by a VN which is in turn supported by the CM. Having reference to FIG. 31B, the operation comprises, following registration 3160 of an end point with the CM entity, tracking 3170 the location of the end point and providing 3180 indications of the location to one or more v-routers of the VN. The v-routers use the indications of location to route data packets to the end point. The CM can monitor 3182 one or more trigger conditions, such as timer expiries, boundary-crossing events by the end point and/or location resolution requests by the v-routers, and provide 3184 the indications in response to satisfaction of the monitored trigger conditions. The CM can translate 3190 between reported end point location information, such as a geographic location or edge node or RAN cluster to which the end point associates, and VN-based location information, such as an anchor VN node which is usable to route packets to the end point.

Figure 32A:
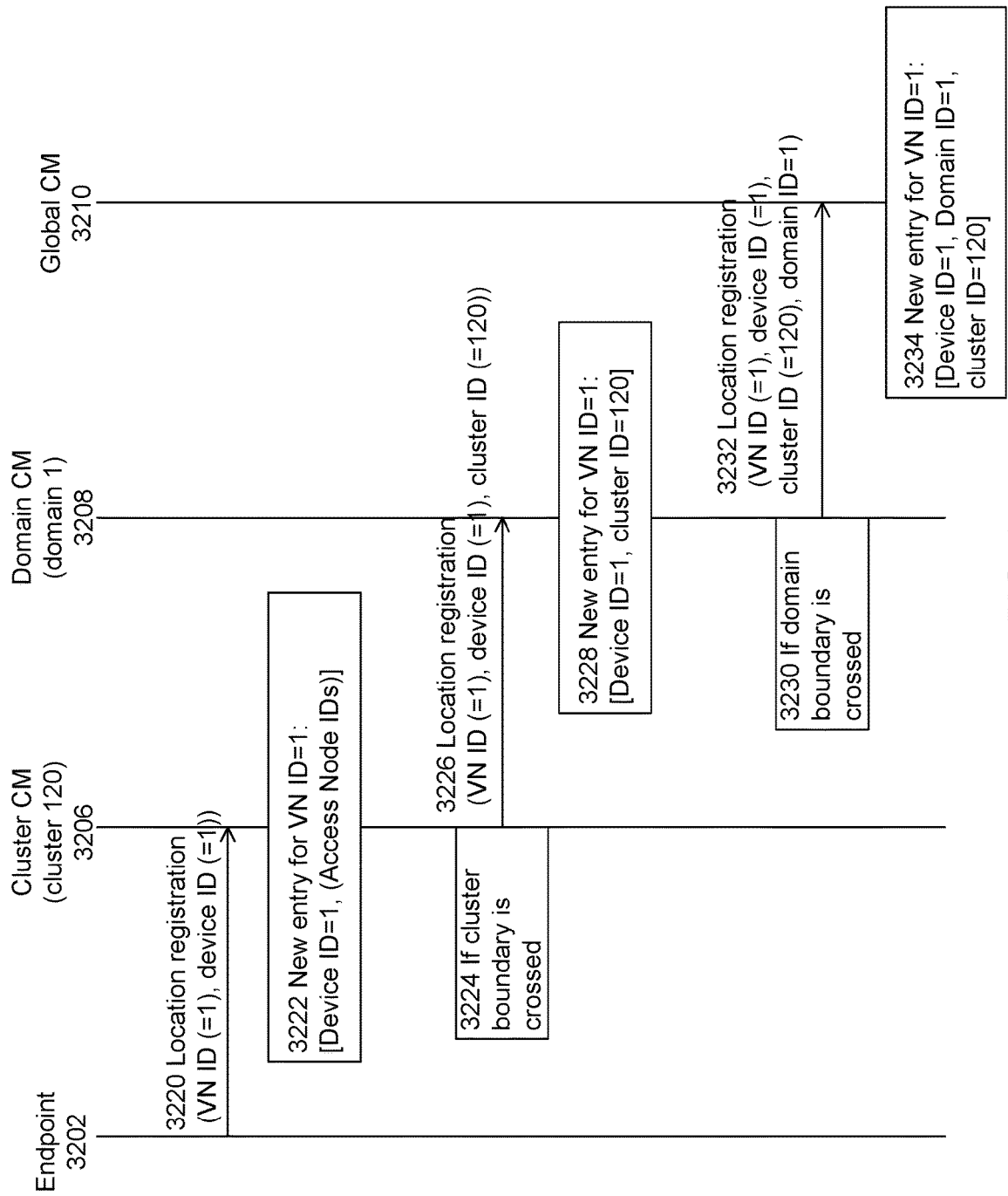
FIGS. 32A, 32B, 32C, & 32D illustrates end point location tracking, according to embodiments of the present invention.

FIG. 32A illustrates end point location tracking with a CM entity, according to an embodiment of the present invention. Device name identifier (or name ID) based location tracking using the hierarchical CM architecture of FIG. 1A is used for purposes of illustration in FIG. 32A. The end point is assumed to communicate with RAN cluster 120.

In more detail, the end point 3202 transmits 3220 a location registration message to the cluster CM 3206 of RAN cluster 3220. The location registration message specifies a VN with respect to which the end point is operating and an end point name ID (e.g. the device ID). The cluster CM 3206 creates 3222 a new entry in its registration table, saving this information along with identities of one or more edge nodes which are communicatively linked to the end point. The cluster CM 3206 also determines 3224 whether the end point 3202 has crossed a cluster boundary. This may be determined for example by checking whether the last registration of the end point was with the cluster CM, for example as evidenced by a recent prior entry in the cluster CM registration table in relation to the end point 3202. If the end point 3202 is determined 3224 to have crossed a cluster boundary, the cluster CM 3206 transmits 3226 a location registration message to the domain CM 3208. This location registration message is similar to the location registration message provided to the cluster CM, but further includes the cluster ID. The domain CM 3208 repeats the process. The domain CM 3208 creates 3228 a new entry in its registration table, saving the location registration message information in association with the device name ID. The domain CM 3208 also determines 3230 whether the end point 3202 has crossed a domain boundary. If the end point 3202 is determined 3230 to have crossed a domain boundary, the domain CM 3208 transmits 3232 a location registration message to the global CM 3210. This location registration message is similar to the location registration message provided to the domain CM, but further includes the domain ID. The global CM 3210 creates 3234 a new entry in its registration table, saving the location registration message information. By this operation, the end point 3202 registers its current location with the CM. This process is repeated for example periodically or whenever the end point 202 has potentially moved.

In some embodiments, when a cluster or domain boundary is crossed as determined above, the cluster CM 3206 or domain CM 3208 also transmits location updates to one or more v-routers, in particular those v-routers which will have their routing operations affected by the boundary crossing.

The location registration procedure illustrated in FIG. 32A is an example in which end point explicit location registration is performed. Alternatively, the location registration procedure can be implicit. For example, an end point may only report downlink measurement reports to the cluster CM, or the end point may only send an uplink sequence which is received by edge nodes configured to monitor this sequence report. The edge nodes can determine an uplink signal strength based on the received signal strength (assuming that the end point transmits with a known strength). This measurement of signal strength can be forwarded to the cluster CM. A cluster CM can be configured to maintain the information of candidate set of access nodes (tunnels) for a device which actively receiving data from network.

In some embodiments, in addition or alternatively to the CM components maintaining location registration tables as in FIG. 32A, one or more CM components may maintain end point routing tables. End point routing table entries can then be provided to v-routers in place of location information. In this case, the creation 3222, 3228, 3234 of new entries at CM components can refer to the creation of new routing table entries. A v-router may then directly use the end point routing tables as maintained by its associated CM component, or the v-router may retrieve entries of this routing table in order to main its own local copy of the routing table. The routing table entry maintained by the CM can include: an end point identifier, a destination (anchor) VN node associated with the end point, and, in some embodiments, a next VN node to which to forward packets specifying the end point as destination.

Figure 32B:
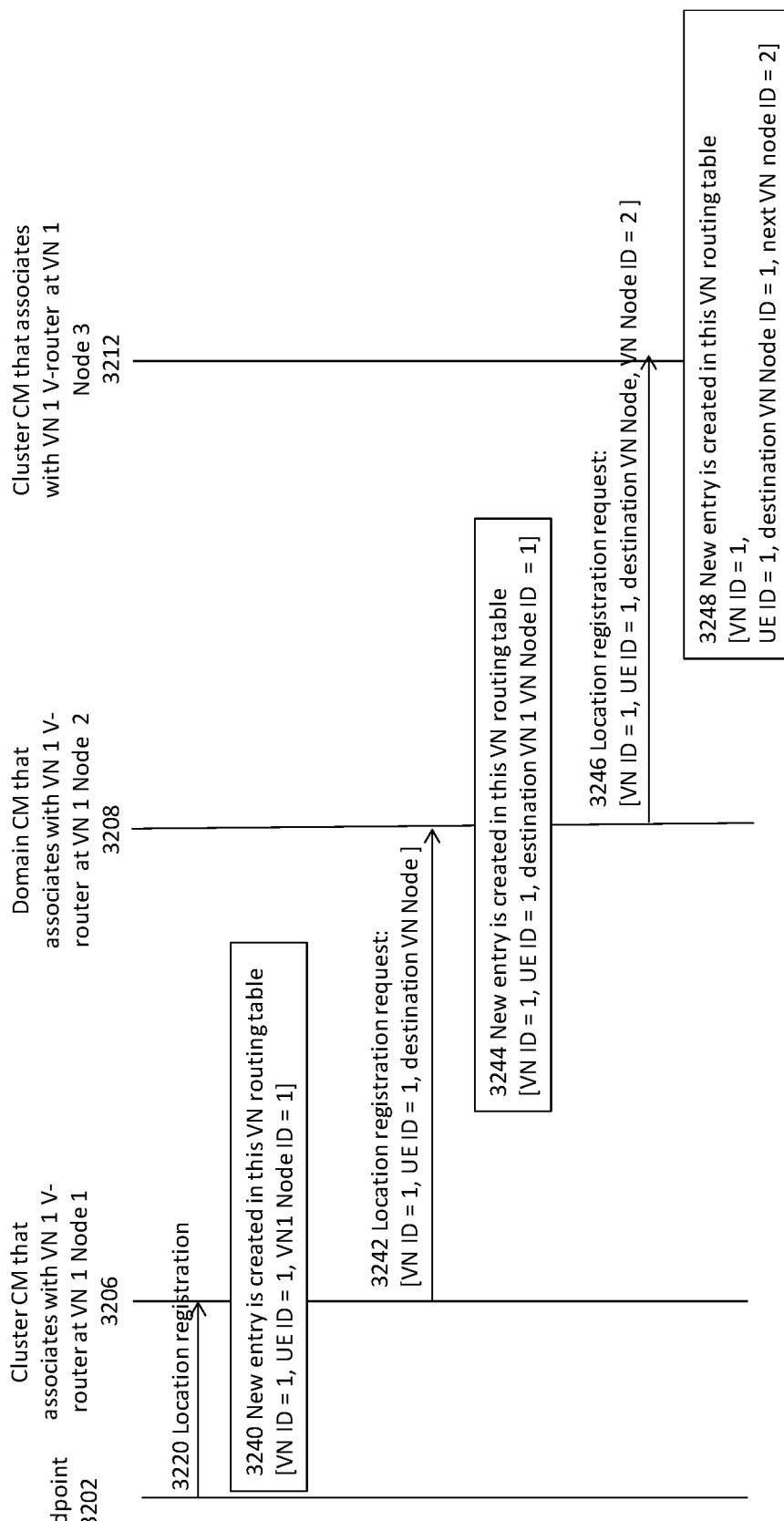

FIG. 32B illustrates an example of the above-mentioned embodiment, namely in which the CM components maintain routing tables. Upon receipt of the location registration message 3220, the cluster CM 3206 creates 3240 a new routing table entry in a routing table managed thereby. In an embodiment, the cluster CM 3206 is an instance of the cluster CM 142 which associates with v-router 171 of VN1 at VN1 node 1 151 (as illustrated in FIGS. 1A and 1B). In an embodiment, the new routing table entry includes the VN ID, the end point device name ID, and the identity of the node of VN1 which is used to reach the end point 3202. As such, in this embodiment VN1 node 1 151 may be considered an anchor node for the end point 3202.

The cluster CM may then transmit 3242 a location registration message to the domain CM 3208, the message including the VN ID, end point name ID, and destination (anchor) VN node ID. The message 3242 may be transmitted on an as-needed basis, for example on determining that the end point 3202 is newly registered or has crossed a cluster boundary. Upon receipt of the location registration message 3242, the domain CM 3208 creates 3244 a new routing table entry in a routing table managed thereby. The domain CM 3208 is an instance of the domain CM 144 which associates with v-router 172 of VN1 at VN1 node 2 152 (as illustrated in FIGS. 1A and 1B). In an embodiment, the new routing table entry again includes the VN ID, the end point name ID, and the identity of the node of VN1 which is used to reach the end point 3202.

The domain CM 3208 may then transmit 3246 a location registration message to another cluster CM 3212, the message including the VN ID, end point ID, and destination (anchor) VN node ID. The message 3246 may be transmitted on an as-needed basis. Upon receipt of the location registration message 3242, the cluster CM 3212 creates 3248 a new routing table entry in a routing table managed thereby. In an embodiment, the cluster CM 3212 may be an instance of the cluster CM 142 which associates with v-router 173 of VN1 at VN1 node 3 153 (as illustrated in FIGS. 1A and 1B). In an embodiment, the new routing table entry again includes the VN ID, the end point ID, and the identity of the node of VN1 which is used to reach the end point 3202. The new routing table entry also includes a next VN node ID, indicative of a next VN node to forward packets to when such packets specify end point 3202 as destination. A similar location registration message may be transmitted to the global CM.

Figure 32C:
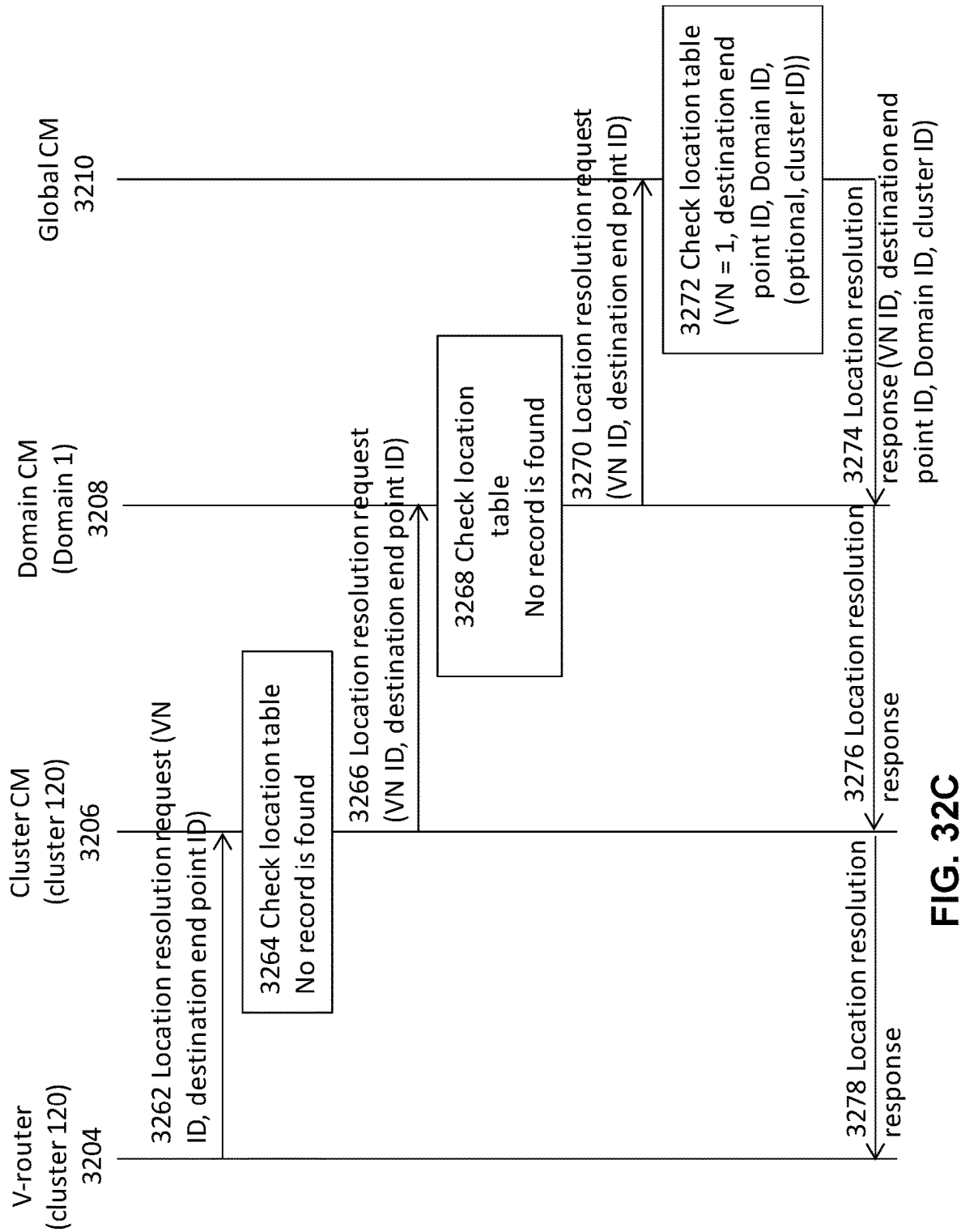

FIG. 32C illustrates interaction between a v-router and a CM, including satisfaction of a location resolution request, according to an embodiment of the present invention. This operation corresponds to a request mode, in which a v-router contacts its associated CM to obtain location information, for example upon determining a need for this location information. The v-router 3204 (in the present example belonging to cluster 120), transmits 3262 a location resolution request specifying an end point to the cluster CM 3206 of cluster 120. The cluster CM 3206 checks 3264 its location registration table. If an entry is found for the end point, a location resolution response is returned to the v-router 3204. Otherwise, as illustrated, the cluster CM 706 transmits 3266 the location resolution request to the next-higher-level CM component in the hierarchy, namely the domain CM 3208. (In the example of FIG. 32C, it is assumed that only the global CM registration table has an entry for the end point.)

The domain CM 3208 checks 3268 its location registration table. If an entry is found for the end point, a location resolution response is returned to the cluster CM 3206 and subsequently to the v-router 3204. Otherwise, as illustrated, the domain CM 3208 transmits 270 the location resolution request to the next-higher-level CM component in the hierarchy, namely the global CM 3210. The global CM 3210 checks 3272 its location registration table and locates the corresponding location entry for that end point device name ID. A location resolution response is then returned 3274 to the domain CM 3208 which in turn returns a location resolution response 3276 to the cluster CM 3206, which in turn returns a location resolution response 3276 to the v-router 3204 including a location identifier and the name ID.

In various embodiments, when the cluster CM 3206 or the domain CM 3208 receives a location resolution response 3274, 3276, it may store the included location information in its location registration table. Such operation tends to cache location information toward lower levels of the CM hierarchy in response to higher location request frequency.

Figure 32D:
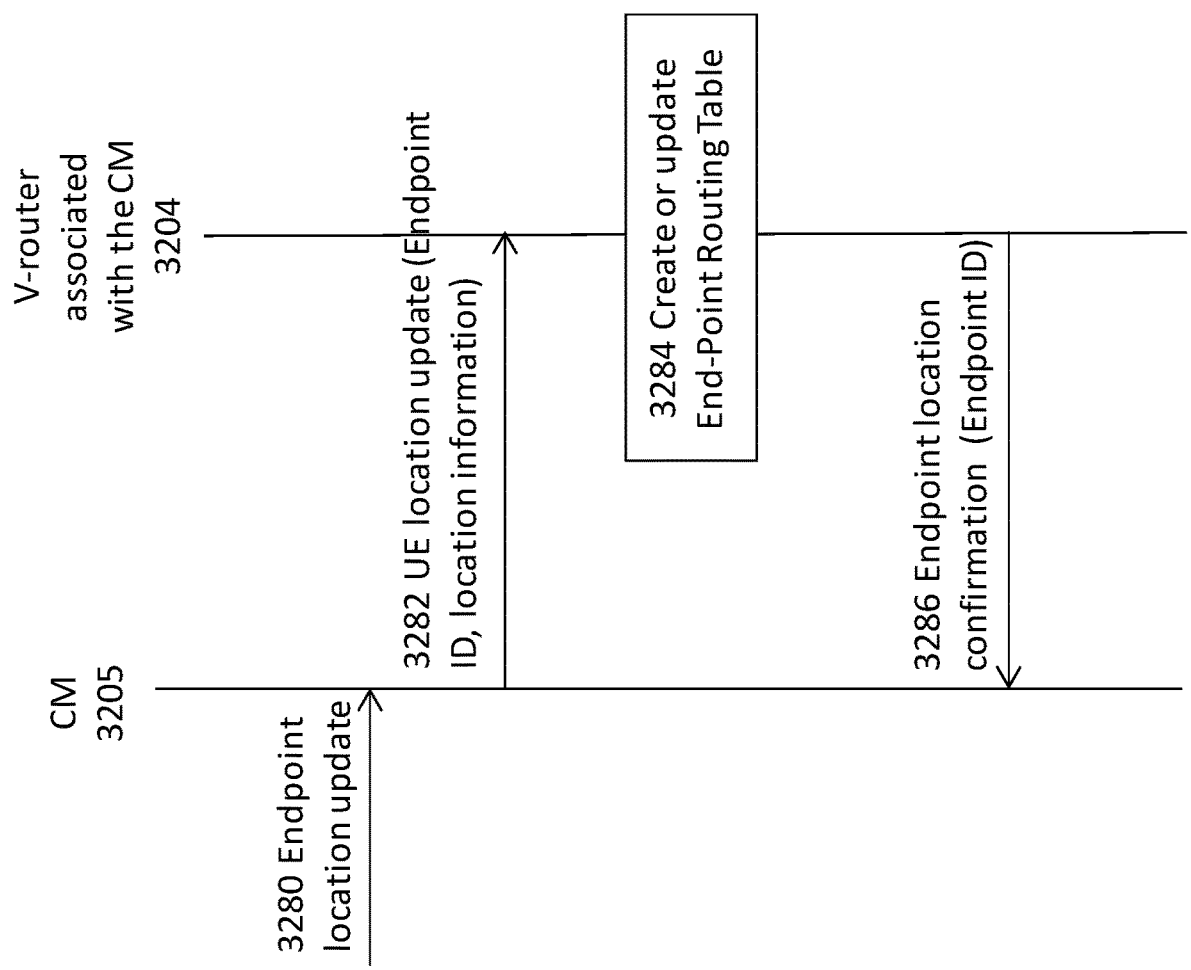

FIG. 32D illustrates interaction between a v-router and a CM, including location updating in a push mode (rather than the request mode of FIG. 7C), according to an embodiment of the present invention. The CM provides the v-router with updated location information without requiring a request from the v-router. The updates can be triggered for example by the end point moving into a new domain. The CM 3205, which may for example be a cluster CM, domain CM, or global CM, receives 3280 an end point location update, for example from an end point or function monitoring an end point. The CM 3205 then transmits 3282 an end point location update, including the end point name ID and location information, to a v-router 3204 associated with the CM 3205. The v-router 3204 creates or updates 3284 a corresponding entry in its end-point routing table to record the current location of that end point. The v-router may also transmit 3286 a location confirmation to the CM 3205, indicating that the location update is successful. In some aspects, the v-router may forward the end point location update to other v-routers, such as v-routers located lower in the network hierarchy.

It is noted that various combinations of push mode and request mode updating may be employed, for example in order to trade-off signaling overhead and location accuracy.

As described above, embodiments of the present invention include obtaining an indication of a destination VN node which corresponds to the obtained end point location. The correspondence between the destination VN node and the end point location may be stored in a VN topology description table, or equivalent data structure.

The VN topology description table includes a plurality of correspondences between destination VN nodes and end point locations. In some cases, a table entry for a given destination VN node may correspond to a range of end point locations, such as a range of IP addresses. VN nodes further away from the destination VN node may simply direct traffic towards the destination VN node that is responsible for that range of IP addresses. In this way, the number of location updates can be reduced across the network as the general location of the destination end point is defined, and an identity of a VN node responsible for performing the final location resolution is provided. The VN topology description table may be defined at time of instantiating the VN, and may be updated when changes to the VN topology occur.

The destination VN node corresponds to a VN node which is usable to forward packets to the end point location, and which is proximate to the end point location. A destination VN node may be an anchor VN node for the end point, or a VN node serving a RAN cluster in communication with the end point, or a VN node co-located with an edge node which is in communication with the end point.

An anchor VN node may be used as a destination VN node. An anchor VN node of an end point is a VN node which is proximate, in terms of the network topology, to the end point, and which is capable of delivering a packet toward the end point.

As described above, embodiments of the present invention include obtaining an indication of a next node on a pre-configured path between the v-router and the destination VN node. The path is defined by one or a plurality of logical tunnels of the VN, for example connected in series via one or more intermediate VN nodes. The next node corresponds to the intermediate VN node of the path (or destination VN node if the path corresponds to a single hop) which is most adjacent to the current VN node (i.e. the VN node associated with the v-router). The next node is directly communicatively coupled, via a logical tunnel, to the current VN node. Because a VN node may be associated with multiple outgoing logical tunnels, multiple potential next nodes are possible, and routing comprises selecting the appropriate next node.

In various embodiments, selecting a next node may be replaced with the equivalent operation of selecting a logical tunnel which links the current VN node to the next node.

Embodiments of the present invention employ destination-based VN routing, in which each v-router includes a VN routing table and/or tunnel configuration table, or other functionally equivalent data structure, which associates a set of destination VN nodes with a respective set of next nodes. V-routers are thus pre-configured to store associations between destination VN nodes and next nodes, and, upon receipt of a data packet specifying a destination VN node for which such an association is stored, to forward the data packet toward the associated next node. The associations may be provided for example at VN instantiation and possibly updated in response to VN topology changes.

In some embodiments, a plurality of VN paths to a destination VN node may be possible, and a v-router may be configured to select one of these paths by selecting one of a plurality of next nodes, each associated with one of the VN paths. Path selection may be based for example on network load balancing considerations.

Embodiments of the present invention comprise preparing and forwarding the data packet. Preparing the data packet includes operating the v-router to insert the obtained indication of the next VN node (e.g. the next VN node identifier) into the data packet to produce a routed data packet. Forwarding the data packet includes operating the v-router to submit the routed data packet to the physical network node which is associated with the VN node and v-router. The physical network node transmits the data packet across the network to a next physical network node associated with the next VN node.

In various embodiments, SDRA-Op provides an interface between the VN node (and/or v-router) and the associated physical network node. SDRA-Op is configured to receive a routed packet from the v-router and, based on information such as the VN ID and indication of the next node (or tunnel ID), to process the packet header. Processing the packet header may be based on a physical resource mapping format and a resource assigned for handling the packet and/or supporting the VN node. SDRA-Op subsequently submits the packet to the physical network node associated with the VN node. The physical network node then forwards the packet to another physical network node, and so on, along a path to the physical network node associated with the next VN node. This physical network node corresponds to an egress of the logical tunnel being used.

In some embodiments, when a logical tunnel of a VN can be mapped to multiple physical paths, SDRA-Op is configured to determine a rate splitting parameter for controlling proportions of data flow over these physical paths. This may be implemented using source routing, for example. SDRA-Op may then determine, for each received packet, which of the multiple physical paths to use to transmit the packet, in accordance with the rate splitting parameter.

Processing of the packet header by SDRA-Op may be performed in different ways depending on the physical resource mapping format. For IP-like routing, packet header processing may comprise changing the VN Node ID to the IP address of the NN to which the VN Node associates, and inserting a QoS field. For source routing, packet header processing may comprise changing the VN Node ID to a source routing header, and inserting a QoS field. For label based routing or dedicated resource routing formats, packet header processing may comprise removing the VN Node ID but retaining the VN ID.

In some embodiments, the v-router is associated with a RAN cluster used for transmitting data packets to a mobile device. In this case, the v-router is configured to determine the access nodes (tunnels) to which the data packet can be forwarded. For multiple destination access nodes (tunnels) and multipath implementations, SDRA-Op may be configured to determine the rate splitting parameters over these logical VN tunnels. The determination may be made based at least in part on the multiplexing or sharing of physical resources between multiple VNs.

Figures 33A, 33B:
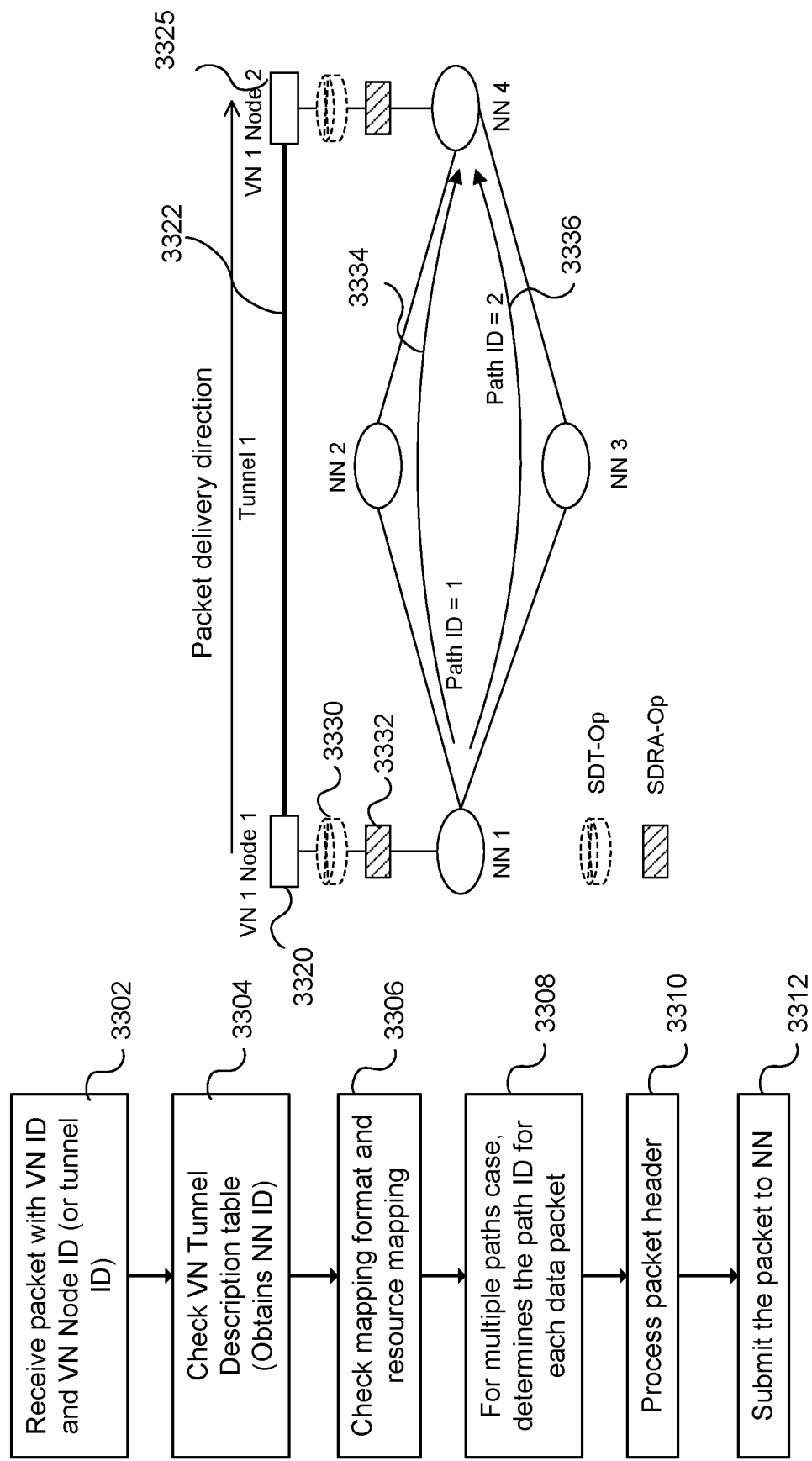
FIGS. 33A, 33B, 33C, 33D & 33E illustrate general packet processing operations of SDRA-Op in coordination an associated v-router, according to embodiments of the present invention.

FIGS. 33A and 33B illustrate general packet processing operations of SDRA-Op executed on a VN Node in coordination with the associated v-router. Having reference to FIG. 33A, in an embodiment the SDRA-Op receives 3302, from a process operating on the v-router associated with that VN node, a packet with a given VN ID and next VN node ID (or equivalent tunnel ID). SDRA-Op then checks 3304 a VN tunnel description table accessible thereto to obtain an identity of a physical network node (NN) associated with the next VN node ID. SDRA-Op then uses 3306 a physical resource mapping, which may in some embodiments be a table, to obtain the physical mapping from the current NN of the SDRA-Op (e.g. NN 1), to the destination NN (e.g. NN 4). If there are multiple potential physical paths, such as path 1 3334 and path 2 3336 illustrated in the example of FIG. 8B, SDRA-Op then determines 3308 a path ID to use for each data packet. SDRA-Op then processes 3310 the packet header to configure it to traverse the identified path, and submits 3312 the packet to the associated network node. It is noted that in some embodiments, functions of the SDRA-Op and the v-router may be distributed such that some or all of the functions of the v-router may be performed by SDRA-OP, and vice versa.

FIG. 33B illustrates a portion of the network between a first VN node 3320 and a second VN node 3325, connected via a logical tunnel 3322. The first VN node 3320 is associated with a first network node NN1, and an instance of SDT-Op 3330 and SDRA-Op 3332. The v-router at the first VN node may comprise one or a combination of SDT-Op 3330 and SDRA-Op 3332. Path ID=1 corresponds to a first network path 3334 supporting the logical tunnel 3322 and Path ID=2 corresponds to a second network path 3336 supporting the logical tunnel 3322.

Figures 33C, 33D:
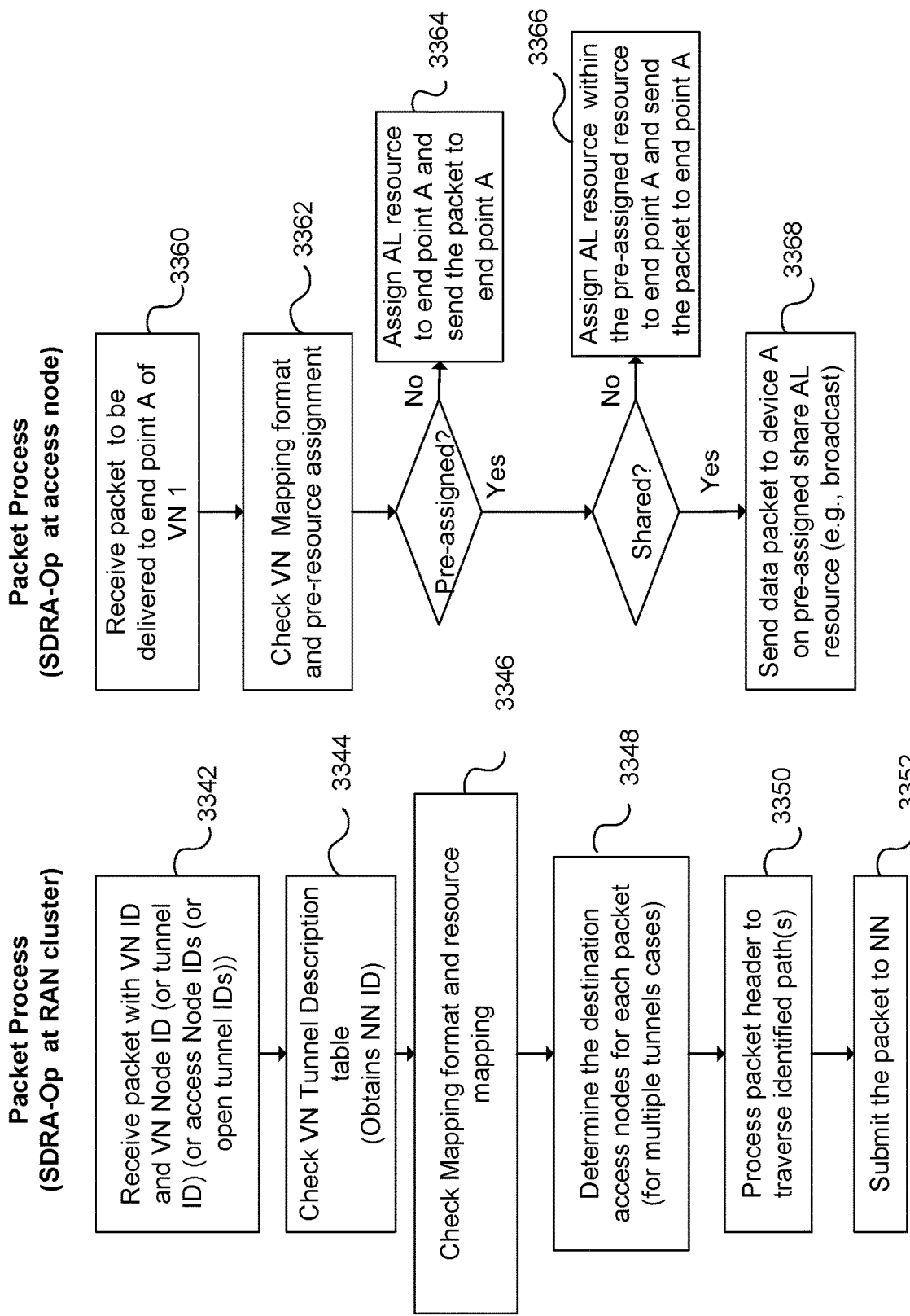

FIGS. 33C and 33D illustrate packet processing operations of SDRA-Op at a RAN cluster and an access node, respectively. The topology is illustrated in FIG. 8E. With reference to FIG. 33C, SDRA-Op 3372 receives 3342, from a process operating on the v-router (or SDT-Op), a packet with a given VN ID and next VN node ID (or equivalent tunnel ID), or alternatively with a given set of access node IDs corresponding to access nodes of the RAN cluster (or equivalent open tunnel IDs). SDRA-Op can then determine 3344 an identity of a network node associated with the next VN node ID. In some embodiments, this determination can be performed using a VN tunnel description table. SDRA-Op can then determine 3346 a physical resource mapping in accordance with the identity of the network node. This can be done, in some embodiments by checking a physical resource mapping format and a corresponding physical resource mapping table. If there are multiple potential physical paths, SDRA-Op then determines 3348 destination access nodes to use for transmitting each data packet. SDRA-Op then processes 3350 the packet header to configure it to traverse the identified path(s), and submits 3352 the packet to the associated network node.

With reference now to FIG. 8D, SDRA-Op 3376 at the access node receives 3360 a packet to be delivered to an end point device A of a given VN. SDRA-Op then checks 3362 the VN mapping format and pre-assignment of access link resources (if used) for communicating with the end point device A. If pre-assigned access link resources are not used, SDRA-Op assigns 3364 access link resources for use in communicating with end point device A and transmits the packet to device A using the assigned access link resources. If pre-assigned access link resources are used but shared access link resources are not used, SDRA-Op assigns 3366 access link resources from within the set of pre-assigned resources for use in communicating with end point device A and transmits the packet to device end point A using the assigned access link resources. Otherwise, if pre-assigned and shared access link resources are used (e.g. a broadcast channel is assigned), SDRA-Op transmits 3368 the packet to device A using the pre-assigned, access link resources.

Figure 33E:
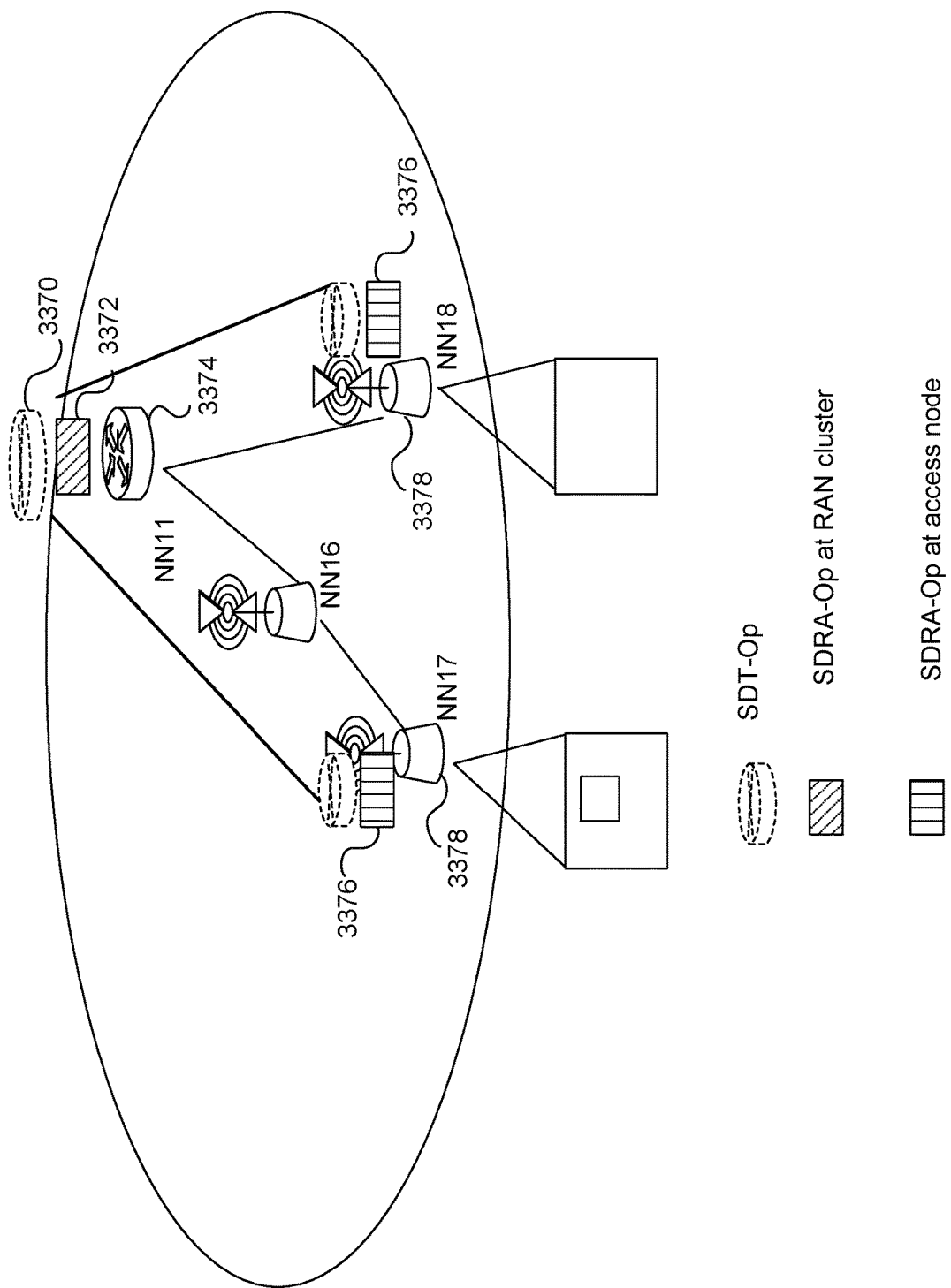

FIG. 33E illustrates a network architecture showing the placement of SDT-Op 3370 and SDRA-Op 3372 at the RAN cluster node 3374, and SDRA-Op 3376 at access nodes 3378.

Figure 34:
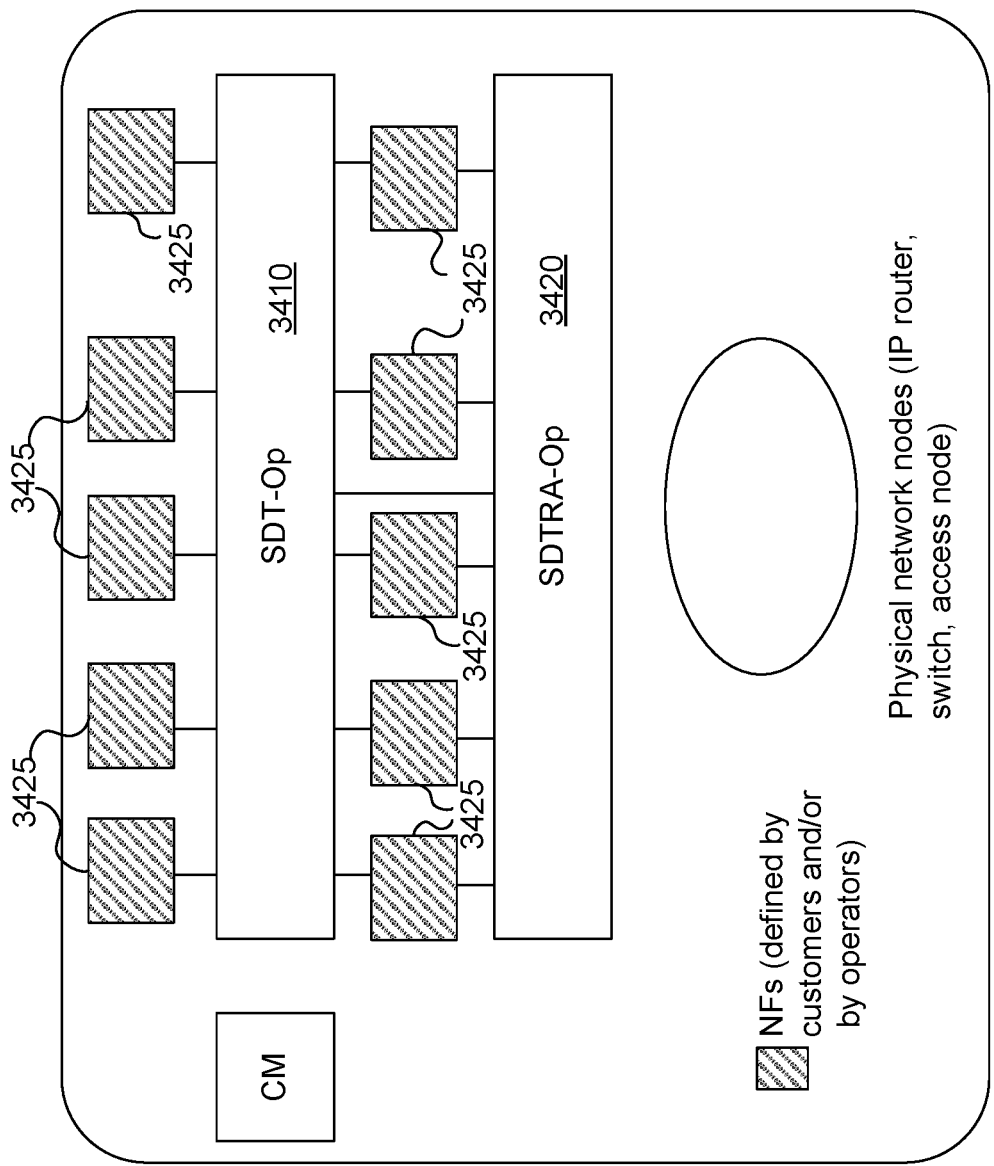
FIG. 34 illustrates the interaction between SDT-Op and SDRA-Op, according to an embodiment of the present invention.

FIG. 34 illustrates the interaction between SDT-Op 3410 and SDRA-Op 3420, according to an embodiment of the present invention. In this embodiment, it is assumed that SDT-Op 3410 and SDRA-Op 3420 provide service to multiple VNs. In most cases, SDT-Op 3410 receives packets from a network function 3425 (such as an application function), processes the received packets to determine the next tunnel, and sends the packet directly to SDRA-Op 3420. In some other cases, SDT-Op 3410 sends the processed packet to another NF 3425 (e.g. a packet aggregator) and the other NF sends the packet on to the SDRA-Op 3420, either directly or via SDRA-Op 3420. SDRA-Op 3420 passes packets to and from the physical network node 3430. The operation of the SDRA-Op 3420 can be configured by SONAC-Com during the VN configuration phase. SDT-Op 3410 and SDRA-Op 3420 can also be implemented on a per-VN basis to provide differentiated interaction for different VNs.

In some embodiments, at RAN clusters, a VN with multiple tunnels or multiple open tunnels is defined and realized to enable handover-free to mobile device or to support customer services with high reliability requirement.

In some embodiments, at a RAN cluster and to deliver a data packet to a mobile end point, a v-router in the RAN cluster is configured to obtain, from the CM, location information indicative of one or more candidate edge nodes for reaching the mobile end point. The v-router then determines the destination edge nodes (or tunnels connecting thereto) and sends the packet with one or multiple destination node IDs (as well as a VN ID) to SDRA-Op for conveyance to associated destination edge nodes. This operation may facilitate a multipath transmission, in which different data packets are routed to different edge nodes for transmission, or a multicast transmission, in which a single data packet is routed to different edge nodes for concurrent transmission thereby.

In some embodiments, VN routing tables can be updated in response to packets that are handled by a v-router. In particular, when a v-router handles a packet travelling in a first direction, i.e. from a particular end point, then the v-router can determine the originating VN node and previous VN node traversed by the packet, for example by obtaining such information from the packet. The v-router can then check its VN routing table, and update the VN routing table and/or tunnel configuration table as required based on this information. Similarly, the v-router can obtain, from the packet, information related to the source end point that generated the packet and the originating VN node, and update the VN topology description table and/or end point routing table based on this information. The routing tables can be updated so that packets following a return path can be routed back to an originating end point and/or VN node, without requiring an additional location resolution request.

Figure 35:
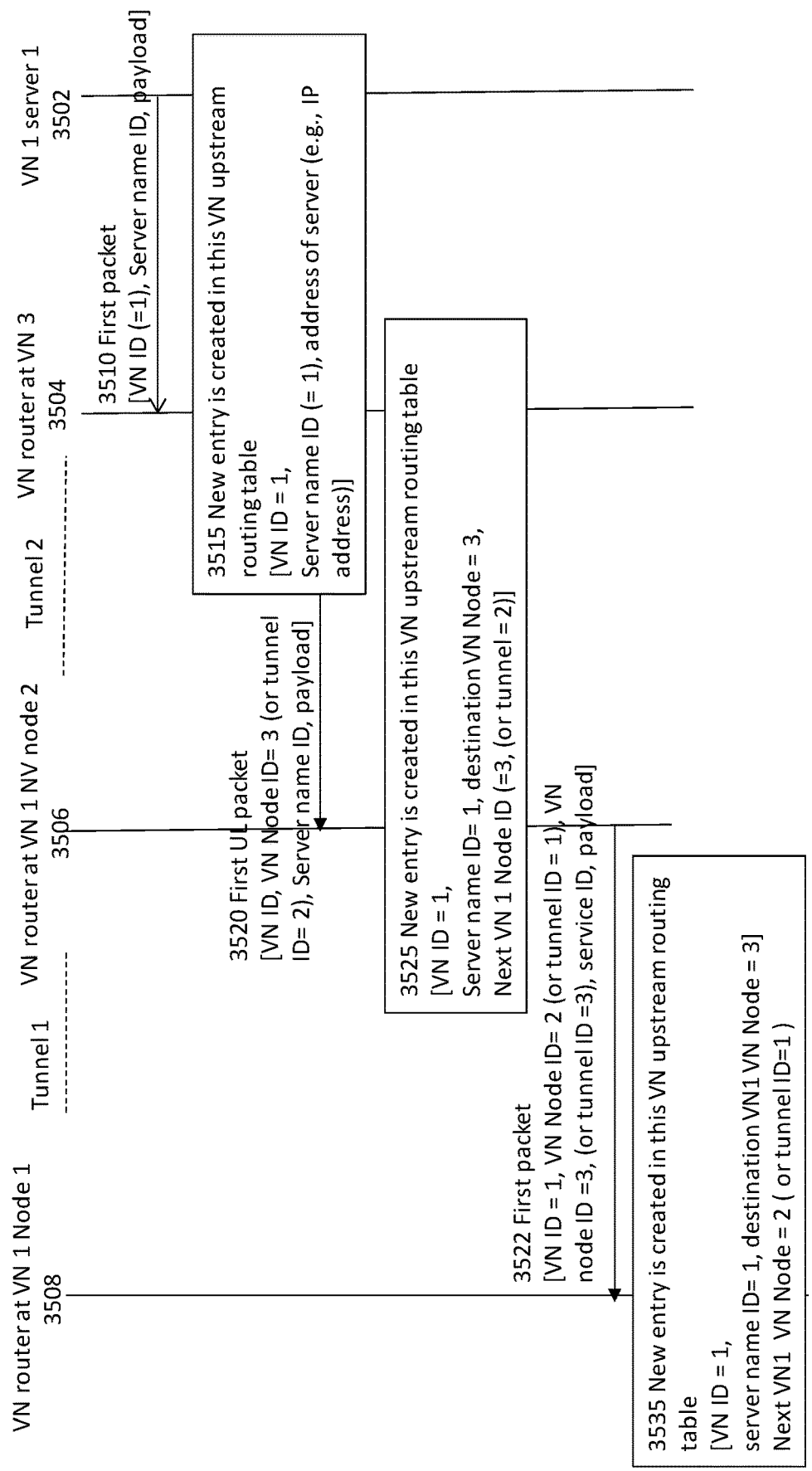
FIG. 35 is a signalling diagram illustrating v-router operation in response to a first packet transmitted by an endpoint that comprises a server, according to an embodiment of the present invention

FIG. 35 illustrates v-router operation in response to a first packet 3510 transmitted by an endpoint that comprises a server 3502, according to an embodiment of the present invention. A VN router 3504 receives the packet 3510 and creates 3515 a new entry in its upstream routing table, associating the server name ID with the network address of the server 3502. The packet is then forwarded 3520 to another VN router 3506, which, upon receipt, creates 3525 a new entry in its upstream routing table, associating the server name ID with the destination VN node 3504 and the next VN node (also 3504) (or equivalent tunnel ID). The packet is then forwarded 3522 to another VN router 3508, which, upon receipt, creates 3535 a new entry in its upstream routing table, associating the server name ID with the destination VN node 3504 and the next VN node also 3506 (or equivalent tunnel ID).

Figure 36:
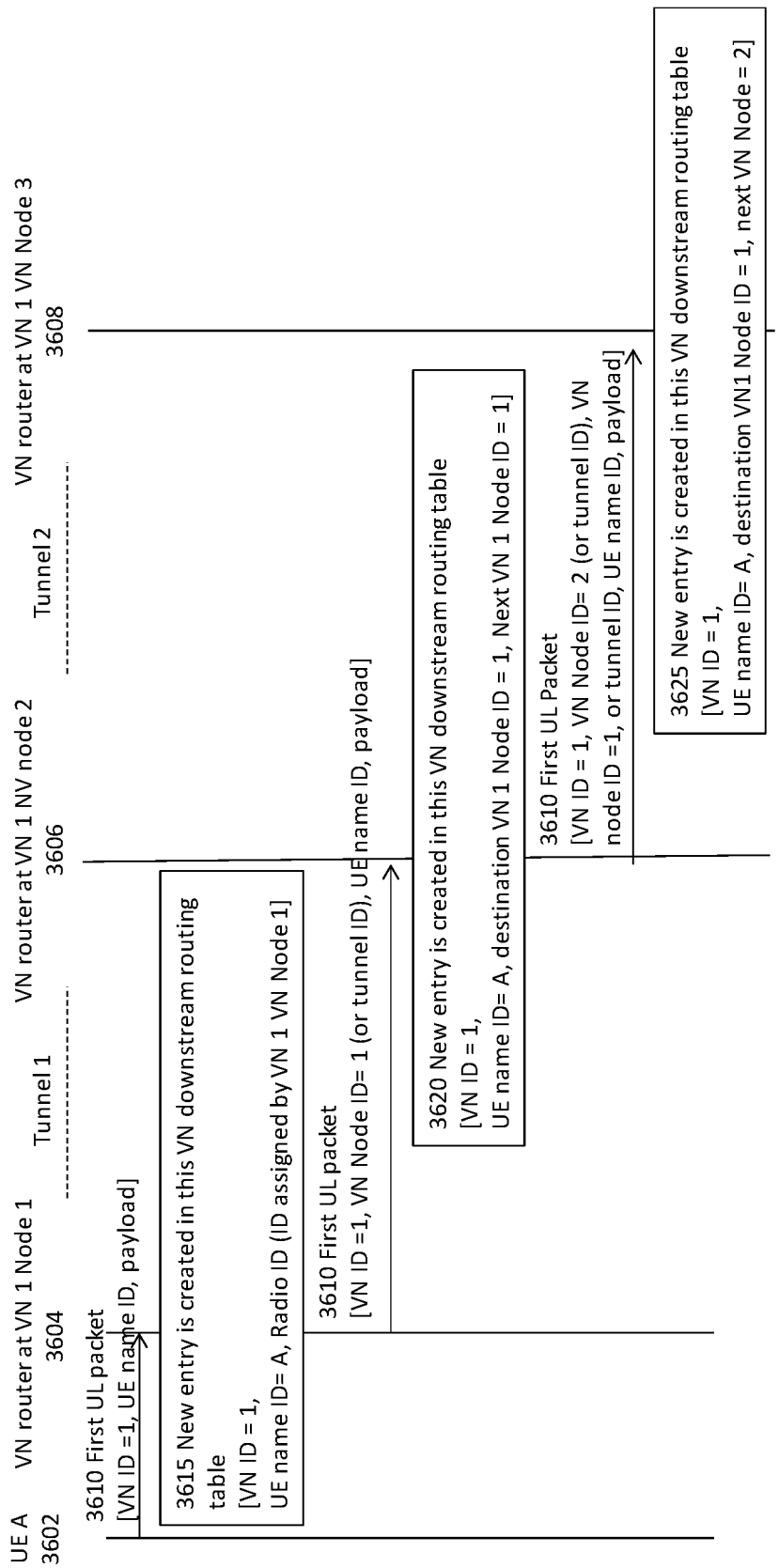
FIG. 36 is a signalling diagram illustrating v-router operation in response to a first packet transmitted by an endpoint that comprises a UE, according to an embodiment of the present invention.

FIG. 36 illustrates v-router operation in response to a first packet 1110 transmitted by an endpoint that comprises a UE 3602, according to an embodiment of the present invention. A VN router 3604 receives the packet 3610 and creates 3615 a new entry in its downstream routing table, associating the UE name ID with the radio ID of UE 3602. The packet is then forwarded to another VN router 3606, which, upon receipt, creates 3620 a new entry in its downstream routing table, associating the UE name ID with the destination VN node 3604 and the next VN node (also 3604) (or equivalent tunnel ID). The packet is then forwarded to another VN router 3608, which, upon receipt, creates 3625 a new entry in its downstream routing table, associating the UE name ID with the destination VN node 3604 and the next VN node also 3606 (or equivalent tunnel ID).

In various embodiments, for a VN which provides services to mobile end points, the v-router operates to determine a current anchor VN Node of this mobile end point or a current ID of the domain which the end point is currently in. For data traffic routing to a mobile device, the v-router obtains the current location information (domain ID or cluster ID) from the CM to which the v-router associates. The v-router checks a VN description table and translates the obtained location information to the destination VN Node ID. Using the VN routing table, the v-router determines the next VN Node ID or Tunnel ID to use. Then the v-router submits the data packet with the VN ID and VN Node ID to SDRA-Op for handling.

In some embodiments, in RAN clusters, multiple tunnels or multiple open tunnels may be defined and realized to enable handover-free operation in support of mobile end points, or to support customer services with high reliability requirements.

In some embodiments, at a RAN cluster and to deliver a data packet to a mobile end point, a v-router in the RAN cluster is configured to obtain, from the CM, location information indicative of one or more candidate edge nodes for reaching the mobile end point. The v-router then determines the destination edge nodes (or tunnels connecting thereto) and sends the packet with one or multiple destination node IDs (as well as a VN ID) to SDRA-Op for conveyance to associated destination edge nodes. This operation may facilitate a multipath transmission, in which different data packets are routed to different edge nodes for transmission, or a multicast transmission, in which a single data packet is routed to different edge nodes for concurrent transmission thereby.

Figure 37:
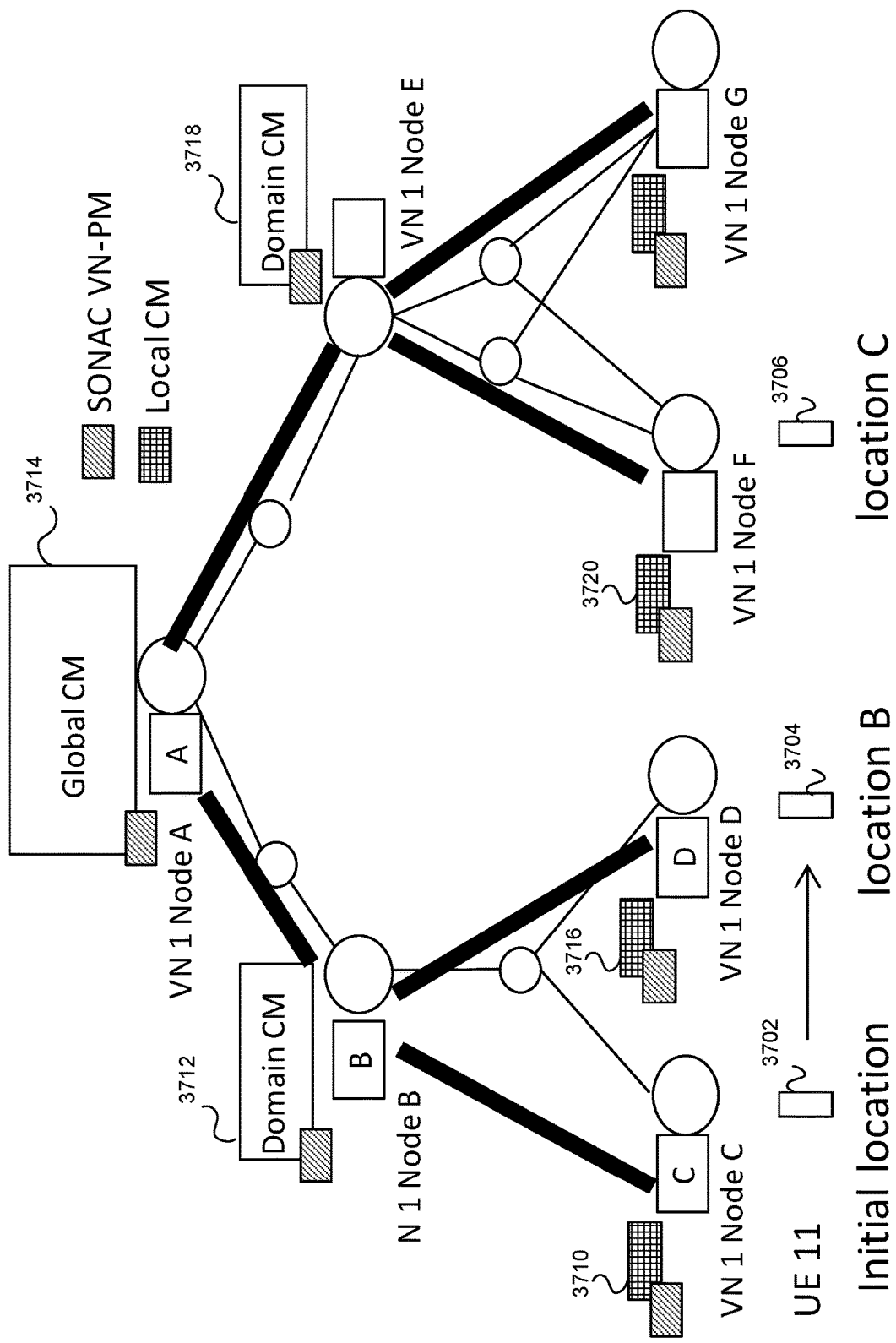
FIG. 37 illustrates tracking of a mobile end point moving between multiple locations, according to an embodiment of the present invention.

FIG. 37 illustrates tracking of a mobile end point 3702 such as a UE moving between multiple locations, according to an embodiment of the present invention. The example may be used in association with tunnel-by-tunnel routing.

The end point registers its initial location 3702 to CM entities including a local (or cluster) CM 3710, domain CM 3712 and global CM 3714. The global CM 3714 creates a new entry in its location table, specifying the end point name identifier and the next VN node to use to route packets to the end point (i.e. VN 1 Node B). The domain CM 3712 of VN 1 Node B creates a new entry in its location table specifying the end point name identifier and the next VN node to use to route packets to the end point (i.e. VN 1 Node C). The local CM 3710 of VN 1 Node C creates a new entry in its location table specifying the end point name identifier and the access point(s) to use to transmit packets to the end point.

During movement of the end point, the location tracking system continuously updates the device location tables at the CM entities. When the end point reaches location B 3704, the domain CM 3712 of VN 1 Node B updates its location table to specify the end point name identifier and a new next VN node to use to route packets to the end point (i.e. VN 1 Node D). The local CM 3716 of VN 1 Node D creates a new entry in its location table specifying the end point name identifier and the access point(s) to use to transmit packets to the end point. The global CM 3714 may remain unaffected.

When the end point reaches location C 3706, the global CM 3714 updates its location table to specify the end point name identifier and a new next VN node to use to route packets to the end point (i.e. VN 1 Node E). The domain CM 3718 of VN 1 Node E creates a new entry in its location table specifying the end point name identifier and the next VN node to use to route packets to the end point (i.e. VN 1 Node F). The local CM 3720 of VN 1 Node F creates a new entry in its location table specifying the end point name identifier and the access point(s) to use to transmit packets to the end point.

Figure 38:
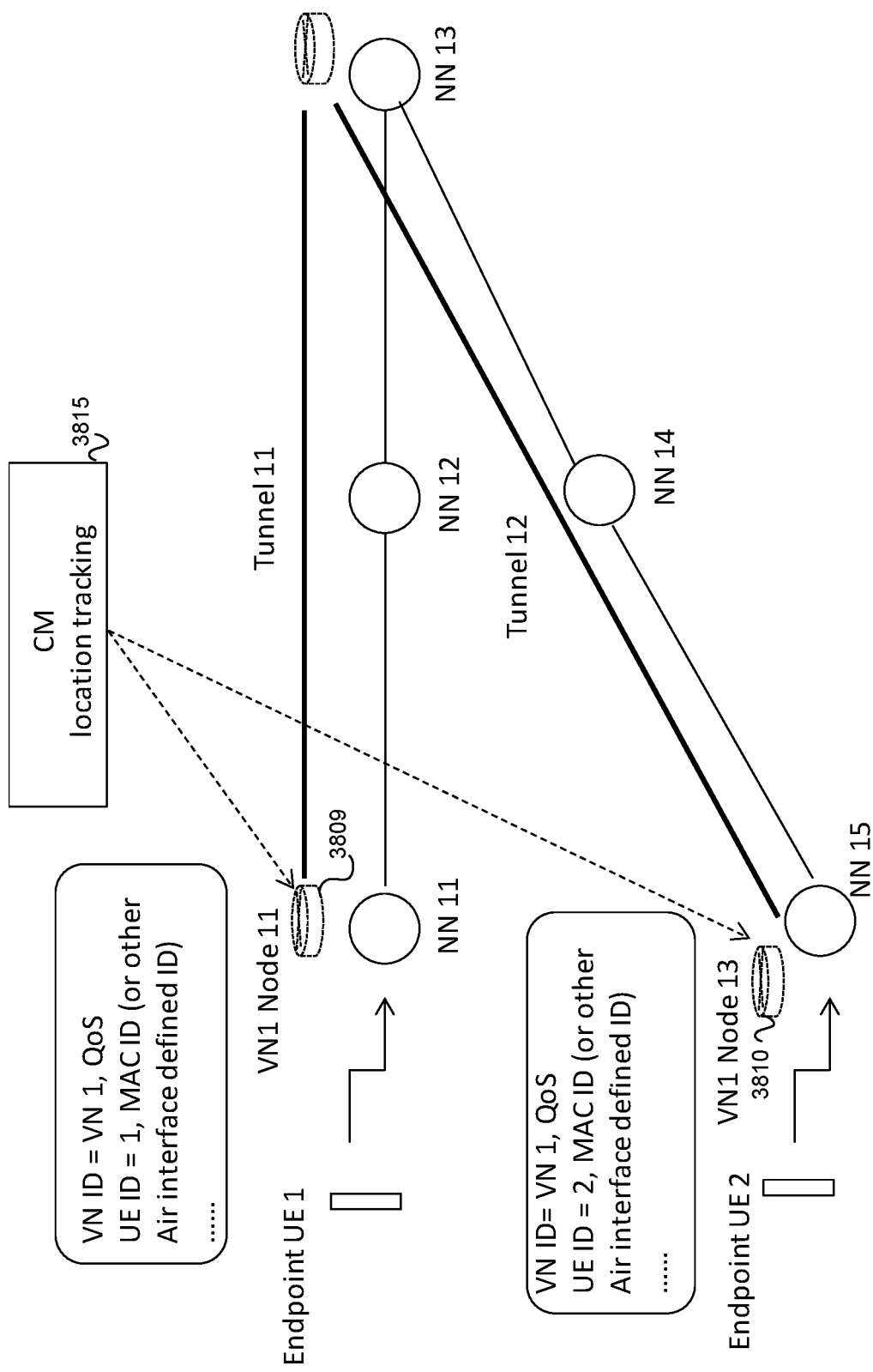
FIG. 38 illustrates routing table operation at VN nodes associated with wireless edge nodes of a communication network, according to an embodiment of the present invention.

FIG. 38 illustrates routing table operation at VN nodes associated with wireless edge nodes of the communication network. V-routers 3805, 3810 are located at edge nodes NN 11 and NN 15 of the communication network. The v-routers maintain routing tables informed by CM location tracking functions 3815. The routing tables at the wireless edge node v-routers may specify end points in terms of their identifier and/or air interface-defined identifier, such as a MAC ID.

Figure 39:
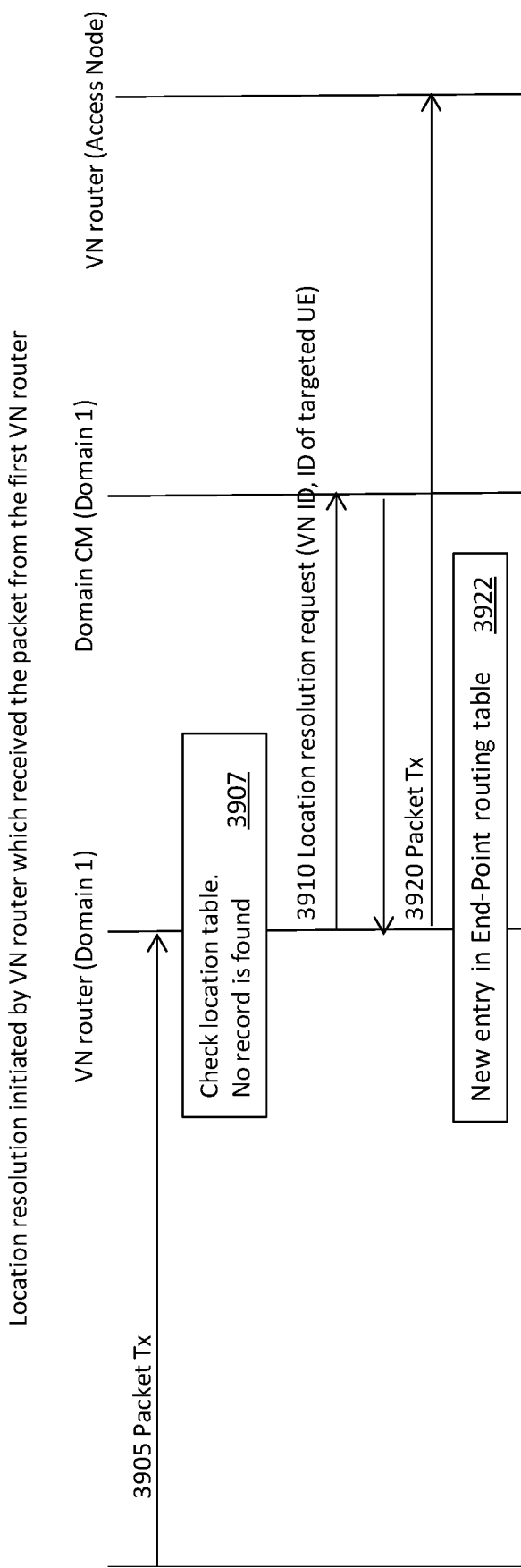
FIG. 39 is a signalling diagram illustrating location resolution initiated by a destination router that received the packet from a first transmitting v-router, according to an embodiment of the present invention.

Referring to FIG. 39, a signalling diagram illustrating location resolution initiated by a destination router that received the packet from the first transmitting VN router.

In step 3905 the transmitting VN router transmits a packet to the VN router in domain 2. In step 3907 the VN router in domain 2 checks its location table and determines that no corresponding record is in the location table. In step 3910, the VN router in domain 2 transmits a location resolution request to the domain CM for domain 2. The domain CM obtains the location information to satisfy the location resolution request, similar to the procedure outlined above. In step 3915 the domain CM for domain 2 returns the location resolution response. In step 3920 the VN router for domain 2 then forwards the received packet to the location identified in the location resolution response. In optional step 3922, the VN router in domain 2 updates, or creates, an entry in its end-point routing table using the received location information in the location resolution response.

In an aspect, only specified VN routers within a domain will initiate location resolution. This mode may be useful, for instance, in network domains that have a tree topology. Typically, the specified VN routers will be higher in the network hierarchy. For example, a packet intended for an unknown destination is forwarded by lower level VN routers to the specified VN router of the slice in the domain. The specified VN router then performs the location resolution to direct the packet to its intended destination.

Figure 40:
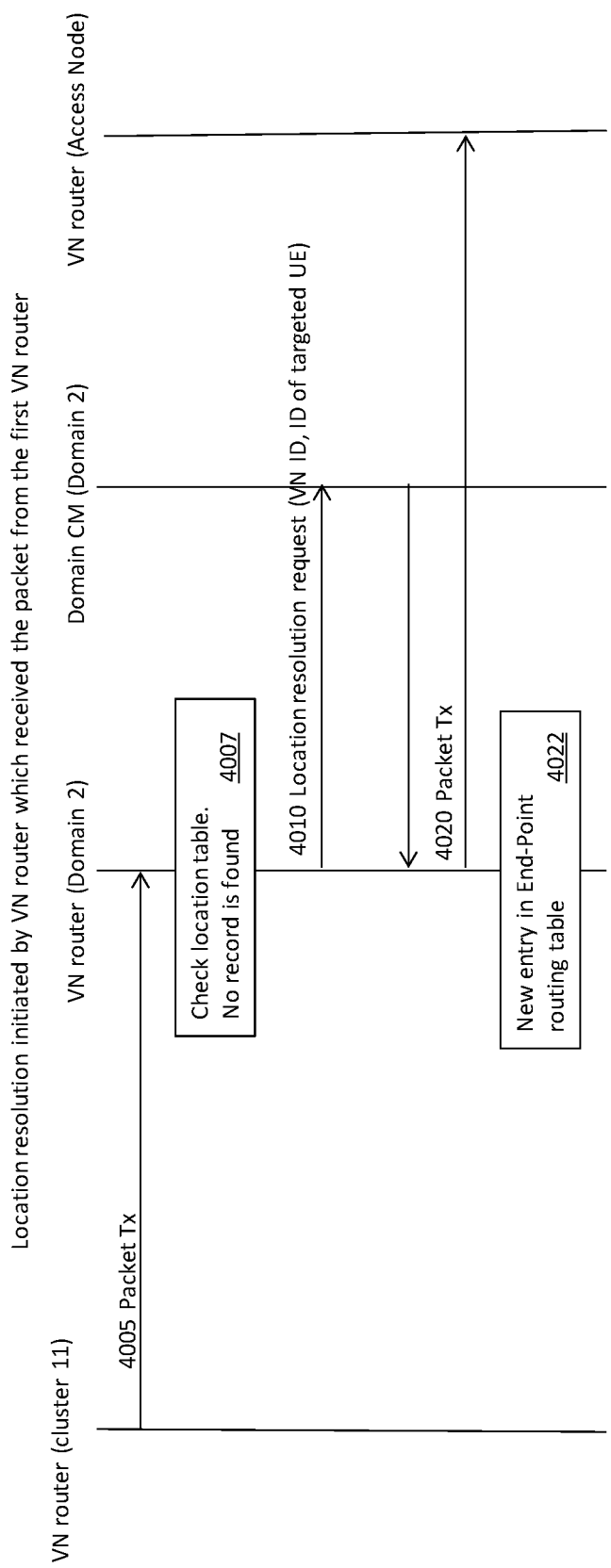
FIG. 40 is a signalling diagram illustrating location resolution by a specified v-router, according to an embodiment of the present invention.

Referring to FIG. 40, in step 4005 a transmitting VN router, such as a VN cluster router, transmits or forwards to the specified VN router a packet addressed to a destination UE. In this example, the specified VN router is the domain router. In step 4007, the specified VN router checks its location table and determines that no corresponding record is in the location table. In step 4010, the specified VN router transmits a location resolution request to the domain CM. The domain CM obtains the location information to satisfy the location resolution request, similar to the procedure outlined above. In step 4015 the domain CM returns the location resolution response including the location information for the destination UE. In step 4020 the specified VN router forwards the packet transmission to a destination VN router, i.e. the AN serving the destination UE, using the received location information. In optional step 4022 the specified VN router updates, or creates, an entry in the end-point routing table corresponding to the destination UE. Optional step 4022 occurs after the location resolution response has been received by the VN router, but may occur either before or after the step 4020 packet transmission.

In the pushing mode, the location tracking information for a destination UE is pushed to a VN router which requested the location of the destination UE. The requesting VN router maintains the received location information for the destination UE in its end-point routing table. Subsequent packets addressed to that destination UE may be directed using the received location information. The requesting VN router may maintain this entry in its end-point routing table until: i) there are no received packets addressed to that destination UE within a predetermined period of time (i.e. an idle period which implicitly indicates that the session is over); or, ii) the UE generating the packets to that destination UE leaves the requesting VN router's coverage area.

Figure 41:
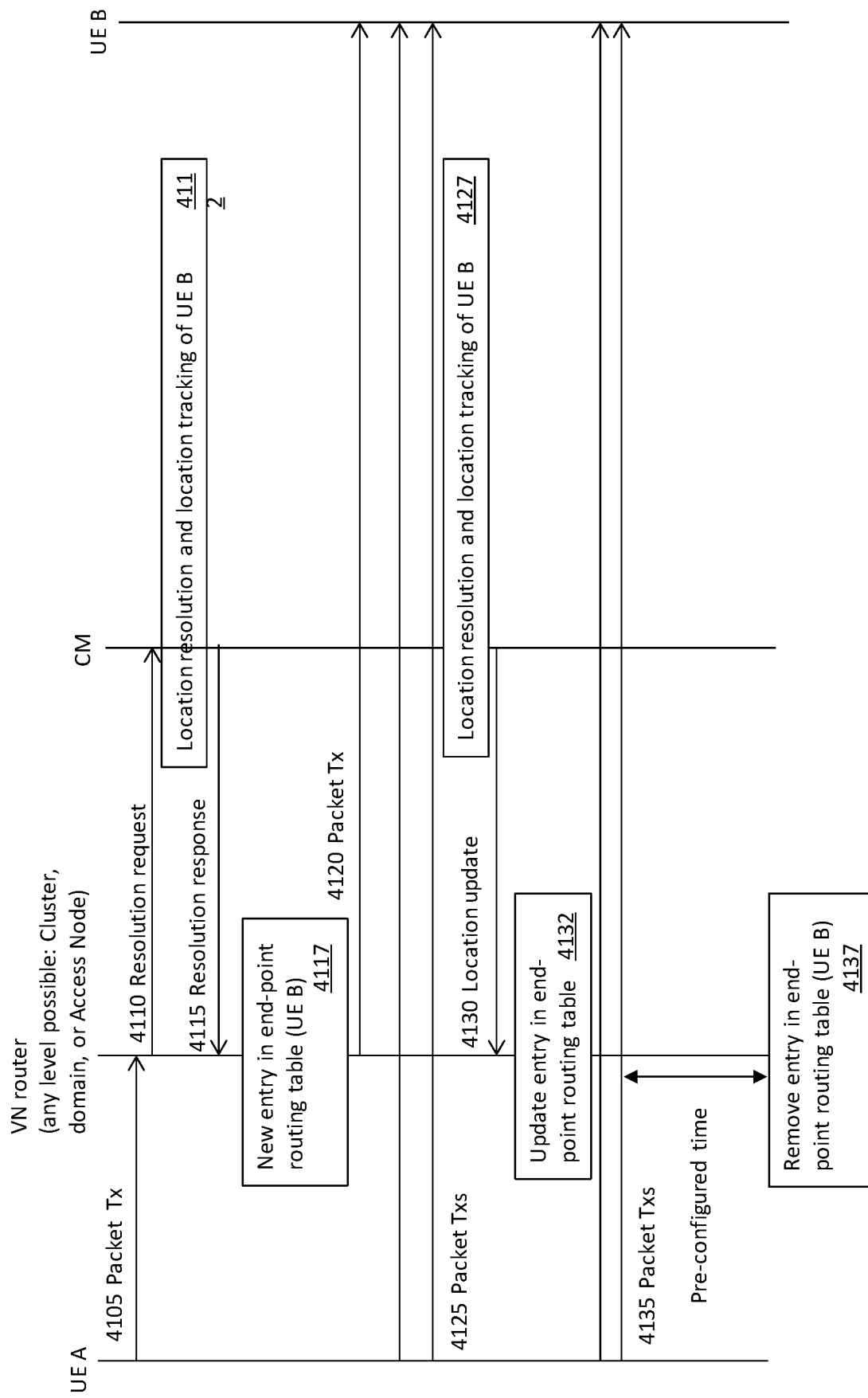
FIG. 41 is a signaling diagram illustrating a location resolution pushing mode where the destination end point moves, according to an embodiment of the present invention.

In the embodiment of FIG. 41, the destination UE B moves over the course of a session. For simplicity of illustration, the signalling diagram assumes that UE A is fixed but in practice it may also move out of the coverage of the VN router). In step 4105 a transmitting UE A transmits a packet intended for UE B to a VN router. The VN router in this case may be any level within the hierarchy (i.e. the VN router is a specified VN router as discussed above). The VN router determines that it does not know the location of the intended destination of the received packet. In step 4110, the VN router transmits a resolution request to a CM. The CM resolves the location of UE B in step 4112. In step 4115 the CM transmits a location resolution response to the requesting VN router including location information corresponding to the intended destination, UE B. In optional step 4117 the VN router may update, or create a new entry in, its end-point routing table for the location corresponding to UE B. In step 4120 the VN router forwards the packet to the UE B using the received location information. Optional step 4117 occurs after the location resolution response has been received by the VN router, but may occur either before or after the step 4120 packet transmission.

In steps 4125, the UE A, via the VN router, may transmit further packets in the session to the destination UE B. In step 4127 the CM determines that the UE B has changed location. In step 4130 the CM transmits a location update to the VN router. In step 4132 the VN router updates the corresponding entry it its end-point routing table. In step 4135 future packets are similarly forwarded to the UE B by the VN router using the location update. After a pre-configured period of time with no packets transmitted by UE A, in step 4137 the VN router may remove the corresponding entry from its end-point routing table.

In another example of the pushing mode, the transmitting UE A may move over the course of the session. In this example, the destination UE B is fixed for simplicity of illustration, but in practice the destination UE B may also move during the session as illustrated above with reference to FIG. 41.

Figure 42:
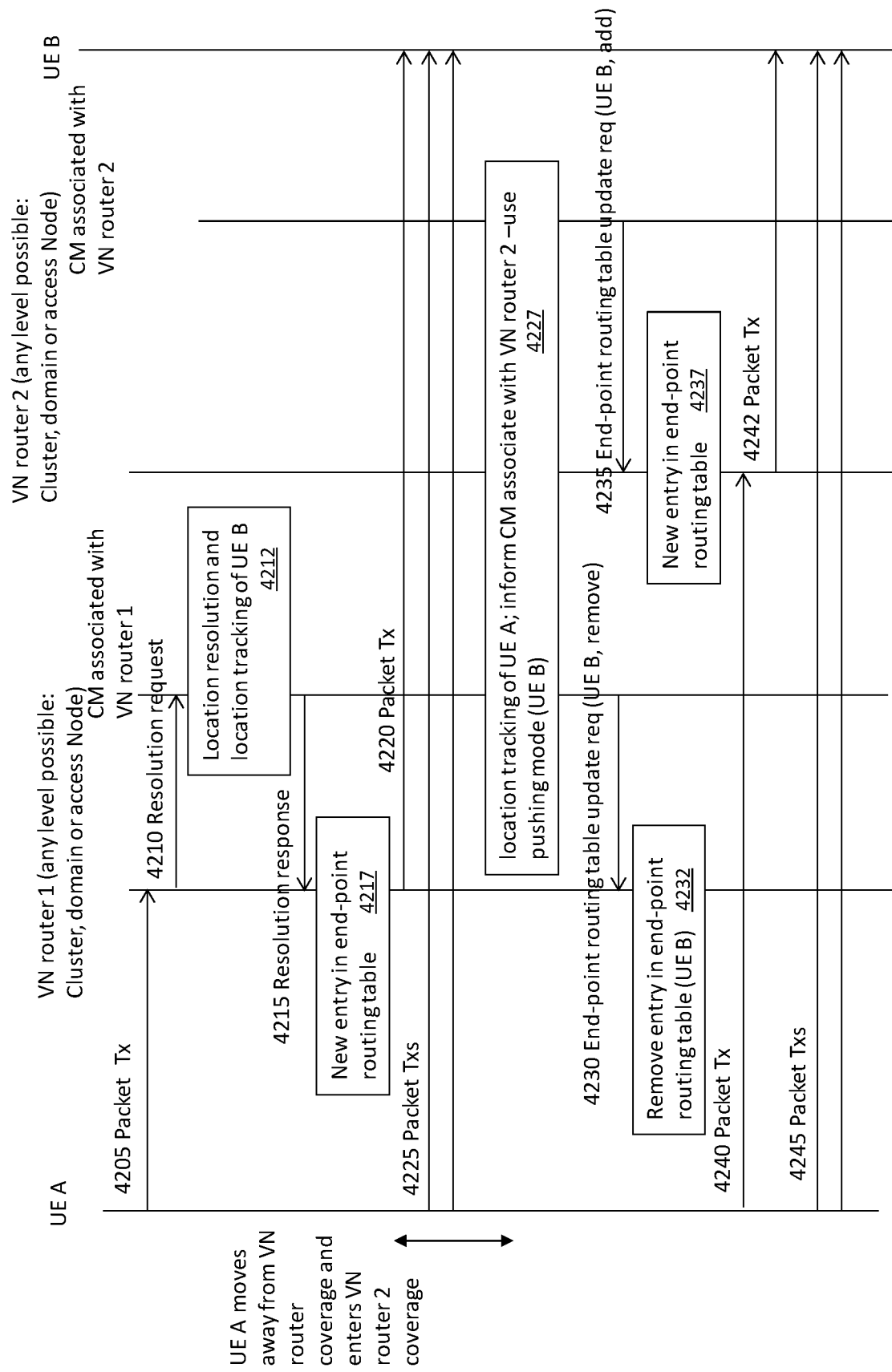
FIG. 42 is a signaling diagram illustrating a location resolution pushing mode where the transmitting end point moves, according to an embodiment of the present invention.

Referring to FIG. 42, in step 4205 the UE A may transmit a packet intended to the intended destination, UE B. At step 4205, the UE A is within a first coverage area corresponding to a first VN router. The first VN router evaluates the received packet and determines that it is not able to resolve the location. In step 4210 the first VN router forwards a location resolution request to a CM associated with that first VN router. In step 4212 the CM associated with the first VN router resolves the location of destination UE B, as described above. In step 4215, the CM returns to the first VN router a location resolution response including the location information corresponding to the destination UE B. The first VN router may update, or create, a corresponding entry in its end-point routing table in step 4217. In step 4220 the packet is forwarded to the destination UE B using the received location information. In steps 4225, the UE A and the first VN router continue to transmit packets to the destination UE B using the received location information. In step 4227 the CM determines that the UE A has moved from the first coverage area of the first VN router to a second coverage area of a second VN router. If necessary, the CM informs a second CM associated with the second VN router. In step 4230 the CM sends an end-point routing table update the first VN router to remove the destination UE B location information. In step 4235 the second CM sends an end-point routing table update to the second VN router to add the destination UE B location information. In step 4232, the first VN router may remove the corresponding end-point routing table entry, and in step 4237 the second VN router may remove its corresponding end-point routing table entry.

In step 4240 the UE A transmits a packet intended for destination UE B to the second VN router. In step 4242 the second VN router forwards the packet to the destination UE B based on the updated location information. In step 4245 the UE A continues to forward packets intended for the destination UE B to complete the session to the second VN router.

In an implementation, the VN router may be customized for a content caching and forwarding (CF) slice. In an aspect, the SONAC-Com for a CF slice may determine the cache locations, capacity, and topology. The VN nodes (stop and temporary cache) are caches associate with physical NNs within the topology. The SONAC-COM determines the VN level routing table.

Figure 43:
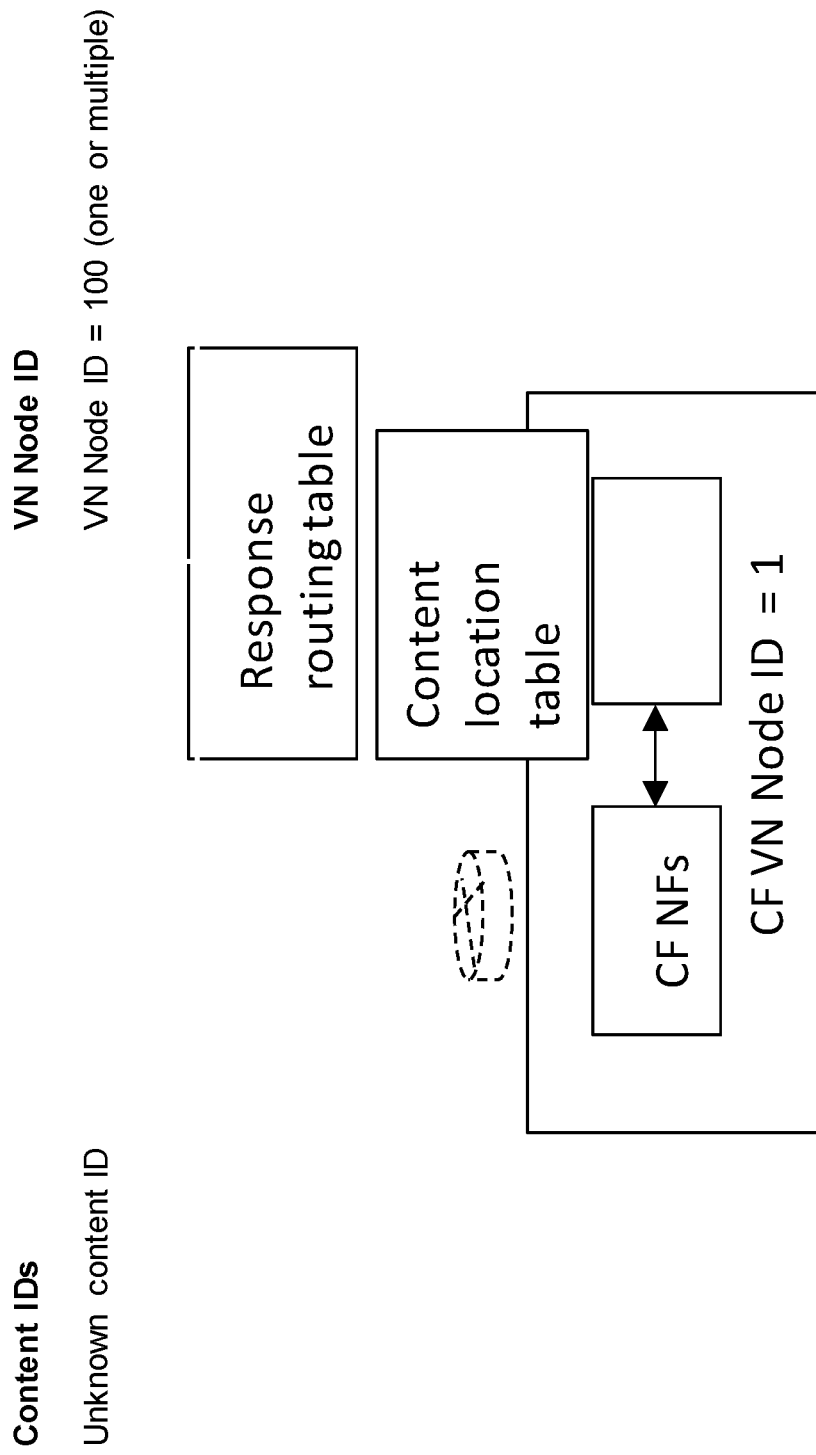
FIG. 43 is a block diagram illustrating an embodiment of an interaction between a v-router and caching and forwarding network functions, according to an embodiment of the present invention.

The SONAC-Op for a CF slice includes a specific SDT-Op that determines the request routing and response routing. The request routing includes the following steps:
  Receive a request packet, check certain field of packet, determines the content ID
  Check the content cache table
  Determine the destination VN node ID if available otherwise to upper layer VN Node of CF slice
  Update response routing table [content, requesting VN node ID from there the request was received]
  Send the request packet to the SDRA-Op
  The response routing includes the following steps:
  Check response routing table [content ID, requesting VN Node ID]
  Send the response and the VN node ID to SDRA-Op
A CFM slice dedicated to managing CF slices may included specific CF functions including:
  Monitor the content request frequency by DAM
  Determine and manage the local cache→interfacing with NF-caches
  Register to upper layer CFM function and neighbor CFM functions when any new content is cached
  Indicate to CF VN router (content cache table content ID, VN Node IDs) whenever content registration is received from other CFMs
  Similar to the CM, the CFM may provide location responses locating a destination UE to a requesting VN router Referring to FIG. 43, an example of a CF slice CDT-OP configuration of a VN router is illustrated. The SDT-Op may establish both a VN level routing table, as described above, and a content routing table. The content routing table providing instructions for handling unknown content received at a VN router. For example, all content with an unknown content ID may directed to one or more specified VN nodes (identified by corresponding Node IDs) to handle. In this example the VN Node ID=100.

Figure 44:
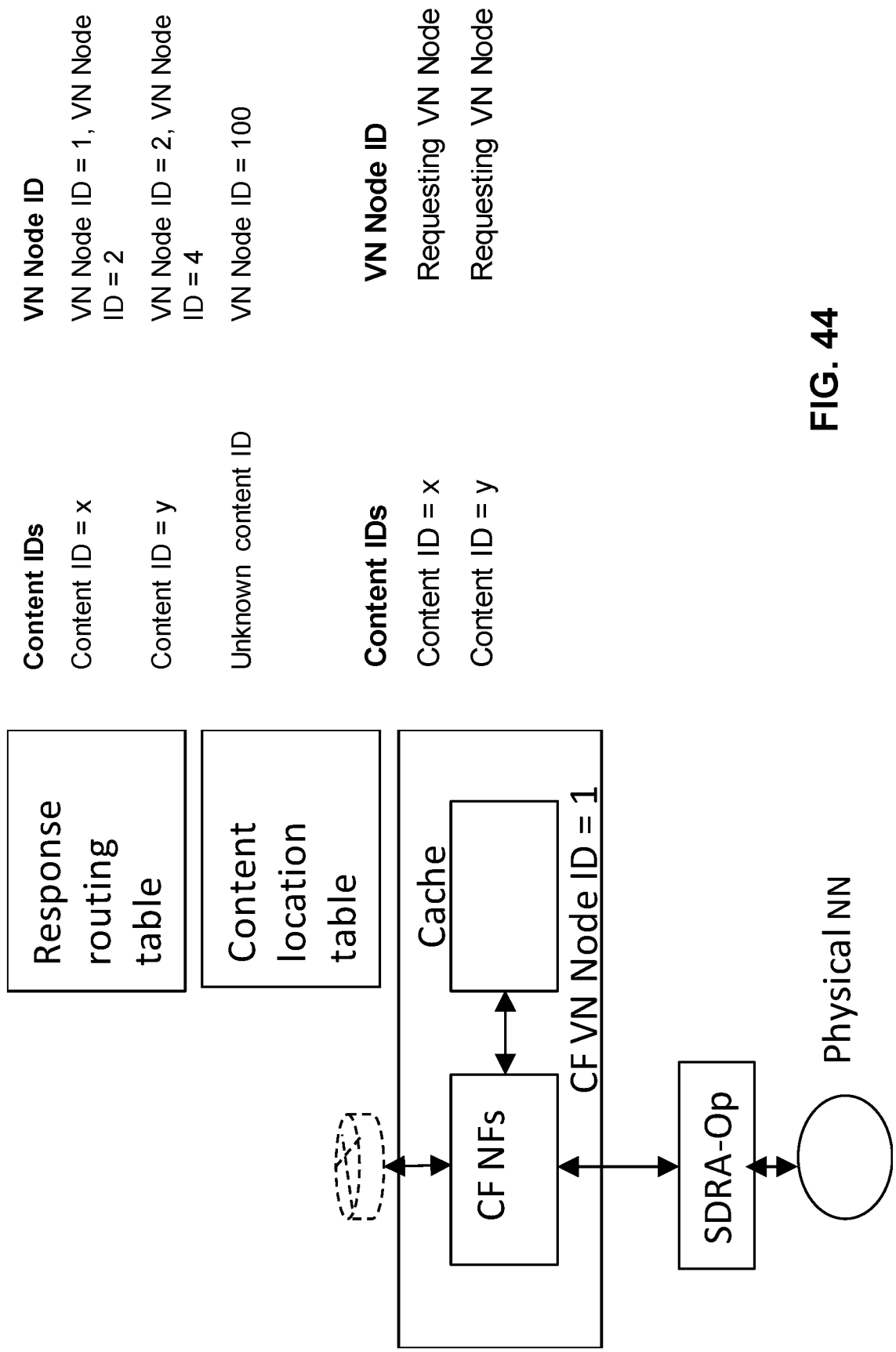
FIG. 44 is a block diagram illustrating an embodiment of an interaction between a v-router, caching and forwarding network functions, a SDRA-OP, and a physical NN, according to an embodiment of the present invention.

The interface between a VN router, SDRA-OP, the look-up tables, and the physical NN is illustrated in FIG. 44. In operation, a CF VN router:
1. receives a content request [content ID or other equivalent] sent by a cache and forwarding (CF) network function (NF)
2. the request is analyzed to obtain the requested content ID
3. the content ID is sent to the CF VN router
4. the CF VN router checks the content location table
  If the content ID is found and locally available:
    a. CF VN router then indicates CF NF (content ID and VN Node ID for response packet routing) to obtain the content, create response packets, and insert the VN Node ID into the response packets
    b. The packet(s) is sent to SDRA-Op
    c. Subsequent operations are the same as for other slices
  If the content ID is found but not locally available, the CF VN router checks the corresponding VN Node ID (if multiple VN nodes cache the content, CF VN router needs to determine which VN Node(s) should provide the content)
    a. CF VN router inserts the corresponding VN Node ID into the requesting packet and sends the amended packet to SDRA-Op
    b. CF VN router creates a new entry (or in some embodiments updates an existing entry) [content ID, requesting VN Node ID, (may time stamp)]
    c. Subsequent operations are the same as for other slices
  If the content ID is not found the CF VN router needs to check the request forwarding table (for unknown content):
    a. CF VN router inserts the VN Node ID and send to SDRA-Op
    b. SDRA-Op sends the packet to NN
In operation, the following steps occur:
1. The CF VN Node receives a response packet
2. The response packet is sent to the VN router
3. The VN router determines the content ID and the response routing table and obtains the requesting VN Node ID
4. The VN router inserts the VN Node ID into the packet and sends the packet to SDRA-Op (or via a VN NF)
5. The subsequent operations are the same as for other slices FIG. 45 illustrates a connectivity manager apparatus 4500, according to an embodiment of the present invention. The apparatus includes one or more processing elements such as a computer processor 4510, a memory 4520 such as an electronic computer memory, and a network interface 4530 configured to bi-directionally communicate with other network nodes in the communication network. In this and other apparatuses, the processor and memory configuration may be supplemented or replaced with other electronic hardware, such as integrated circuits or logic gate systems. The processor and memory (or other hardware components) are configured to perform a connectivity management function 4540 which registers and tracks end point locations and provides location updates to v-routers. The connectivity management function 4540 communicates with v-routers to provide the location updates thereto, and may receive location resolution requests from the v-routers and/or other connectivity managers. The connectivity manager apparatus 4500 interacts directly or indirectly, via the network interface 4530, with end points, in order to perform the end point registration and perform location tracking of the end points, for example by obtaining location reports from edge nodes communicating with the tracked and registered end points.

In various embodiments, the VN may be pre-configured to perform or allow for in-network processing or other functions in support of operation of the VN or the service. For example, functions instantiated at one or more VN nodes may further include one or more of: packet aggregation functions, packet de-aggregation functions, firewall functions, anchor point functions, caching functions for storing downlink data; storage functions for storing uplink data; and in-network processing functions for implementing part or all of the service. The service may thereby be performed at least in part by the VN itself. The location of such service functions may be selected so as to optimize delivery of the service, for example by providing adequately low-latency and high QoS for the service delivery with an adequately small footprint on the network and/or supporting in-network, cloud-based and datacenter resources. When in-network processing of packets is required, v-routers may be configured to route packets to nodes supporting processing functions, in order, according to a service function chain.

The location of the processing functions and the corresponding v-router routing table entries may be established as part of pre-configuration.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for transmitting a packet over a communication network, the method comprising:
   receiving, by a receiving network node, a packet sent by a sending end point to a destination end point connected to the communication network, the packet including at least a destination end point name identifier (ID) of the destination end point; and
   determining, by the receiving network node, a destination network node for directly forwarding the received packet to the destination end point when the destination network node is unknown to the receiving network node;
   inserting, by the receiving network node, an ID of the destination network node into the received packet;
   forwarding, by the receiving network node, the received packet to the destination end point over a network path determined according to a virtual network (VN) topology configuration,
   wherein the VN topology configuration includes a predefined tunnel configuration between VN nodes connecting the receiving network node to the destination end point,
   wherein the VN topology configuration further comprises a predefined VN level routing table configuration,
   wherein each VN node of the one or more VN nodes is in standby across the communication network ready to receive and handle packets directed to a service supported by that VN node,
   wherein the VN topology configuration is performed by a service oriented network auto creation entity (SONAC), and
   wherein SONAC functionalities are subdivided into functions used for network slice composition (SONAC-Com), and functionalities used for network slice operation (SONAC-Op).

2. The method of claim 1 further comprising sending, by the sending end point, the packet and receiving, by the destination end point, the packet.

3. The method of claim 1, wherein the network path indicates a logical connection between VN nodes.

4. The method of claim 1, wherein the predefined tunnel configuration comprises a relationship between a domain ID and VN node IDs of the VN nodes.

5. The method of claim 4, wherein the relationship includes one or more associations between the domain ID descriptive of potential end point locations and the VN node IDs usable to communicate with the destination end point.

6. The method of claim 3, wherein the predefined VN level routing table configuration comprises a relationship between VN node IDs, destination VN node and next VN node IDs associated with the network path.

7. The method of claim 1, wherein the predefined VN level routing table configuration at least in part includes a next VN node ID, wherein the receiving network node forwards the received packet to the destination end point via the next VN node corresponding to the next node ID.

8. An apparatus comprising one or more processors and one or more non-transitory storage mediums storing instructions executable by the one or more processors, the instructions when executed by the one or more processors causing operations comprising:
receiving a packet sent by a sending end point to a destination end point connected to a communication network, the packet comprises at least a destination end point name identifier (ID) of the destination end point; and
determining a destination network node for directly forwarding the received packet to the destination end point when the destination network node is unknown to the receiving network node;
inserting an ID of the destination network node into the received packet;
forwarding the received packet to the destination end point over a network path determined by a predefined virtual network (VN) topology configuration,
wherein the VN topology configuration includes a predefined tunnel configuration between the one or more VN nodes connecting the receiving network node to the destination end point,
wherein the VN topology configuration further includes a predefined VN level routing table configuration,
wherein each VN node of the one or more VN node is in standby across the communication network ready to receive and handle any packets directed to a service supported by that VN node,
wherein the VN topology configuration is performed by a service oriented network auto creation entity (SONAC), and
wherein SONAC functionalities are subdivided into functions used for network slice composition (SONAC-Com), and functionalities used for network slice operation (SONAC-Op).

9. A system for transmitting a packet over a communication network, the system comprising:
a receiving network node operative to receive a packet sent by a sending end point to a destination end point connected to the communication network, the packet comprises at least a destination end point name identifier (ID) of the destination end point; and
one or more virtual network (VN) nodes connecting the receiving network node to the destination end point;
the receiving network node further operative to determine a destination network node for directly forwarding the received packet to the destination end point when the destination network node is unknown to the receiving network node;
the receiving network node further operative to insert an ID of the destination network node into the received packet;
the receiving network node further operative to forward the received packet to the destination end point over a network path determined according to a VN topology configuration;
wherein the VN topology configuration includes a predefined tunnel configuration between the one or more VN nodes connecting the receiving network node to the destination end point;
wherein the VN topology configuration further includes a predefined VN level routing table configuration;
wherein each VN node of the one or more VN nodes is in standby across the communication network and ready to receive and handle packets directed to a service supported by that VN node;
wherein the VN topology configuration is performed by a service oriented network auto creation entity (SONAC); and
wherein SONAC functionalities are subdivided into functions used for network slice composition (SONAC-Com), and functionalities used for network slice operation (SONAC-Op).

10. The system of claim 9, wherein the system further comprises the sending end point configured to send the packet and the destination end point configured to receive the packet.

11. The system of claim 9, wherein the network path indicates a logical connection between VN nodes and wherein the predefined VN level routing table configuration comprises a relationship between VN node IDs, destination VN node and next VN node ID associated with the network path.

12. The system of claim 9, wherein the predefined tunnel configuration comprises a relationship between a domain ID and VN node IDs of the VN nodes.

13. The system of claim 12, wherein the relationship includes one or more associations between the domain ID descriptive of potential end point locations and VN node IDs usable to communicate with the destination end point.

14. The system of claim 9, wherein the predefined VN level routing table configuration at least in part includes a next VN node ID, wherein the receiving network node forwards the received packet to the destination end point via the next VN node corresponding to the next VN node ID.

15. The system of claim 9, wherein SONAC operations comprise operations for performing software-defined topology definition (SDT), software-defined resource allocation (SDRA), and software-defined protocol definition (SDP).

16. The system of claim 9, wherein the SONAC-Com maps out logical tunnels of the VN topology configuration to physical network resources.

17. The system of claim 9, wherein the SONAC-Com establishes logical connections between VN virtual routers and connection management entities (CM).

18. The system of claim 9, wherein after the destination end point registers with the communication network, and the destination end point subsequently registers to a connection management entity (CM) residing on a selected slice of the communication network.

* * * * *